US012650156B2

(12) United States Patent  
Seader

(10) Patent No.: US 12,650,156 B2  
(45) Date of Patent: Jun. 9, 2026

(54) SYSTEMS AND METHODS FOR A DUAL HOOK FLAT STRAP ATTACHMENT DEVICE AND ACCESSORIES

(71) Applicant: Nite Ize, Inc., Boulder, CO (US)

(72) Inventor: Rex Seader, Florissant, CO (US)

( * ) Notice: Subject to any disclaimer, the term of this patent is extended or adjusted under 35 U.S.C. 154(b) by 0 days.

(21) Appl. No.: 18/394,139

(22) Filed: Dec. 22, 2023

(65) Prior Publication Data

US 2024/0392859 A1     Nov. 28, 2024

Related U.S. Application Data

(63) Continuation-in-part of application No. 17/307,807, filed on May 4, 2021, now Pat. No. 11,852,214.

(51) Int. Cl.
| | |
|---|---|
| *F16B 45/00* | (2006.01) |
| *A45F 3/14* | (2006.01) |
| *F16G 11/14* | (2006.01) |

(52) U.S. Cl.
CPC .............. *F16G 11/143* (2013.01); *A45F 3/14* (2013.01); *A45F 2003/142* (2013.01)

(58) Field of Classification Search
CPC ...... F16G 11/14; F16G 11/143; F16B 45/035; F16B 45/034; F16B 45/023; F16B 45/008;

(Continued)

(56) References Cited

U.S. PATENT DOCUMENTS

| | | | |
|---|---|---|---|
| 58,287 | A | 9/1866 | Pollak |
| 428,354 | A | 5/1890 | Sant et al. |

(Continued)

FOREIGN PATENT DOCUMENTS

| | | |
|---|---|---|
| JP | 56058213 U | 5/1981 |
| JP | 57049918 U | 3/1982 |
| JP | 2019143759 A | 8/2019 |

OTHER PUBLICATIONS

Office Action dated Dec. 12, 2023 based on parallel European Patent Application No. 22799771.5 (3 pages).

(Continued)

*Primary Examiner* — Jason W San  
*Assistant Examiner* — Michael S Lee  
(74) *Attorney, Agent, or Firm* — Haynes and Boone, LLP; Robert P. Ziemian

(57) ABSTRACT

An attachment device includes a first hook and a second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook, wherein the first and second hook pivot between the first and second position. The attachment device further includes a housing, the housing interconnecting the first and second hook and providing a mechanism for a biasing force, the biasing force biasing the first and second hook towards each other. The attachment device further includes a first spring located in the housing, the first spring providing the biasing force. The attachment device further includes a center wall, the center wall located in the housing, the first spring pressing against the housing and the first hook in order to bias the first hook and the second hook.

9 Claims, 49 Drawing Sheets

(58) Field of Classification Search

CPC .... F16B 45/026; F16B 45/024; F16B 45/022; F16B 45/02; F16B 45/00; F16B 45/06; Y10T 24/4005

See application file for complete search history.

(56) References Cited

U.S. PATENT DOCUMENTS

| | | | | |
|---|---|---|---|---|
| 508,521 | A | * | 11/1893 | Langan ................. F16B 45/035 24/598.5 |
| 641,265 | A | * | 1/1900 | Brassington ............ F16B 45/06 24/598.5 |
| 766,140 | A | | 7/1904 | Eldridge |
| 835,937 | A | * | 11/1906 | Carlson ................... F16B 45/06 24/598.5 |
| 1,561,337 | A | * | 11/1925 | Madigan ............... F16B 45/035 24/598.5 |
| 1,579,843 | A | * | 4/1926 | Smith ................... F16B 45/026 24/598.5 |
| 1,657,087 | A | * | 1/1928 | Johnston ............... F16B 45/022 24/598.5 |
| 2,637,089 | A | | 5/1953 | Kuehn et al. |
| 3,161,931 | A | | 12/1964 | Zif |
| 5,732,449 | A | | 3/1998 | Nelson et al. |
| 6,412,152 | B1 | | 7/2002 | Ayliffe et al. |
| 10,004,926 | B2 | | 6/2018 | Ostrobrod |
| 2007/0056147 | A1 | | 3/2007 | Tracy |
| 2013/0091668 | A1 | | 4/2013 | Turdjian |
| 2018/0104519 | A1 | * | 4/2018 | Ostrobrod ............... F16B 45/06 |
| 2018/0255881 | A1 | | 9/2018 | Sorensen |
| 2020/0339328 | A1 | | 10/2020 | Larsen |
| 2021/0120785 | A1 | * | 4/2021 | Wong ...................... F16B 45/06 |
| 2022/0356926 | A1 | | 11/2022 | Seader |
| 2023/0243402 | A1 | | 8/2023 | Landis |

OTHER PUBLICATIONS

International Search Report and Written Opinion dated Jul. 7, 2022 issued in co-pending PCT App. No. PCT/US2022/071900 (8 pages).

"Fastfender 32 Fender Hanger: Sold in Pairs" retrieved online on Jul. 22, 2021 at https:www.amazon.com/dp/B00NZCGAR2/ref=cm_sw_r_u_apa_glt_fabc_0F50Y8WKQYHCOMWQZXMK?_encoding=UTF8&th=1.

International Search Report mailed on Feb. 28, 2025 in parallel PCT Patent Application No. PCT/US2024/060706 (2 pages).

Extended European Search Report mailed on Mar. 12, 2025 in parallel European Patent Application No. 22799771.5 (8 pages).

Examination Report dated Oct. 21, 2024 issued in the parallel Australian patent application No. 2022270196 (5 pages).

Notice of Allowance mailed on Feb. 20, 2025 in related Japanese patent application No. 2023-566462 (3 pages).

"Fastfender 32 Fender Hanger: Sold in Pairs" retrieved online on Jul. 22, 2021 at https://www.amazon.com/dp/B00NZCGAR2/ref=cm_sw_r_u_apa_glt_fabc_0F50Y8WKQYHC0MWQZXMK?_encoding=UTF8&th=1.

International Search Report mailed Jun. 11, 2025 in related PCT Patent Application No. PCT/US2024/060712 (4 pages).

* cited by examiner

Fig. 12a
Fig. 12b
Fig 12c
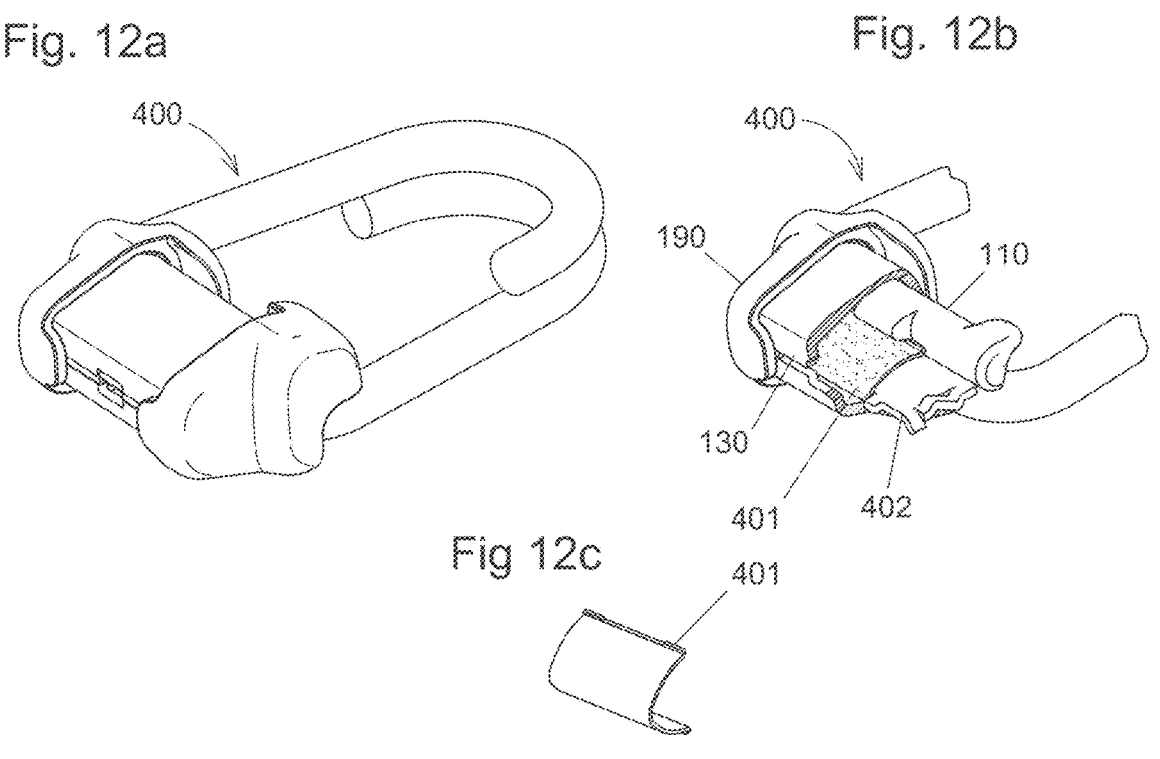
Fig. 13a
Fig. 13b
Fig. 13c
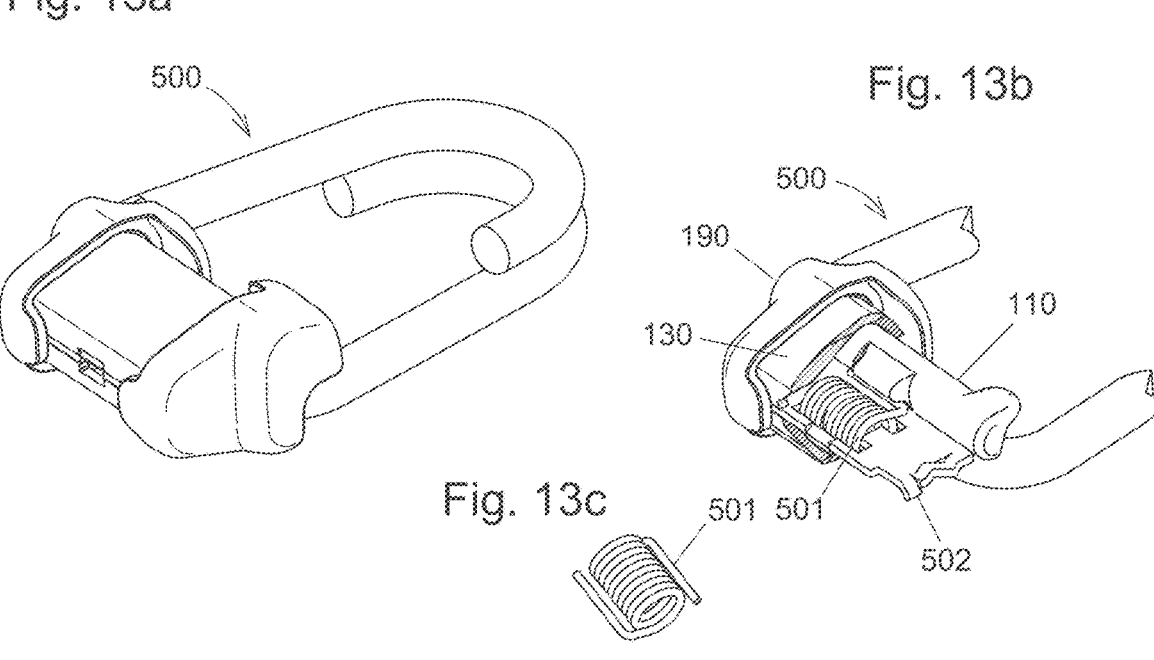

PRIOR ART

PRIOR ART

Fig 25a
Fig 25b
Fig 25c
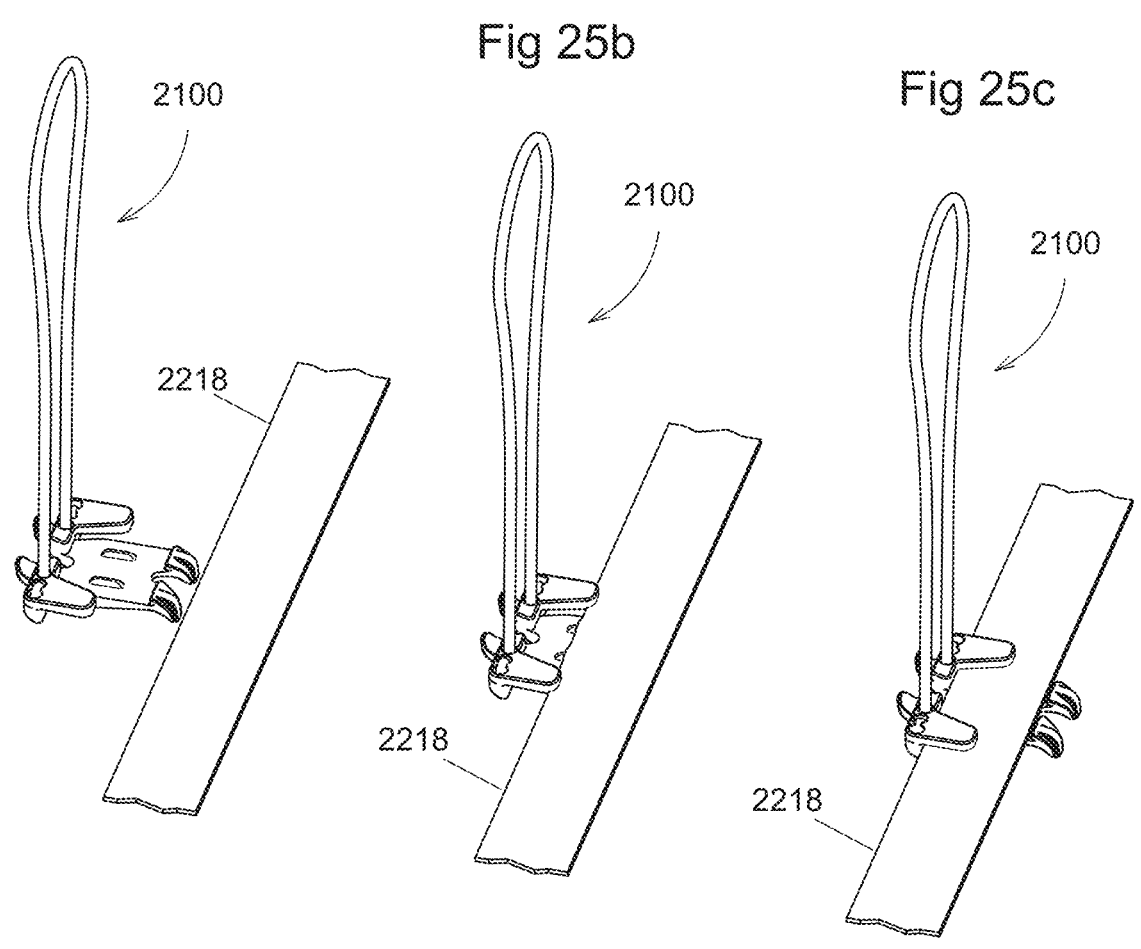
Fig 25d
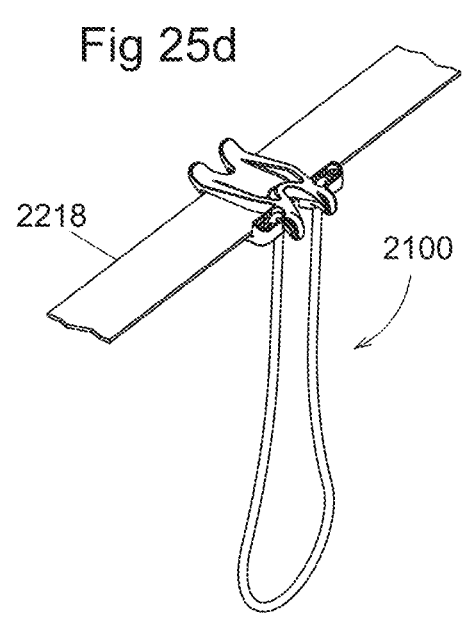

PRIOR ART
Fig 30b
Fig 30a
Fig 30c
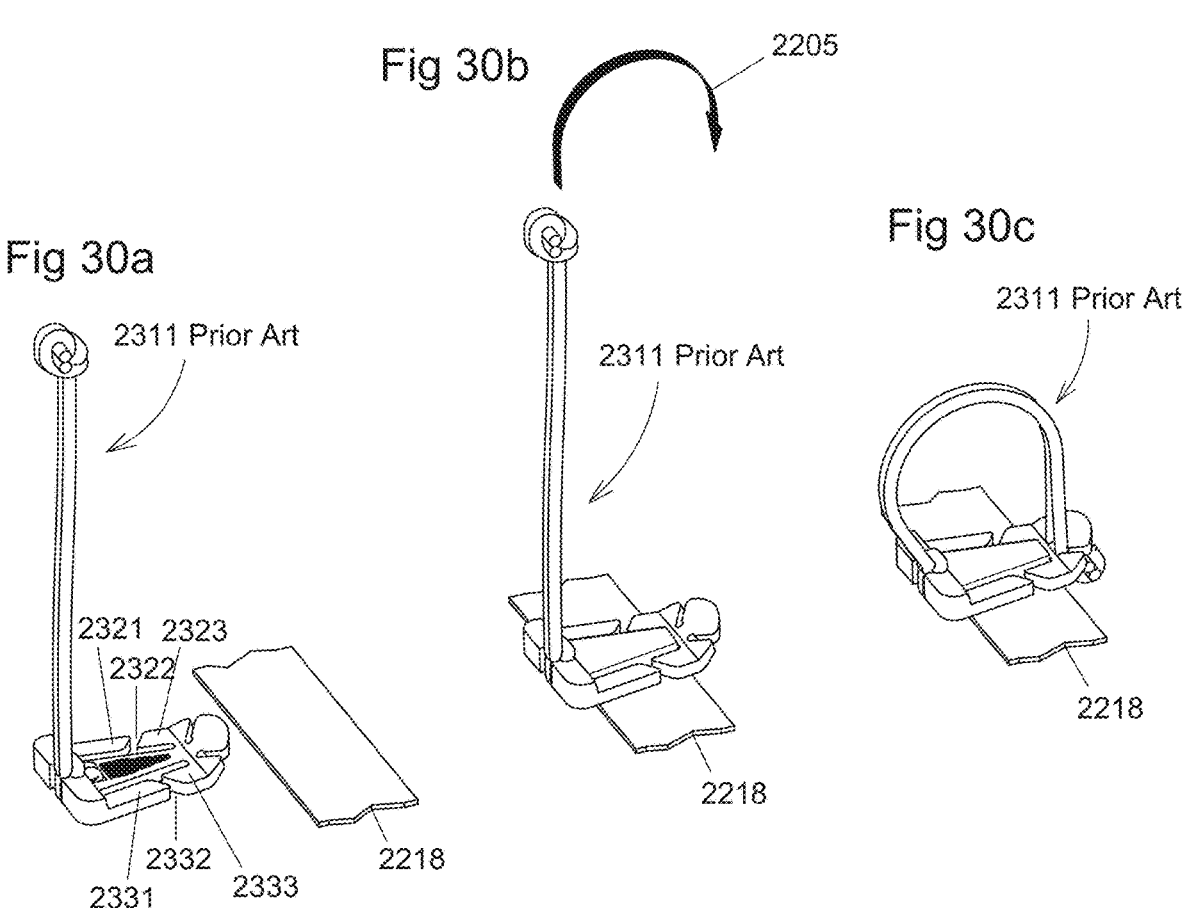
Fig 30d
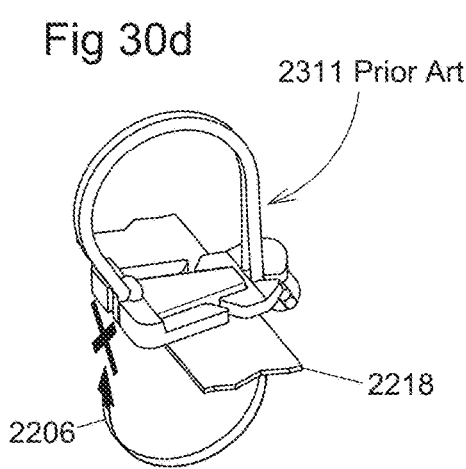

PRIOR ART
Fig 32
Fig 31a
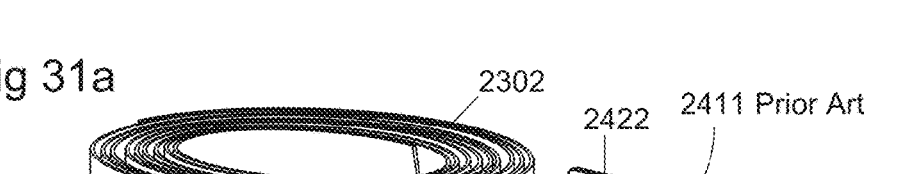
2302
2422
2411 Prior Art
2421
Fig 31b
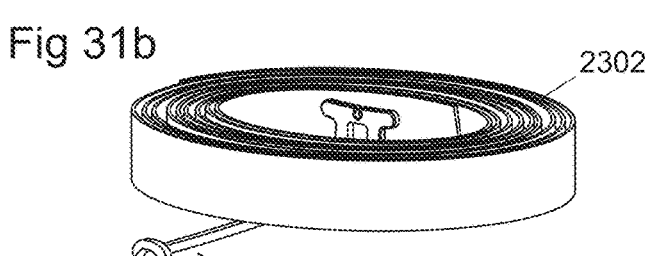
2302
2411 Prior Art
Fig 31c
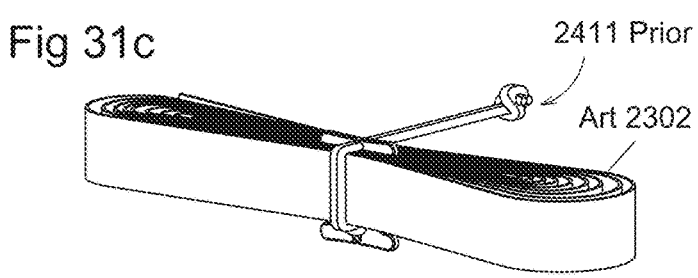
2411 Prior
Art 2302
Fig 31d
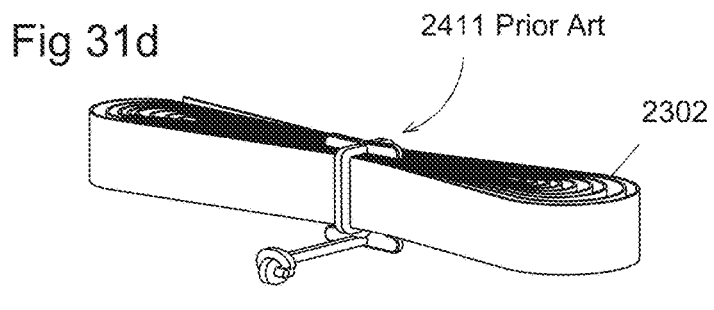
2411 Prior Art
2302
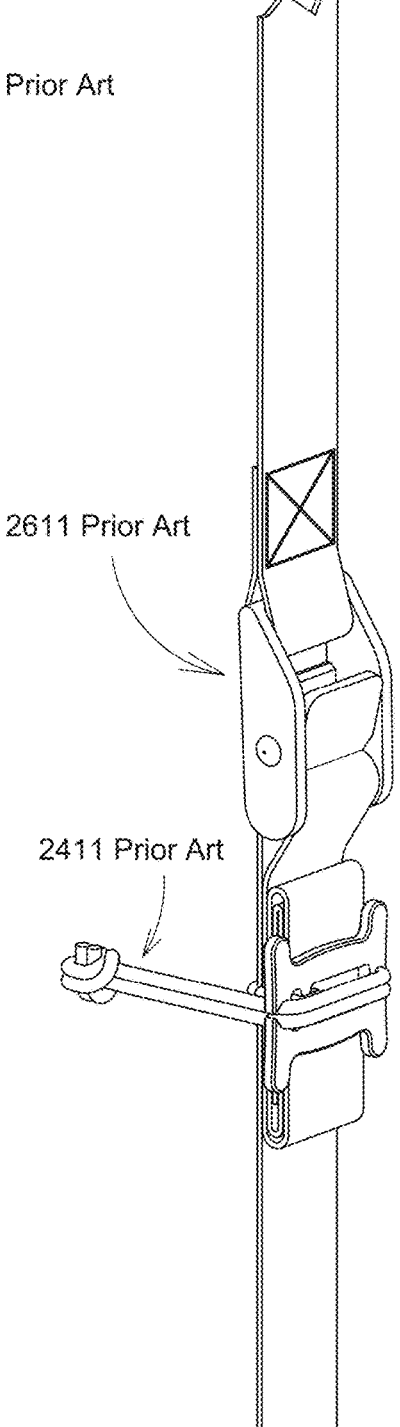
2611 Prior Art
2411 Prior Art

PRIOR ART

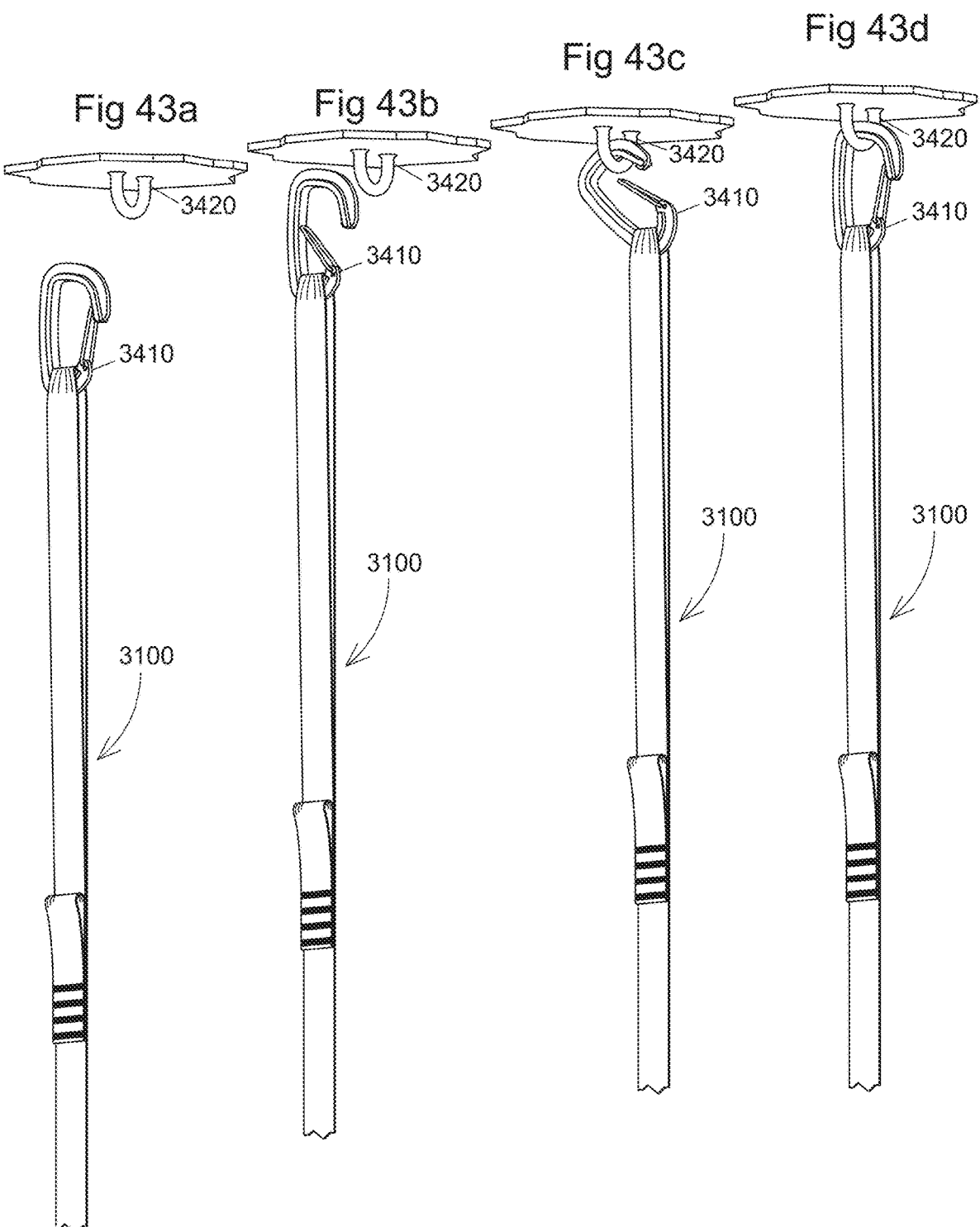

3100

3430

3100

3430

3502

3100

3430

PRIOR ART

SYSTEMS AND METHODS FOR A DUAL HOOK FLAT STRAP ATTACHMENT DEVICE AND ACCESSORIES

CROSS-REFERENCE TO RELATED APPLICATIONS

This application is a continuation-in-part of U.S. Pat. No. 11,852,214, entitled, "Systems And Methods For A Dual Hook Flat Strap Attachment Device," to be issued Dec. 26, 2023, the entirety of which is hereby incorporated by reference.

BACKGROUND

Attachment/Tensioning Device

Throughout this document 'fixed location', 'anchor location', and 'fixed anchor location will be used interchangeably and are intended to convey the same meaning.

Strap tensioning devices are widely used and are available today in multiple designs, ratchet and camlocks devices being the most prevalent. Straps incorporated into these types of tensioning devices typically are terminated with hooks. Hooks, available in various shapes and sizes are used to secure the free end of a strap to a fixed anchor location.

The most commonly used hook design for strap termination, particularly on strap tensioning devices sized for use with 1″ wide webbing, is what can be termed an 'S-hook'. The S-hook is an 'S' shaped hook where the lower end of the 'S' is closed and the upper end of the 'S' is open. The S-hook is permanently secured to one end of a strap by means of a sewn loop capturing the closed portion of the S-shaped hook 262 Prior Art (FIG. 15a). Thus, the strap will contain an 'S' shaped hook permanently affixed to the end of the strap, where the open end of the S-shaped hook can be removably attached to a fixed anchor location (FIG. 15b).

The majority of strap tensioning devices in the market place today, whether they are of the ratchet or camlock variety, utilize two straps, and are configured in what is typically referred to as fixed-end configurations. These being strap configurations where opposing ends of the two straps are removably secured to separate anchor locations. Typically, the strap tensioning device is positioned between the anchor locations, with one of the straps being permanently affixed to the tensioning device, the other strap being drawn through and held releasably secured in the tensioning device.

While the S-hook is the predominantly used means for securing strap ends to anchor locations, other means exist for securing strap ends. Two commonly used means are the 'J-hook' 264 Prior Art (FIG. 16a) and the carabiner 266 Prior Art (FIG. 19). Another method would be to simply use a loop sewn into the strap end 241 Prior Art (FIG. 17) without employing any type of hook, thus relying solely on the attachment of the sewn end loop directly to an anchor location (FIG. 18).

The J-hook consists of round wire stock formed into a triangular shape where the legs of the triangle at one of the three vertexes of the triangular shape have hooked shaped ends, turned perpendicular to the plane of the triangle. The curved hook portions resemble the curved bottom of the letter 'J'. The side of the triangular shape located opposite from the J-shaped hook ends, serves as the attachment location for the sewn-on strap. The primary difference between the S-hook and the J-hook is the orientation of the hook portion of each style of hook. For the S-hook, the hook portion aligns parallel with the plane defined by the flat area of the strap, whereas in a J-hook, the two hook-shaped wire-form ends are oriented perpendicular to the plane defined by the flat area of the strap.

With both styles of hook, it is not uncommon for the strap that is permanently secured to the tensioning device to also contain an additional loop of webbing 242 Prior Art (FIG. 15c), or a D-shaped metal ring 268 Prior Art (FIG. 16c), sewn to the strap and located close to where the strap is permanently attached to the tensioning device. By circumnavigating the anchor location with the S-hook (or J-hook) sewn to a strap end, and subsequently securing the hook portion of the S-hook (or J-hook) into the secondary smaller loop or D-ring, the strap can be removably secured to an anchor location much larger in size than what the S-hook (or J-hook) could directly accommodate (FIG. 15c, FIG. 16c).

In some instances, the sewn loop or D-ring is provided on the second strap rather than on the strap permanently attached to the tensioning device. Including a sewn loop or D-ring on this strap however, limits the minimum length the strap/tensioning device can be drawn to. If both straps contain the sewn loop or metal D-ring, this limitation becomes even more restrictive.

A carabiner styled hook 266 Prior Art (FIG. 19), used for strap attachment functions similar to both the S-hook and the J-hook, with the additional feature of providing a more secure means in removably securing the strap end to an anchor location. A carabiner styled hook typically contains a lock gate, fabricated as either a wire-form spring gate, or as a spring biased pivoting member made from the same material as the hook itself. In either case, the locking member of the carabiner, spring biased to a closed position, can be rotated open to allow attachment of the hook to an anchor location. The spring force biasing the movable member to a closed position rotates or pivots the open member back to the closed position once the carabiner is secured to the anchor location.

While a carabiner style hook provides means for anchor attachment that is more secure than an S-hook, a carabiner style hook lacks the anchor capacity of an equivalently sized S-hook. Anchor capacity being the largest diameter anchor to which the carabiner can be attached. The primary reason for this is the space required for the rotation of the lock gate consumes a significant amount of volume within the footprint of the carabiner (FIG. 19).

Additionally, a carabiner is vulnerable structurally if loading is applied such that that the carabiner experiences a severe twisting action along the length of the carabiner body, or if side loading is applied directly to the moveable gate. While the movable lock gate of the carabiner is typically designed to accommodate large tensile loading along the length of the carabiner, the c-shape of the carabiner body, paired with the locking member, are not typically designed to accommodate large torque loads or side loading.

Webbing has a rectangular cross section, much wider than it is thick. Contrast this with rope, which has a circular cross section. When highly tensioned webbing is routed through a carabiner, the carabiner can experience a disproportionate twisting action along the long axis of the carabiner, particularly so if the anchor location prevents the carabiner from rotating to equalize the twisting action induced by the webbing. Thus, the asymmetrical design of a carabiner makes it vulnerable to damage from non-tensile loading, more so when it is paired with webbing than when it is paired with round cross-sectioned rope.

The draw back to the open-end S and J hooks is the open-end hook. Apart from the induced tension applied to the strap by means of the tensioning device, nothing is really holding the hook securely to the anchor location. The open-end hook can inadvertently disengage from the anchor location if it is improperly positioned with respect to the anchor, or if slack conditions exist in the webbing.

Finally, it is worth mentioning that most S-hooks are fabricated with a conformal coating applied to the hook. While this is perceived as a distinct advantage for protecting the surfaces of anchor locations, it also precludes the possibility of allowing the strap to move through the closed portion of the S-hook without doing damage to either the conformal coating applied to the hook or to the webbing. For a strap that is permanently secured to the hook, this would not be considered a liability. However, for applications where it would be desirable for the webbing to move through the closed portion of the hook, this becomes a distinct liability.

Strap Organizer

Throughout this document the terms 'webbing' and 'strap' are used interchangeably and refer to any type of flexible woven material, rectangular in cross-section, typically much longer in length than in width or thickness.

Strap organizers are widely used and are available today in multiple designs and sizes. Primarily, strap organizers are utilized to dress the excess length of strap extending from any of a variety of devices utilized in strap tensioning applications. Additionally, strap organizers are utilized for storage purposes, neatly bundling tensioning device and strap for convenient storage when the device is not in use. Strap organizers can also be used to dress excess webbing length in adjustable backpack straps and over-shoulder carry bags.

Some strap organizers are highly specialized in their design and function. The commercially available ITW Dominator (FIGS. 30a-30d, Prior Art), part of the MOLLE (Modular Lightweight Load-carrying Equipment) product collection; enabling attachment of multi-tools, knives, flashlights, water bladder drinking tubes, and other equipment to tactical-backpacks, rucksacks, and load-bearing vests, is one such example. While this description may seem to imply a broad general use for the ITW Dominator, the attachment scheme is highly specialized to create a secure attachment of the ITW Dominator to 1" wide webbing. The MOLLE system is particularly suited for military type environments and finds its primary use in such environments.

As such, attachment of the ITW Dominator to webbing (and likewise detachment from webbing) may require more effort than a casual user of a strap organizer would expect to invest, especially on a frequent basis. The two arms (2321, 2323 and 2331, 2333) on each edge of the device defining an opening (2322, 2332) into which the webbing is inserted makes for a secure attachment of the ITW Dominator to the webbing, yet lacks convenience in executing the operation. For the most part the ITW Dominator is not intended for frequent reengagements with webbing. Rather, the intention is to configure the strap organizer in a particular manner and leave it in place. In a field environment, particularly one related to military activities, it is imperative for an article held fast to a rucksack or vest by the ITW Dominator be readily accessible to the user without risk of the ITW Dominator being dislodged from its underlying webbing support.

Additionally, the elastomeric cord incorporated into the ITW Dominator only spans an arc of approximately 180 degrees whenever an object is secured within the device (FIGS. 30b and 30c). Limiting the span to 180 degrees ensures quick and easy access to articles constrained by the ITW Dominator. Executing multiple wraps of the elastomeric cord, those exceeding 180 degrees, to secure an object is not feasible when using the ITW Dominator. In fact, there are no provisions in the device to do so (FIG. 30d). For its intended purpose, attempting to secure an object in this manner would be a hindrance anyway.

Other strap organizers are simple in design and find use across a broad spectrum of webbing sizes, 1" inch wide webbing for general purpose strap tensioning devices, to much higher load rated devices that utilize 1½" to 3" wide straps. The commercially available Bench Dog Strap-Loc (FIG. 33a-33d, FIG. 34a-34d, FIG. 35, Prior Art) is an example of this type of strap organizer. The Bench Dog Strap-Loc and others similar to it are basically an H-shaped part where webbing is wound onto the 'cross-bar' of the 'H' while being retained between the sides of the 'H', and subsequently bound together by means of an elastomeric cord or Velcro type strap that is then wrapped around the webbing and strap organizer.

FIGS. 33a-33d shows the Bench Dog Strap-Loc affixed to webbing and positioned well along its length, where excess webbing starting with the free end is then wound back towards the strap organizer. The resulting bundle of webbing is positioned on top of the strap organizer, and in the case of the Bench Dog Strap-Loc is secured to the strap organizer by means of a custom molded elastomeric cord which secures the webbing against the strap organizer.

FIGS. 34a-34d shows the Bench Dog Strap-Loc affixed to the webbing end where the Bench Dog Strap-Loc is then rotated end-over-end taking up excess webbing onto the strap organizer, where again the elastomeric cord is used to hold the Bench Dog Strap-Loc secure against the bundled webbing, preventing the unspooling of the strap organizer from the webbing.

FIG. 35 shows the Bench Dog Strap-Loc configured to dress the excess webbing exiting a generic style camlock device. Either process shown in FIG. 33a-FIG. 33d and in FIG. 34a-FIG. 34d can be utilized is dressing the excess webbing depicted in FIG. 35.

While 'H' shaped strap organizers may serve their purpose, this type of strap organizer can be quite cumbersome to use. Feeding the webbing into the strap organizer as depicted in FIG. 33a and/or executing end-over-end flips of the strap organizer per FIGS. 34a-34d is an inefficient method to manage excess strap length. In many situations, these types of strap organizers may first require removal from the strap when configuring or adjusting tension in the strap by means of the tensioning device. Additionally, the 'H' shape strap organizer tends to have an overly large footprint where restrictions in the proper placement of the strap organizer may adversely affect a strap set-up.

A third example of a strap organizer is the commercially available Pro Grip Tether Bone Cargo Strap Storage Device (FIGS. 31a-31d, FIG. 32, Prior Art). The Tether Bone lacks means for securing it to webbing prior to locking the elastomeric cord to the Tether Bone frame via two open ended slots (2421, 2422). While the Tether Bone may appear to be simpler to configure than the ITW Dominator, having to simultaneously position, bundle, and secure the elastomeric cord of the Tether Bone by means of a two-handed operation is less than ideal in terms of user interaction (FIG. 32). The Tether Bone strap organizer relies on the two open ended slots in the frame to secure the tensioned elastomeric cord in place. Similar to the ITW Dominator, the Tether Bone also relies on an approximate 180 degree 'half-wrap' of the elastomeric cord when securing excess webbing in place by means of the device. The two open ended slots provide essentially a redundant locking effect. The engagement of the elastomeric cord with the first open ended slot provides the primary locking effect while the second open ended slot creates additional holding power, augmenting the first slot.

This type of locking scheme can be difficult to use unless the user has clear access to the tensioned strap and excess strap bundle allowing the user to correctly position the Tether Bone and excess strap bundle while engaging the elastomeric cord with the open-ended slots on the Tether Bone frame. Additionally, the elastomeric cord attachment scheme lacks robustness in that the elastomeric cord can loosen (pull back through the open-end slots) while engaged. This type of locking scheme is self-limiting in terms of its ability to accommodate tension in the elastomeric cord. If a user tries to increase tension in the elastomeric cord by stretching the cord further when inserting the cord into the slots, the elastomeric cord will simply relax back to whatever locking force the slots exert on the elastomeric cord once the user releases the cord end after tensioning it. If a significant length of excess webbing extends past the constraining device that secures webbing in a tensioned configuration, the weight of the excess webbing could possibly over-burden the tension of the elastomeric cord.

An example would be a garden tractor secured to a flatbed trailer by means of a ratchet strap tensioning device configured with 2″ wide heavy-duty webbing—where only a short section of the webbing length is used in the tensioned strap configuration with the rest extending past the ratchet device. Driving along a highway at 60 miles per hour and exposed to highway wind speeds, the weight of the excess webbing bundled onto the tensioned strap by means of the Tether Bone strap organizer could cause the elastomeric cord to slip within the two slots thus allowing the webbing bundle to dislodge from underneath the elastomeric cord. While this would not compromise the tractor-to-trailer attachment via the ratchet device, it could create a driving hazard if the excess webbing was long enough to be trapped under a wheel of the trailer, or interfere with vehicles next to or behind the moving trailer.

Without the use of a strap organizer, excess webbing exiting a strap tensioning device is typically bundled up and tied off using the excess webbing itself. This can be cumbersome, unwieldly, and time consuming to execute. However, unless a strap organizer is both easier to use and as reliable in securing excess webbing as simply tying off the webbing, a user will forego using the strap organizer. The 'H' shaped strap organizers tend to be bulky and awkward to work with. This style of strap organizer is better suited for dressing webbing and tensioning devices for storage purposes. The Tether Bone, while easier to work with than the H-style strap organizer, has to be held in place along with the bundled excess webbing while simultaneously engaging the elastomeric cord to hold things together. The ITW Dominator while having a similar appearance to the Tether Bone strap organizer is a specialized design not intended for use with general purpose strap tensioning devices. And unless the ITW Dominator can be left in place, they are not particularly useful in dressing excess strap length on backpack straps or over-shoulder bags.

Straps

Straps are manufactured to serve a variety of purposes. Straps are manufactured from a variety of materials, offered in innumerable shapes and sizes, and often include hardware components to enable attachment of the strap to a multiplicity of anchor types and anchor locations. A type of strap one often encounters are the straps incorporated into ratchet and cam-lock devices which are sold for general purpose use. Typically, these types of straps are fabricated from nominally 1-inch wide nylon, polypropylene, or polyester webbing.

For these applications, the straps are most often terminated with a hook that is permanently sewn to the strap end. The two most common hooks used are the open-end S-hook and the open-end J hook. Less common, but still quite prevalent, are gated carabiner type locking devices. With these particular straps, the carabiner-to-strap connection is often over-molded, encapsulating a portion of the carabiner with the strap end. In all of these instances however, the component serving as the anchor attachment is permanently fixed to the strap end.

Additionally, these straps may also include a small loop sewn along the length of the webbing to provide some flexibility in how the strap is secured to an anchor location. In straps that utilize J-hooks, an additional metal D-ring may be sewn onto the small loop. These smaller sewn-on loops, allow the strap-end hook to attach to the small loop after encircling the anchor location, rather than having the strap-end hook connect directly to the anchor location. In either situation, the strap, with the permanently affixed hook component, is often limited in its ability to secure a viable and safe connection to an anchor location. The hook component itself may prove to be a hinderance rather than a help in adequately executing an anchor attachment.

One example in particular are the expanded metal panels used in a variety of ladder and equipment racks that one finds mounted on pickup trucks, flatbed trucks, or stake-bed trucks. Racks that utilize expanded metal panels typically have those panels welded to metal frames constructed of square shaped steel tubing. Straps terminated with permanently attached hooks often prove inadequate in interfacing to these types of racks (Prior Art, FIG. 52a, FIG. 52b).

It is not uncommon in driving down the highway to see equipment or material precariously secured to a vehicle, with straps that have hooks barely hanging on to some protruding element of the rack or vehicle. People often create these unsafe conditions because the hook terminated straps they have purchased—for the sole purpose of securing loads-prove inadequate. Faced with the immediacy of a situation, it is often more expedient to attempt a workaround using an existing strap, than it is to ensure a safe and secure attachment of the strap to an anchor location.

While many customized straps (oftentimes incorporating specialized hardware) would serve exceptionally well in a particular situation, it is often this feature of specialization that leads to the prior description of an unsafe use of such straps.

Conversely, the least specialized strap one might envision would simply be a length of webbing, having no end terminations or hardware components fixed to the strap ends. The challenge here is the user of such a strap would need to be adequately versed in tying knots to ensure a safe termination of the strap at an anchor location. Unfortunately, this is not a common skill people invest time to develop.

While industry today abounds in a plethora of customize strap assemblies, these often prove inadequate for general purpose use in securing loads. The reason for this may be due to the specialized nature of the strap. Conversely, people unskilled in the proper use of such straps and/or unskilled in trying knots, may find themselves at the mercy of whatever strap tensioning device is available at the closest big box store. And here, the common choice will be a strap terminated with a permanently sewn-on S-hook, J-hook, or carabiner styled anchor attachment. These straps often lack the versatility and convenience needed to ensure that a casual or even an experienced user of the strap can use the strap safely.

BRIEF SUMMARY

Some of the embodiments described herein enable a removably secure attachment between a strap end containing a sewn end loop and a fixed anchor location. Additionally, the embodiments can be selectively attached to, or removed from, the sewn end loop in the strap. Thus, when said straps are used with strap tensioning devices, the user is afforded an option to include or remove the embodiment from the strap configuration.

Unlike S-hooks and J-hooks that are permanently attached to the strap ends, the embodiments can be selectively added to or removed from an existing sewn loop in a strap end, thus matching the convenience of a gated carabiner.

Additionally, while providing the means for an effective, closed-loop anchor attachment, the embodiments match the larger anchor capacity and physical robustness in construction of the more conventional and widely used open style S-hooks and J-hooks-without incurring the structural vulnerability of a gated carabiner.

Another, and perhaps less obvious aspect of the embodiments described herein, is the commonality in appearance with the generic S-hook. While serving the equivalent function of the S-hook, the user will immediately recognize the familiarity in design and use, while also recognizing the additional security incorporated into the embodiment attachment scheme.

The embodiments described herein also offer a means for secure anchor attachment when the strap is routed around a large diameter anchor location that requires the embodiment to reengage with the strap itself rather than with the fixed anchor. This is accomplished without incorporating either an additional loop or D-ring into the strap, and without risking disengagement of the embodiment from the strap when the strap is in a slack condition. Additionally, the structural integrity and load bearing capacity of the embodiment will not be compromised when configured in this manner.

Additionally, the embodiments can be configured to function as static pulleys, allowing a strap undergoing tensioning to contact and move past the load bearing surfaces of the embodiments without compromising either the strap or the embodiment surfaces.

In one embodiment, an attachment device includes a first hook and a second hook, the first and second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook. In one alternative, the first and second hook rotate between the first and second position. Alternatively, the attachment device further includes a housing, the housing interconnecting the first and second hook and providing a mechanism for a biasing force, the biasing force biasing the first and second hook towards each other. In another alternative, the attachment device further includes a first spring located in the housing, the first spring providing the biasing force. In another alternative, the attachment device further includes a center wall, the center wall located in the housing, the first spring pressing against the housing and the first hook in order to bias the first hook. In another alternative, the attachment device further includes a second spring located in the housing, the second spring pressing against the housing and the second hook in order to bias the second hook. Alternatively, the first hook has a first opening and the second hook has a second opening and the first hook has a straight base and the second hook has a straight base. In another alternative, the first and second hook lie flat against each other in the second position, such that first curved end is aligned with the second curved end and the first opening is open in an opposite direction from the second opening. Alternatively, a portion of each of the first and second hook have a j-shape and in the second position the first and second hook lie flat on each other such that the j-shape of the first hook is superimposed over the j-shape of the second hook and the first opening is open in an opposite direction from the second opening. In another alternative, the housing includes a gap, the gap sized for receiving and securing a flat strap. Alternatively, the first hook includes a first bottom leg, the first bottom leg in the housing and the second hook includes a second bottom leg, the second bottom leg in the housing. In another alternative, the first and second bottom leg are each a straight leg that opposes the first and second curved end respectively. Alternatively, the first bottom leg includes a first central swage, the first central swage oriented to press against the first spring to create the biasing force respective to the first hook. In another alternative, the second bottom leg includes a second central swage, the second central swage oriented to press against the second spring to create the biasing force respective to the second hook. Alternatively, the first and second spring are flat springs. In another alternative, the first bottom leg includes a third swage and the second bottom leg includes a fourth swage, the third swage in a first notch in the housing, the first notch limiting the rotation of the first hook and the fourth swage in a second notch in the housing, the second notch limiting the rotation of the second hook. Alternatively, the first and second hook rotate about the first and second bottom leg respectively between the first and second position.

In one embodiment, an attachment apparatus includes a first hook and a second hook, the first and second hook, the first and second hook biased towards each other and interconnected with each other, such the first and second hook have a first position, where a first curved end of the first hook is separated from a second curved end of the second hook and a second position, where a portion of each of the first and second hook have a j-shape and in the second position the first and second hook lie flat on each other such that the j-shape of the first hook is superimposed over the j-shape of the second hook and a first opening is open in an opposite direction from a second opening. In one alternative, the first hook has a straight base and the second hook has a straight base.

In one embodiment, a method of operating an attachment device includes providing an attachment device including a first hook and a second hook, the first and second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook. The method further includes pushing the first and second curved end, in the second position, against a connection point. The method further includes flexing the first and second curved end into the first position via the pushing. The method further includes twisting the attachment device to release return the first and second hook to the second position. Alternatively, the method includes the first hook has a first opening and the second hook has a second opening and the first hook has a straight base and the second hook has a straight base and a portion of each of the first and second hook have a j-shape and in the second position the first and second hook lie flat on each other such that the j-shape of the first hook is superimposed over the j-shape of the second hook and the first opening is open in an opposite direction from the second opening.

In one embodiment, a slide for securing a flat strap includes a body section, the body section sized to receive the flat strap. The slide further includes a ridge, the ridge on the body section. The slide further includes a first and second overhang on either side of the ridge and opposing the ridge such that the first and second overhang cooperate with the ridge to impart friction to the flat strap and prevent removal. Alternatively, the overhangs fold over like an upside-down G-shape in relation to the ridge. In another alternative, the overhangs are knobbed. Alternatively, the overhangs and the ridge intersect on an imaginary line running across the device. In another alternative, a void is included on either side of the ridge, such that the flat strap is foldable down into the void for loading and unloading. Alternatively, the ridge is raised in respect to the voids and a bottom edge of the slide. In another alternative, when two sections of the flat strap are in the slide fiction of the knobbed overhangs and ridge against the flat strap prevent removal. Alternatively, as tension is applied to the flat strap, the flat strap tends to flatten, providing force against the first and second overhangs and the ridge which translates to friction against removal. In another alternative, the slide includes an opening between the first and second overhangs. Alternatively, the opening is aligned with the ridge. Alternatively, the flat strap is loadable through the opening by folding the flat strap and sliding edges of the flat strap into the voids on either side of the ridge.

In one embodiment, a slide for securing a flat strap includes a body section, the body section sized to receive the flat strap. The slide further includes a ridge, the ridge on the body section. The slide further includes a first and second overhang on either side of the ridge and opposing the ridge such that the first and second overhang cooperate with the ridge to impart friction to the flat strap and prevent removal, wherein the overhangs fold over like an upside-down G-shape in relation to the ridge and the overhangs are knobbed. Alternatively, the overhangs and the ridge intersect on an imaginary line running across the device. In another alternative, the overhangs and the ridge extend towards each other nearing an imaginary line running across the device. Alternatively, the overhangs and the ridge extend towards each other passing beyond an imaginary line running across the device.

In one embodiment, a method of using a slide includes providing a slide, the slide including a body section, the body section sized to receive the flat strap; a ridge, the ridge on the body section; and a first and second overhang on either side of the ridge and opposing the ridge such that the first and second overhang cooperate with the ridge to impart friction to the flat strap and prevent removal, wherein the overhangs fold over like an upside-down G-shape in relation to the ridge and the overhangs are knobbed. The method further includes folding a first section of a flat strap. The method further includes inserting the first section of the flat strap through an opening between the first and second overhangs. Optionally, the method further includes folding a second section of the flat strap and inserting the second section of the flat strap through an opening between the first and second overhangs. Alternatively, the method further includes pulling of the flat strap; flattening the flat strap as a result of the pulling; and providing force against the first and second overhangs and the ridge which translates to friction against removal as a result of the flattening. Alternatively, the method further includes folding the second section of the flat strap and removing second section of the flat strap through the opening. Alternatively, the method further includes folding the first section of the flat strap and removing first section of the flat strap through the opening.

Some of the embodiments described herein enable a removably secure means to dress excess strap exiting a strap tensioning device. Additionally, the embodiments could be used to bundle a strap with a tensioning device for storage purposes. Additionally, the embodiments could be utilized to manage excess webbing extending from cinch style buckles used on backpack straps and over-shoulder carry bag straps.

Certain terminology is used herein for convenience only and is not to be taken as a limitation on the embodiments of the systems and methods for a strap organizing device. In many embodiments, the strap organizing device includes a frame and a length of elastomeric cord secured to the frame. In some embodiments the elastomeric cord is secured to the frame by means of narrow slots incorporated into the frame that compress and hold the elastomeric cord. In some embodiments the elastomeric cord is routed along a serpentine path encountering narrow slots along the path that removably secure the elastomeric cord in the frame. In some embodiments the ends of the elastomeric cords are terminated with metal brads permanently securing the elastomeric cord in the frame.

Unlike the Tether Boner strap organizer, the embodiments described herein can be pre-installed on straps used with strap tensioning devices, held in place without requiring further assistance on the user's part. Unlike the ITW Dominator, securing the embodiment on a strap can be easily and frequently executed in a simple and direct manner.

Unlike either the ITW Dominator or the Tether Bone strap organizer, the elastomeric cord employed in the embodiments described herein can be wrapped around a bundle of excess webbing in increments of 180 degrees, starting at 180 degrees and extending through 360 degrees, 540 degrees, 720 degrees, etc. In doing so, the binding tension of the elastomeric cord holding the bundled webbing can be adjusted accordingly to the need at hand. Additionally, large differences in excess webbing length can be easily accommodated by the number of wraps executed. This is very important in that several inches or several feet of excess webbing can be accommodated by the embodiment without sacrificing the integrity of the holding force of the elastomeric cord. This is equally applicable when bundling straps and tensioning devices for storage.

Additionally, the embodiments described herein utilize a simple loop in an elastomeric cord to engage with the embodiment frame in securing excess webbing, thus eliminating the unsightly knots of the ITW Dominator and Tether Bone designs whose cord ends are predisposed to fraying. This creates a well-dressed appearance of the embodiment that is also less prone to snagging and inadvertent release of the elastomeric cord.

Finally, the small footprint of the embodiment relative to the strap width affords a user ample opportunity in selecting a convenient location for placement of the embodiment on the strap.

The embodiments described herein incorporate single strap construction that support multiple configurations. Hooks of various styles and construction can be selectively and conveniently added to (or removed from) the embodiments, thus serving multiple applications.

Additionally, the embodiments contain end-loops which are created by a sewing operation localized to one area of the embodiment.

Additionally, the embodiments will function in a manner similar to straps terminated with a single sewn end-loop, without requiring additional modifications to function in said manner.

Additionally, either the larger end-loop or the smaller end-loop of the embodiments can be used to affix a hook or equivalent hardware to the embodiment.

Additionally, the embodiments allow the smaller end-loop to be used in the manner equivalent to current art straps that incorporate a secondary sewn-on loop, without requiring the additional manufacturing steps to incorporate such a secondary loop into the embodiment.

Additionally, the embodiments enable the same functionality of current art straps which have sewn-on hooks while minimizing the limitations inherent in current art straps.

The embodiments, utilizing the double end-loop arrangement integrated into the single strap construction, benefit from the synergy in using both end-loops together to enable a multiplicity of useful, safe, and convenient strap configurations.

In one embodiment, a webbing includes a length of webbing. The webbing further includes a first loop formed at a first end of the length of webbing. The webbing further includes a second loop, formed near the first end of the length of webbing, further towards a central portion of the length of webbing and distal form a second end of the length of webbing. In one alternative, the first loop is proximal to the second loop, such that the first loop is wrappable around a fixed point and connectable via a carabiner to the second loop.

In one embodiment, a strap organizer includes a frame, the frame shaped to receive a flat strap. The strap organizer further includes a cord, the cord interconnected with the frame in order to hold the flat strap to the frame. Alternatively, the strap organizer further includes a blade section oriented on the frame. The strap organizer further includes a first arm section oriented on the frame and a second arm section oriented on the frame. The blade section and the first arm section and the second arm section cooperate to hold the flat strap. In one alternative, the strap organizer further includes a first end tab on an opposite end of the blade section from the first arm section and the second arm section. The strap organizer further includes a second end tab on the opposite end of the blade section from the first arm section and the second arm section. The strap organizer further includes the first arm section and the second arm section opposing the first end tab and the second end tab, such that a slot is formed to receive the flat strap. In another alternative, the strap organizer further includes a plurality of slots, the plurality of slows located on the frame, the plurality of slots holding the cord, such that the cord is wrappable around the frame when the flat strap is received by the strap organizer, thereby holding the flat strap in place.

In one embodiment, an attachment device includes a first hook and a second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook, wherein the first and second hook pivot between the first and second position. The attachment device further includes a housing, the housing interconnecting the first and second hook and providing a mechanism for a biasing force, the biasing force biasing the first and second hook towards each other. The attachment device further includes a first spring located in the housing, the first spring providing the biasing force. The attachment device further includes a center wall, the center wall located in the housing, the first spring pressing against the housing and the first hook in order to bias the first hook and the second hook. Alternatively, the first hook and the second hook extend into the housing. In one alternative, the first curved end has an arced shape in a first plane and the second curved end has an arced shape in a second plane. In another alternative, a first bottom portion of the first hook that extends into the housing is in a third plane, the third plane at an angle to the first plane and a second bottom portion of the second hook that extends into the housing is in a fourth plane, the third plane at an angle to the second plane. Alternatively, the first plane and the second plane are parallel to a fifth plane of the center wall in the second position. In another alternative, the third plane and the fourth plane flare away from the fifth plane in the second position. Alternatively, the first plane and the second plane flare away from the fifth plane in the first position. In another alternative, the third plane and the fourth plane are parallel to the fifth plane in the first position. Alternatively, a first portion of the spring is in a sixth plane parallel to the third plane, and the first portion of the spring rests against the first bottom portion. In another alternative, a second portion of the spring is in a seventh plane parallel to the third plane, and the second portion of the spring rests against the second bottom portion. Alternatively, in the second position, the sixth plane and the seventh plane of the spring are pressed towards a parallel position to the fifth plane of the center wall. In another alternative, the first hook and the second hook each have a flat rectangular cross section. Alternatively, the first hook and the second hook include a first arced portion with a first end and a second arced portion with a second end, and the first arced portion includes a first center area and the second arced portion includes a second center area, the first center area being an area distal from the first end at the midpoint area of the first arced portion, the first hook having an first upturned portion at the first center area and the second hook having a second upturned portion at the second center area, the first upturned area and the second upturned area cooperating to form a first wedge in the second position, the first wedge assisting separation of the first and second hook when an object is pushed against the first wedge. In another alternative, the first end has a second upturned area and the second end has a third upturned area. Alternatively, in the second position, the second upturned area flares away from the second hook. In another alternative, the second position, the third upturned area flares away from the first hook.

BRIEF DESCRIPTION OF THE DRAWINGS

FIG. 12a, FIG. 12b, FIG. 12c show isometric views depicting an alternative embodiment of an attachment device where two flat springs from the attachment device are replaced with a single U-shaped spring, and the position of both hooks in the attachment device are influenced by the U-shaped spring, with FIG. 12b is a cut away view of FIG. 12a;

FIG. 13a, FIG. 13b, and FIG. 13c show isometric views depicting an alternative embodiment where two flat springs from the attachment device are replaced with a single torsion spring, and the position of both hooks in the embodiment are influenced by the torsion spring, with FIG. 13b is a cut away view of FIG. 13a;

FIGS. 25a-25d shows a sequence of isometric views depicting a progression to attach the strap organizer 2100 onto a section of webbing, while FIG. 25d provides an additional view of the final figure in the sequence;

FIGS. 30a-30d Prior Art shows a sequence of isometric views depicting a progression to attach a Prior Art Molle component (ITW Dominator) to a section of webbing and subsequently securing the knotted end of an elastomeric cord to the frame of the Molle component; FIG. 30d indicates the inability of the device to secure the elastomer cord beyond the approximate 180 degree span shown in FIG. 30c;

FIGS. 31a-31d Prior Art shows a sequence of isometric views depicting a progression using a Prior Art device (ProGrip Tether Bone) to securely bundle a coiled length of webbing;

FIG. 32, Prior Art shows an isometric view of the Prior Art device (ProGrip Tether Bone) configured on the strap of a generic camlock device securely bundling excess webbing extending from the strap tensioning device;

FIG. 40 shows an isometric view of an alternative embodiment containing a stitching pattern different from the stitching pattern shown for the Looped Webbing of FIG. 37 in FIG. 39;

FIG. 41 shows an isometric view of an alternative embodiment containing a stitching pattern different from the stitching pattern shown for the Looped Webbing of FIG. 37 in FIG. 39;

FIGS. 43a-43d show a sequence of isometric views depicting the attachment of the Looped Webbing of FIG. 37 to a loop style anchor by means of a gated carabiner secured to the larger of the two loops of the Looped Webbing;

DETAILED DESCRIPTION

Figure 1:
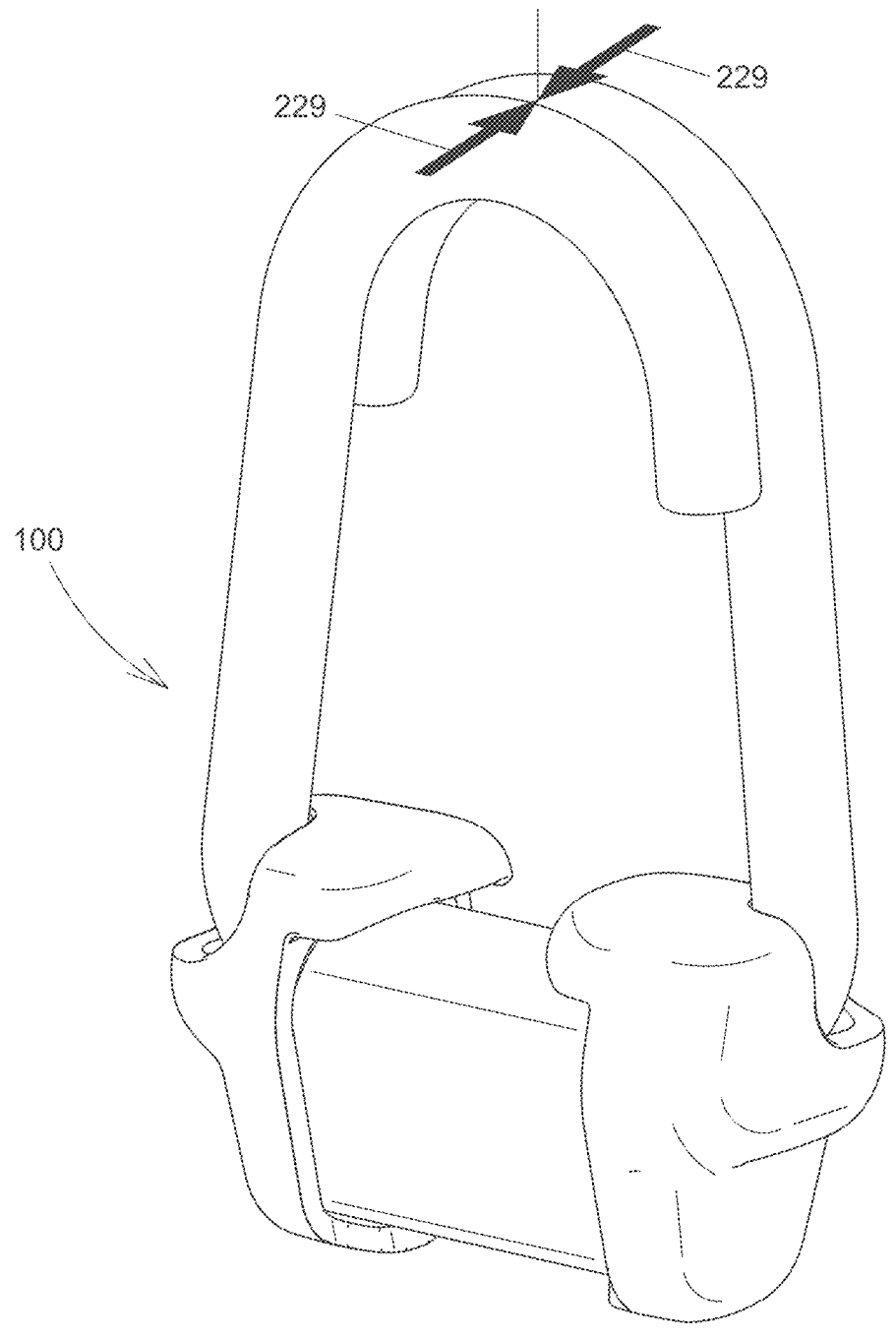
FIG. 1 shows an isometric view of one embodiment of an attachment device 100, hooks closed.
Figure 2:
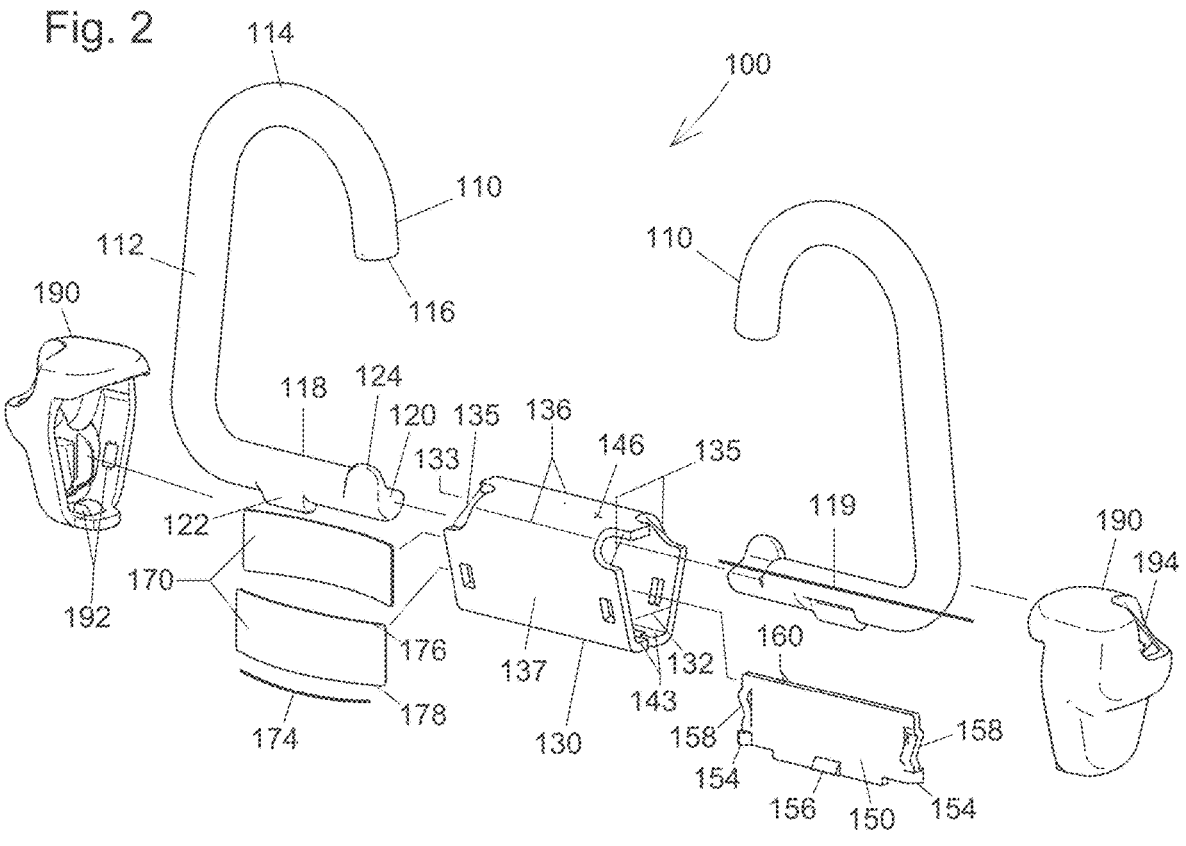
FIG. 2 shows an exploded isometric view of the attachment device of FIG. 1.
Figure 3:
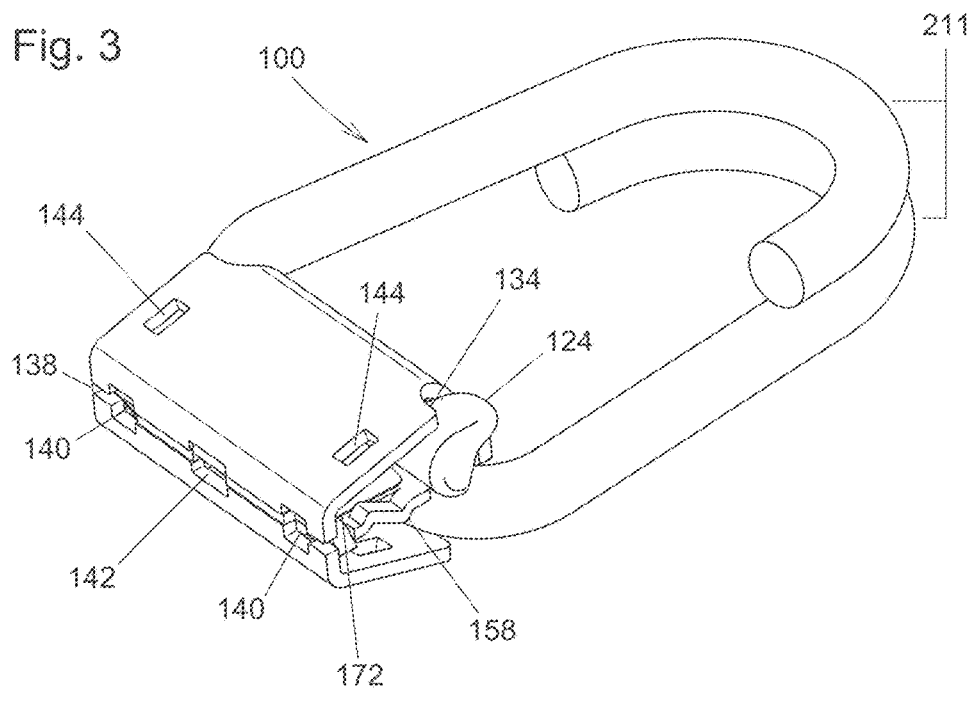
FIG. 3 shows an isometric view of the attachment device of FIG. 1, hooks closed, end caps not shown.
Figure 4:
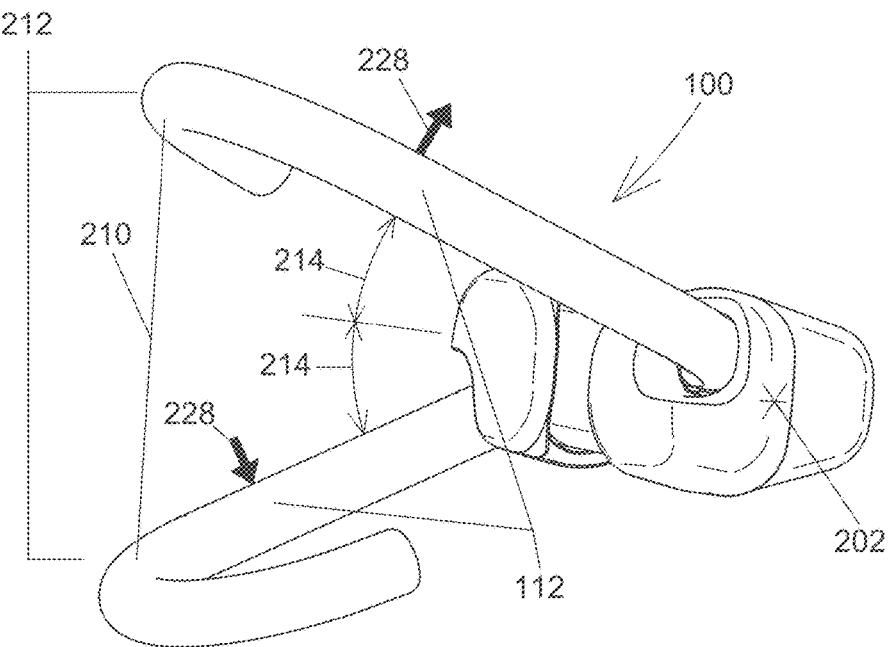
FIG. 4 shows an isometric view of the attachment device of FIG. 1, hooks open.

Many embodiments of multiple devices for use in tensioning are described here, including, but not limited to, attachment devices, strap organizers, looped webbing, and slides. The scope of these innovations and devices is governed by the claims presented herein. Herein, many attachment devices, strap organizers, looped webbing, and slides are described with specificity, however modifications and alternatives thereof are included herein. Additionally, these devices may find synergy when operating together and may have additional benefits and novelty collectively.

DRAWING REFERENCE NUMERALS FOR ATTACHMENT DEVICES

100 an embodiment of an attachment device
110 hook
112 hook stem
114 hook apex
116 hook end
118 hook bottom leg
119 axis defined by the hook bottom leg
120 hook bottom leg end
122 hook bottom leg center swage
124 hook bottom leg end swage
130 housing
132 first end opening
133 second end opening
134 edge
135 housing cutout
136 housing fold radius
137 housing side wall
138 housing bottom gap
140 housing bottom end void 142 housing bottom center void
143 inside surface of housing bottom
144 rectangular opening
146 housing top surface
150 center wall
154 center wall bottom edge end tab
156 center wall bottom edge middle tab
158 center wall side edge semi-pierce
160 center wall top edge
170 flat spring
172 flat spring end
174 flat spring preformed curvature
176 flat spring top edge
178 flat spring bottom edge
190 end cap
192 end cap protrusion
194 end cap opening
196 gap, end cap to housing
198 overhang, end cap
200 gap, between end caps
202 finger grip area, end cap
210 gap, between open hooks
211 hooks, closed position
212 hooks, open position
214 hook rotation
215 area between end caps and closed hooks
228 motive force
229 force direction
230 force direction
232 center axis
240 strap
241 prior art, sewn-loop at the end of a strap
242 prior art, sewn-loop along a strap
250 anchor location, welded loop
251 anchor location, round bar section
252 anchor location, large diameter
260 prior art, single strap generic camlock device
262 prior art, S-hook strap
264 prior art, J-hook strap
266 prior art, carabiner
268 prior art, D-shaped ring
400 alternative embodiment
401 U-shaped spring
402 center wall
500 alternative embodiment
501 torsion spring
502 center wall Certain terminology is used herein for convenience only and is not to be taken as a limitation on the embodiments of the systems and methods for a dual hook flat strap attachment device (referred to commonly as an attachment device). In many embodiments, the attachment device includes two hooks that are biased towards each other. The hooks move in a rotational direction away from each other, initially tangent to the plane of the hook. The hooks are biased towards each other via a flat spring system, where the base of each hook presses against a spring braced by a central portion. This mechanism may be contained in a central body or housing. In some alternatives, the central portion maybe omitted, and a single spring may be positioned in a central portion of a housing. In some embodiments, a double-sided folded flat spring may be used.

In FIG. 1 through FIG. 5, attachment device 100 (an example of a an embodiment) is comprised of five unique parts, three of the parts are used twice in the attachment device. Thus, where two flat springs are used, the attachment device 100 includes eight parts in total.

The parts are referenced as: hook 110 (quantity 2), housing 130, center wall 150, flat-spring 170 (quantity 2), and end cap 190 (quantity 2).

The housing 130 serves as a foundation part of the attachment device 100. In many configurations, the other parts that make up the attachment device, interface with, and are constrained by, the housing in some manner. The hook 110 is c-shaped, the bottom leg 118 of the hook is straight and contains two swage details, the bottom leg center swage 122, and the bottom leg end swage 124. Various alternative shapes may be used for the hook. In many scenarios, it is important to include the bottom straight leg of the hook to provide for rotation of the hooks, however, even here alternatives are possible. Additionally, although the swage is used in many scenarios, the idea of the swage is to provide a mechanism for the spring to press against in order to provide rotational force. Many alternatives are possible for the swage detail, including but not limited to, a pin or peg passing though the leg for the spring to push on, a cutout or other modification of shape of the leg, a bend in the leg, or a variety of other configurations. Two hooks 110 are constrained within the housing, held in opposition to each other, and in contact with each other when in a closed position 211. The center wall 150 is positioned lengthwise within the housing, held in position by the housing bottom gap 138, and by multiple interlocking details 154, 156 incorporated into the bottom edge of center wall. The top edges 160 of the center wall 150 assist in holding the hooks 110 in position within the housing 130. The flat spring 170 is rectangular in shape, preformed into a curve, the curve oriented along the length of the part. Two flat springs 170 are utilized in the attachment device 100, and are positioned on opposite sides of the center wall 150. The flat springs 170 provide the motive force that normally biases the two hooks 110 to maintain a closed position 211. Finally, two end caps 190 press fit onto the open ends 132, 133 of the housing 130, providing ancillary protection in case of any contact events, and to enhance the cosmetic appearance of the attachment device 100. The end caps 190 also encapsulate the lower portions of the hooks 110 without inhibiting rotational displacement of said hooks. In some embodiments, the flat springs may be replaced by coiled springs. In alternatives, the center wall may be removed and simply a coil spring may be used or a double-sided folded flat spring. Although in the various embodiments shown, curved hooks are shown, the ends of the hooks need not be curved and may be squared, triangular, or take some other shape. The point of the hooks is to have an area that may overlap with the other hook when the two are aligned and a hook stem on either side. Furthermore, the housings on either end may be modified to take other forms or omitted. In many embodiments, the device includes a housing having side walls and a mechanism to retain the bottom leg of the hooks in the housing such that they may press against the spring or springs and therefore be biased towards each other.

To assemble the attachment device 100, each hook 110 slides into the housing 130 from opposing ends 132, 133 of the housing. The center wall 150 then slides into the housing 130, holding the hooks 110 in position. A top edge 160 of the center wall presses into the hook leg 118 on each hook 110, holding the hook legs in concentric orientations with respect to the fold radii 136 formed between the housing top surface 146 and the housing side walls 137. The swage 124 located at the end 120 of the hook bottom leg 118 is constrained by a cut-out 135 in each end opening 132, 133 of the housing 130. The cut-out 135 in each end opening 132, 133, in conjunction with the top edges 160 of the center wall prevent the hooks from being dislodged from the housing whenever force oriented outwards 230 is applied to either hook stem 112. The center wall 150 is held captive, end-to-end with respect to the housing, by the means of an interlocking action between the center wall bottom edge middle tab 156 and the housing bottom center void 142. Center wall bottom edge end tabs 154 press against the inside surface of the housing bottom 143, while concurrently, the top edges 160 of the center wall press against each respective hook leg 118 to hold the center wall 150 in position, top-to-bottom with respect to the housing 130. Insertion of the center wall into the housing will cause the housing sidewalls 137 to momentarily spread apart with respect to each other until the center wall 150 moves to its final position. Upon the correct positioning of the center wall 150, the housing side walls 137 will spring back to their original position, holding the center wall in the position described above.

A first flat spring 170 slides into the housing 130 through one of the end openings 132, 133 such that the top edge 176 of the flat spring presses against the hook leg center swage 122 while each end 172 of the flat spring presses against the center wall 150, resulting in the hook leg center swage being pressed outward away from the center wall. The bottom edge 178 of the flat spring presses into the fold formed between the housing side wall 137 and the inside surface of the housing bottom 143. The flat spring 170 slides into the housing 130 until each end 172 of the flat spring is bounded by an interior surface of the semi-pierces 158 located on the ends of the center wall.

A second flat spring 170 slides into the housing 130 through one of the end openings 132, 133 on the side of the center wall 150 opposite from the first flat spring 170, in a manner similar to that of the first flat spring. When both flat springs 170 are properly positioned, the apex 114 on each hook 110 will press inward 229 (FIG. 1) forcing the hooks into contact with each other, thus biasing the hooks to a closed position 211.

The flat spring 170 is fabricated from flat sheet spring steel—hence its designation as a flat spring. However, upon fabrication, the flat spring is preformed into a curved shape 174. The magnitude of force pressing the two hooks together can be specifically tuned by varying the amount of preformed curvature 174 and/or the thickness of the material used to fabricate the flat spring 170. Increasing the amount of preformed curvature 174, or increasing the material thickness of the flat spring will increase the force with which each hook presses against the other. Additionally, varying the length, thickness, or material the spring is formed out of may vary the strength.

Each hook 110 can be independently rotated 214, outward away from its contact point with the other hook, to an open position 212 by applying a motive force 228 to the hook stem 112. Hook rotation 214 occurs about the axis 119 defined by the hook's bottom leg 118. Edges 134, formed by cutouts 135 in the housing 130, limit the rotational travel of each hook 110. Each hook 110, independent of the other, will return to a closed position 211 whenever the motive force 228 holding the hook open is removed from that hook's hook stem 112.

End caps 190 are attached to the housing 130 by placing the opening 194 in the end cap onto the hook end 116 of each hook 110. The end caps 190 are then pushed onto the hooks 110, moving around the curved portion of the hooks until the end caps are brought into position facing the end openings 132, 133 of the housing 130. The end caps are pressed into place on the housing. Protrusions 192 located on the interior walls of the end caps 190 engage with rectangular openings

144 in the housing sidewalls 137 and with the voids 140 present on the bottom of the housing. Once the protrusions 192 on each end cap 190 fully engage with the openings 144 in the housing side walls 137 and the housing bottom 140, the end caps lock into place. In some configurations, like the one presently discussed, the end caps cannot be removed from the housing 130 without causing irreparable damage to the end caps.

While not an integral aspect of the structural integrity of the attachment device 100, each end cap 190 will also aid in holding the housing sidewalls 137 in position, thus aid in holding the center wall 150 in position, thus aid in holding the hooks 110 in position.

The end caps 190 serve multiple functions. The end caps provide a cosmetic finish to the attachment device while simultaneously preventing the attachment device from damaging other objects the embodiment may come into contact with. Additionally, the end caps help to keep debris and other objects from entering the housing 130, thus ensuring the proper operation of the hooks. Finally, the end caps provide a location 202 for the user to grasp the attachment device when securing the embodiment to a strap, or when attaching the embodiment to an anchor location, or when removing the embodiment from an anchor location.

The flat spring 170 is to be fabricated from flat spring steel and formed accordingly. The housing 130 and the center wall 150 can readily be stamped from steel sheet and die formed/die pierced to their respective shapes. The hooks 110 likewise could be fabricated from steel, either shaped directly from round stock, or blanked and forged. The materials utilized in the fabrication of any of the individual parts will be based on the performance levels required for a particular implementation of the attachment device 100.

Typical load bearing requirements of current tensioning devices used in the market place today would favor the use of steel materials as described above. However, for applications not requiring the performance levels that steel materials enable, materials such as aluminum or even molded thermoplastics could provide the same functionality for the attachment device 100.

The end cap 190 is ideally suited for fabrication utilizing a molding process, and can be molded from a variety of suitable thermoplastic materials or other materials, including, but not limited to, plastics, metal, and wood.

Operation

Many embodiments of the attachment device 100 can be used with and are sized for 1" wide webbing or strap, in a thickness range inclusive of common commercially available webbing selections. Many embodiments of the attachment device accommodate standard 1" wide tubular webbing as well. Additionally, the attachment device could be scaled in size to accommodate webbing widths both wider than 1" and narrower than 1". Also note that any reference to 1" wide webbing is generic in nature as commercially available 1" webbing can vary plus or minus a tenth of an inch or more.

The attachment device 100 is a spring-biased device utilized to secure the sewn end-loop of a strap 241 to a fixed anchor point 250, 251. Two springs 170 located internal to the housing 130 bias two identical hooks 110 toward a closed position 211. The user (or the actual specifics of the anchor location) induce the two hooks 110, set in opposition to each other, to open or spread apart as the hooks engage with the anchor location 250, 251. Upon attachment to the anchor, the opposing hooks move back to their original closed position, creating a removably secure attachment between the strap-loop 241 and the fixed anchor location 250, 251 (FIG. 7a though FIG. 7d, FIG. 8a through FIG. 8d). Note, the removably secure attachment exists independent of the strap remaining in a slack condition or undergoing tensioning by means of a tensioning device.

Figure 14:
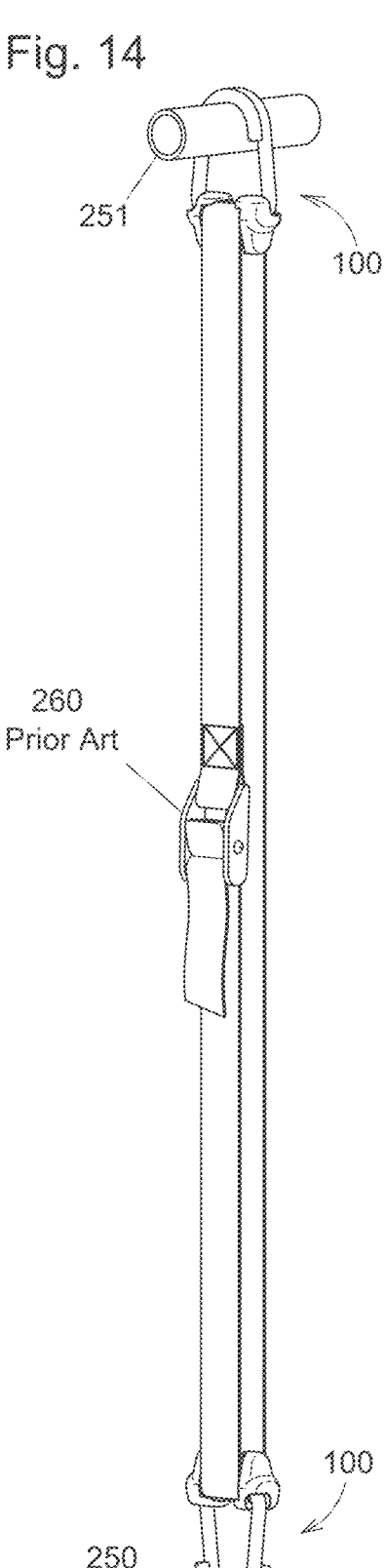
FIG. 14 shows an isometric view depicting a Prior Art single strap camlock device arranged in a fixed-end configuration that utilizes two attachment devices like those in FIG. 1, to releasably secure the strap to fixed anchor locations.

Attachment of the attachment device 100 to the strap loop 241 is accomplished by spreading the opposing hooks 110 far enough apart to allow insertion of the strap loop into the gap 210 created between the separated hooks. The strap loop 241 is then moved towards the gap 200 existing between the two end cap overhangs 198. A simple thumb pinch of the strap allows the user to insert the strap edges into the gaps 196 that exist between the housing 130 and the end cap overhangs 198 (FIG. 5, FIG. 6a through FIG. 6d). Note, that in FIGS. 6a-9d and 11a-11d the Prior Art callout refers only to the loop end (strap loop 241) specifically. In FIG. 14, the Prior Art callout refers only to the camlock device 260 specifically.

The attachment device 100 can be removably secured to a strap 240 whenever the strap contains a loop 241, 242 of sufficient size to allow insertion of the housing 130 (with attached end cap 190) into the loop. Typically, the loop 241 is located at the end of the strap. However, a loop 242 positioned anywhere along its length would suffice just as well (FIG. 11a through FIG. 11d).

Thus, the user can directly attach a strap loop 241 to a primary anchor location 251 (FIG. 18), or secure the strap loop 241 to the attachment device 100 (FIG. 6a through FIG. 6d), and then secure the attachment device 100 to the primary anchor location 250, 251 (FIG. 7a through FIG. 7d, FIG. 8a through FIG. 8d).

Figure 5:
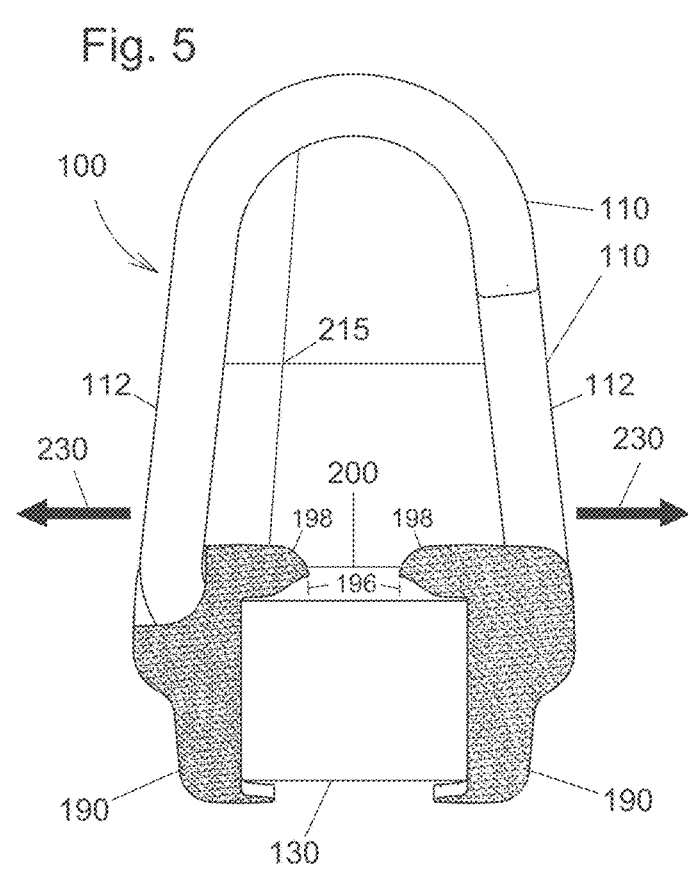
FIG. 5 shows a front view of the attachment device of FIG. 1, hooks closed.
Figures 6A, 6B, 6C, 6D:
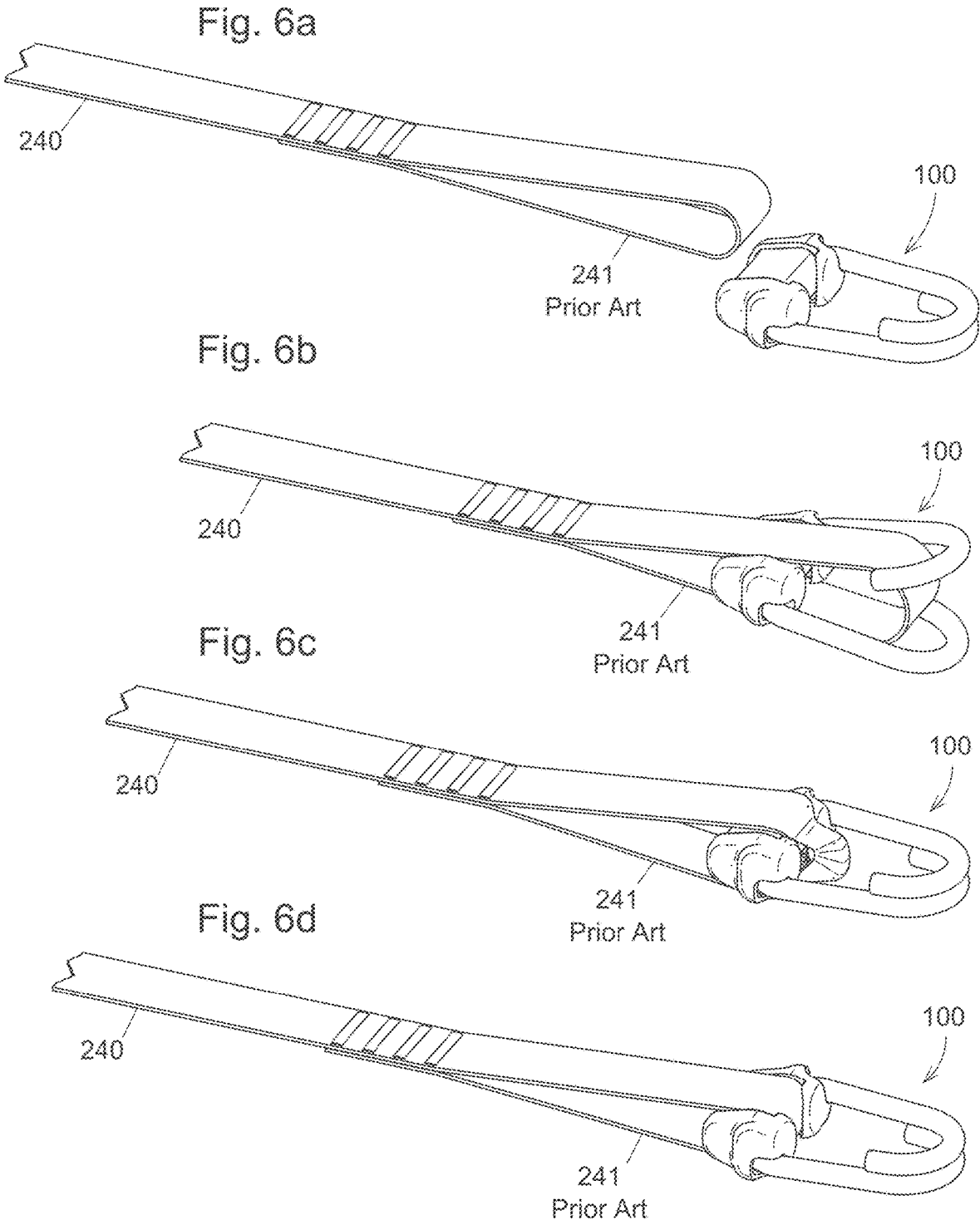
FIGS. 6*a*-6*d* shows a sequence of isometric views depicting a step wise progression attaching a sewn end loop to the attachment device of FIG. 1.

Upon insertion of the strap loop 241 into the gaps 196 between each end cap overhang 198 and the housing 130, the strap is essentially segregated from the hooks 110 and from the open area 215 existing between the two end cap overhangs 198 and the overlapping hooks 110. This protects the strap from inadvertent damage by isolating the strap from the fixed anchor to which the attachment device 100 is secured (FIG. 5).

The action of attaching the attachment device 100 to an anchor location varies depending upon the specific attributes of the anchor location 250, 251, 252. (FIGS. 7a-7d, FIGS. 8a-8d, FIGS. 9a-9d). For the most part, the attachment (and removal) of the attachment device 100 to most anchor locations is magic-trick-fast, equally matching the convenience of the open-end S-hook.

For example, FIG. 7a through FIG. 7d illustrates the action of attaching the attachment device 100 to a section of round bar 251. Simply pressing the attachment device 100 against the round bar 251 will cause the bar to begin to separate the two hooks 110 of the attachment device 100. As the attachment device is pressed further onto the bar, the hooks separate further and begin to surround the bar. Rotating the attachment device approximately 90° clockwise throughout this action will allow the two hooks to return to a closed position 211 thus completely encircling the round bar, creating a secure attachment between the attachment device and the round bar.

To release the attachment device 100 from the round bar 251, the action is reversed. The user initiates a 90° rotation of the attachment device counter-clockwise to move the hooks to an open position 212. Simultaneously, the attachment device is pulled away from the round bar and the attachment device 100 will disengage from the round bar 251.

The requirement of having to execute a compound action of pressing and rotating (to attach) or rotating and pulling (to detach) creates the secure and reliable connection. Simply pulling on the attachment device, or pulling on the strap to which the attachment device is attached, will not enable the attachment device to be detached from a fixed anchor.

Another example, FIG. 8a through FIG. 8d, illustrates the action of attaching the attachment device 100 to a metal loop 250. The process is similar to the previous example but requires slight adjustments in the action. Rather than rotating the embodiment approximately 90° along the length of the embodiment, the rotation needs to occur through the center axis 232 of the circular end portion of the hooks.

The execution of the action can be simplified further by combining the rotation action of the previous example with the rotation described is this example. The action becomes quite intuitive such that the user quickly learns how execute attachment and detachment in simple continuous movements.

The key aspect in this remains the action of executing an attachment of the attachment device to an anchor location, or the action of executing the detachment from an anchor location requires a compounding of multiple actions such that each action in isolation will not be sufficient to disengage the attachment device from a fixed anchor. Hence, the attachment of the attachment device 100 to a fixed anchor, results in a releasably secure attachment.

Furthermore, as long as tension is present in the strap while the attachment device 100 is secured to a fixed anchor, the detachment of the attachment device 100 from the fixed anchor 250, 251, 252 cannot be executed without first removing (or overpowering) the tension in the strap.

Figures 15A, 15B, 15C:
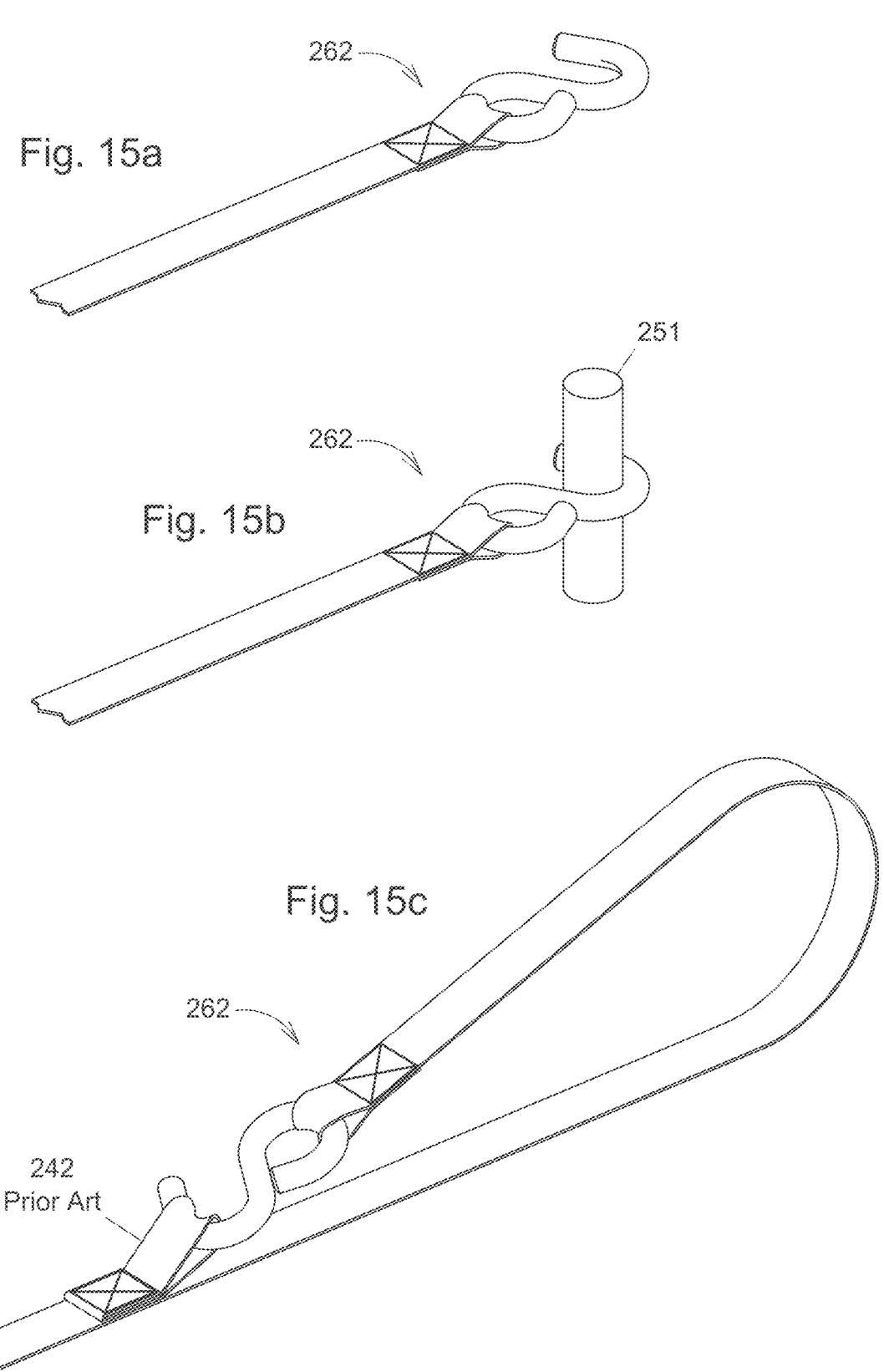
FIGS. 15a-15c Prior Art, show isometric views depicting an S-Hook strap, an S-Hook strap with the S-hook secured to a round bar section, and an S-Hook strap with the S-hook secured to a loop sewn onto the strap.
Figure 16A:
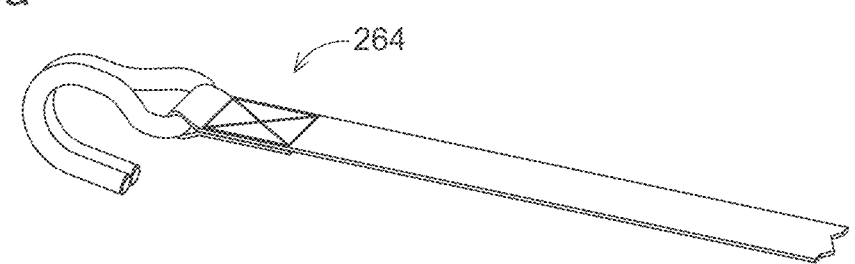
FIGS. 16a-16c Prior Art, show isometric views depicting a J-Hook strap, a J-Hook strap with the J-hook secured to a round bar section, and a J-Hook strap with the J-hook secured to a D-ring sewn onto the strap.
Figure 16B:
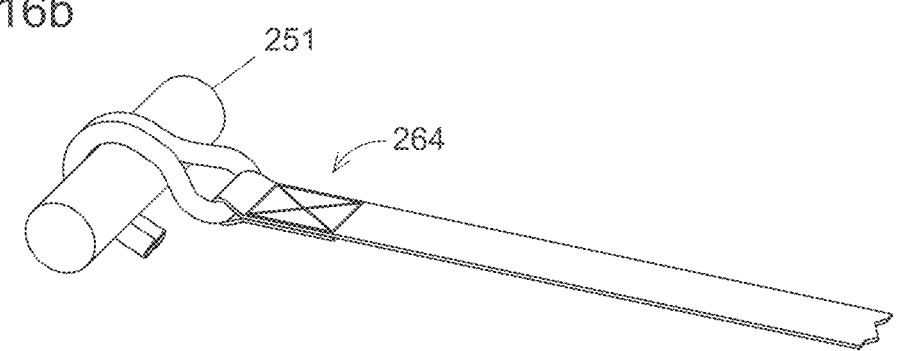
Figure 16C:
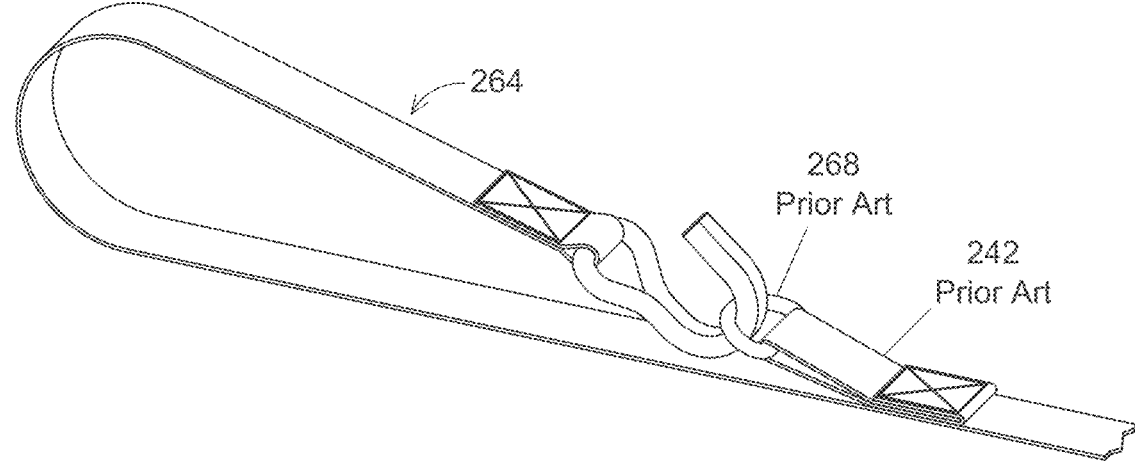
Figures 17, 18, 19:
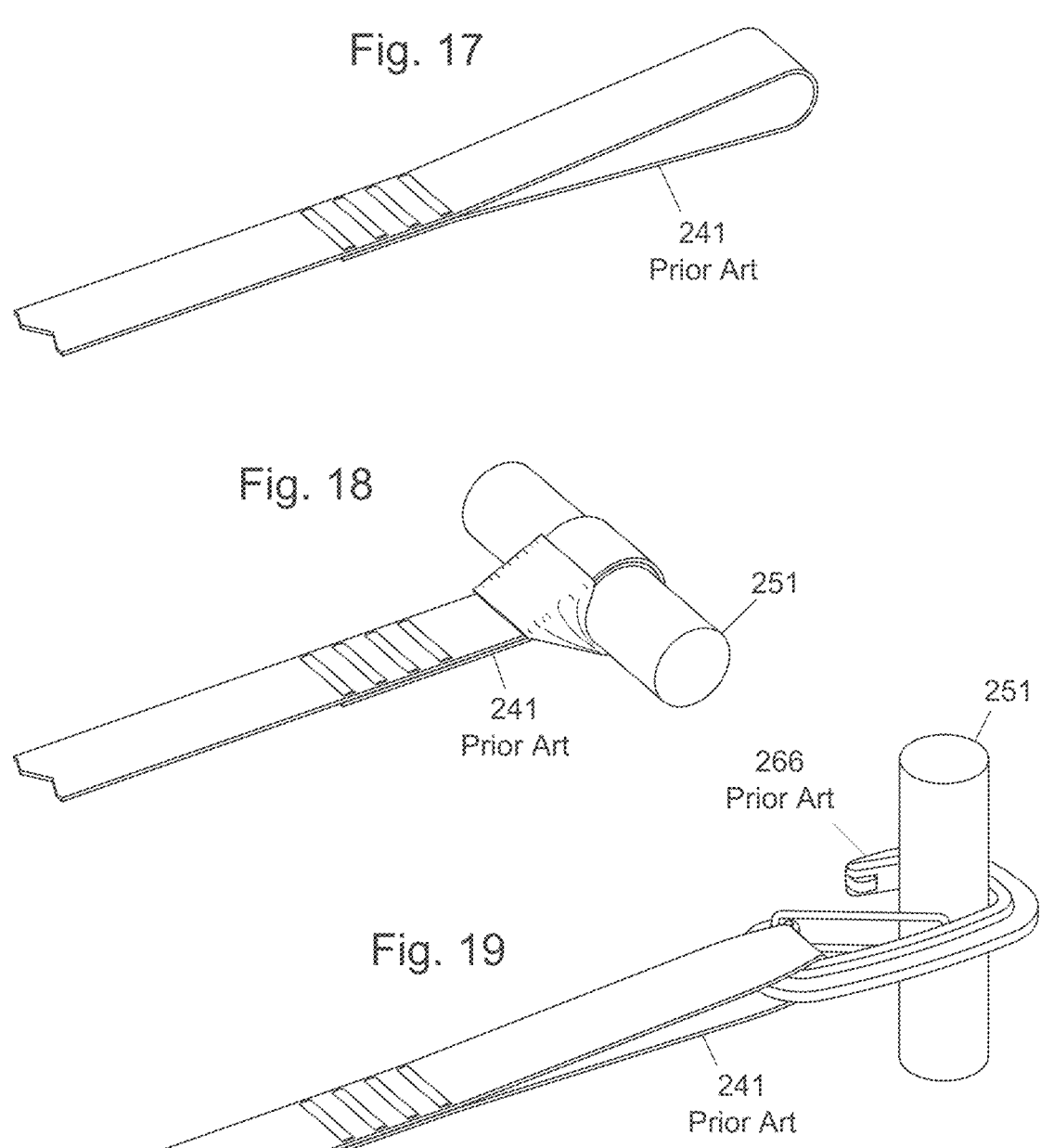
FIG. 17 Prior Art, shows an isomeric view depicting a loop sewn at the end of a strap.
FIG. 18 Prior Art, shows an isometric view depicting the loop sewn at the end of a strap from FIG. 17 secured to a round bar section using a cow hitch knot.
FIG. 19 Prior Art, shows an isometric view depicting a carabiner secured to both a round bar section, and the loop sewn at the end of a strap from FIG. 17; (Note, the locking gate of the carabiner is shown held open by the round bar section, highlighting the smaller anchor capacity of a typical carabiner when compared to an equivalent sized generic S-Hook.)
Figure 20:
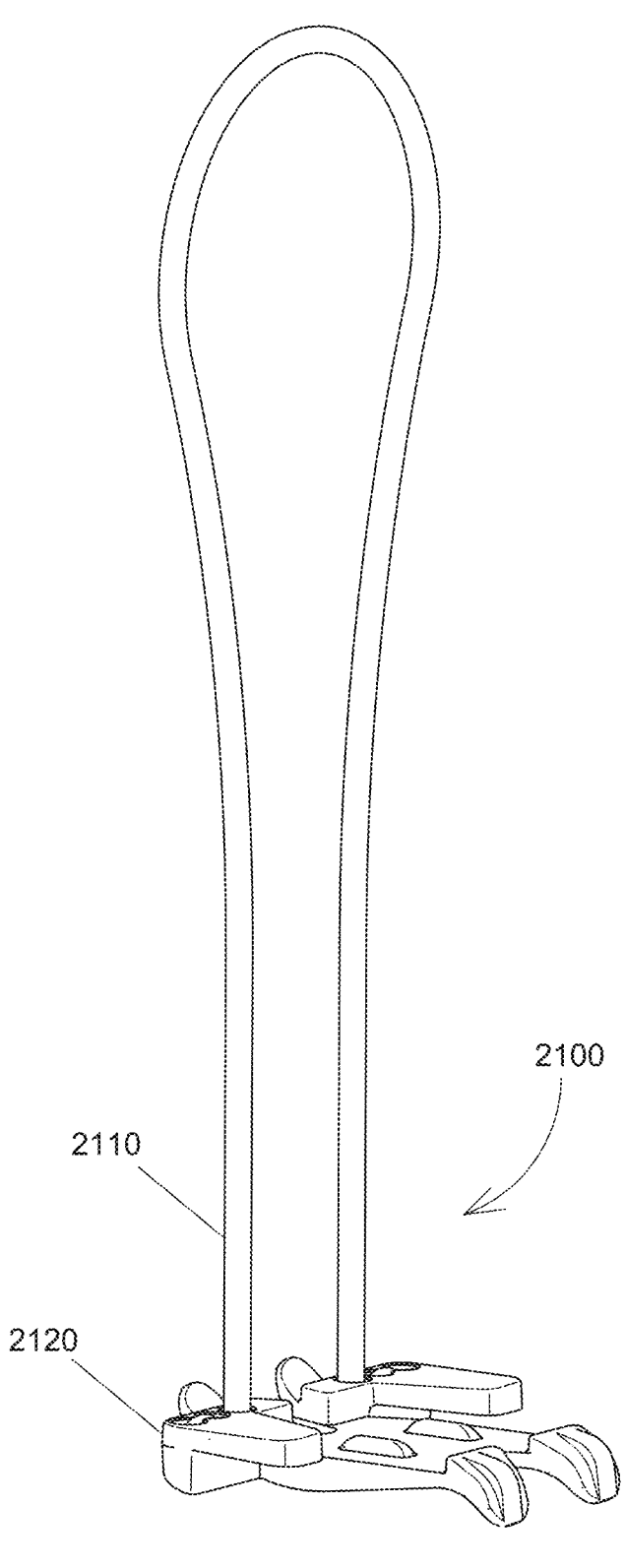
FIG. 20 shows an isometric view of one embodiment of a strap organizer 2100.
Figures 21A, 21B, 21C:
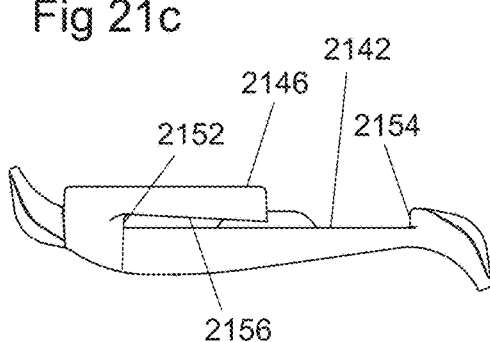
FIGS. 21a-21c shows two isometric views and a side view of the frame, one of two components that comprise the strap organizer 2100.

FIG. 9a through 9d shows a sequence of isometric views depicting a step wise progression of a strap being routed around a large diameter fixed anchor 252 where the hooks of the attachment device 100 attach along the length of the strap 240. The attachment device 100 is secured to a loop sewn at the end of the strap 241. Neither a supplemental loop 242 sewn to the strap or a secondary D-ring 268 sewn to the strap (FIG. 15c, FIG. 16c) are required to ensure a reliable hook-to-strap connection. The hook closure around the strap completely encircles the strap by means of the overlapping hooks. The symmetry in the overlapping hooks also minimizes concerns about uneven applied loading, particularly in comparison with the asymmetrical design of a carabiner/carabiner locking gate (FIG. 19).

Figures 7A, 7B, 7C, 7D:
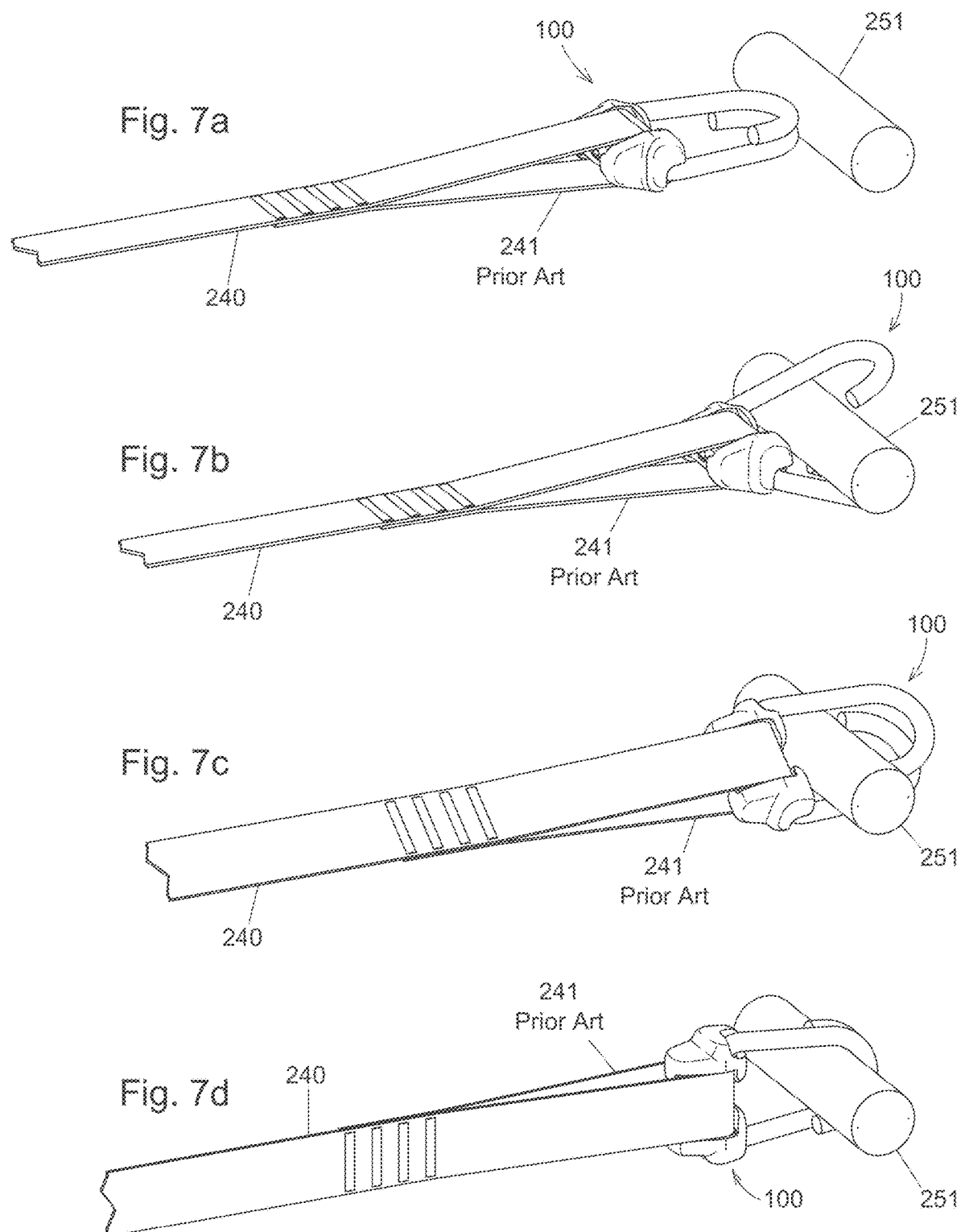
FIGS. 7a-7d shows a sequence of isometric views depicting a step wise progression of the attachment device of FIG. 1 connecting to a section of round bar, with the attachment device secured to a loop sewn at the end of a strap.
Figures 8A, 8B, 8C, 8D:
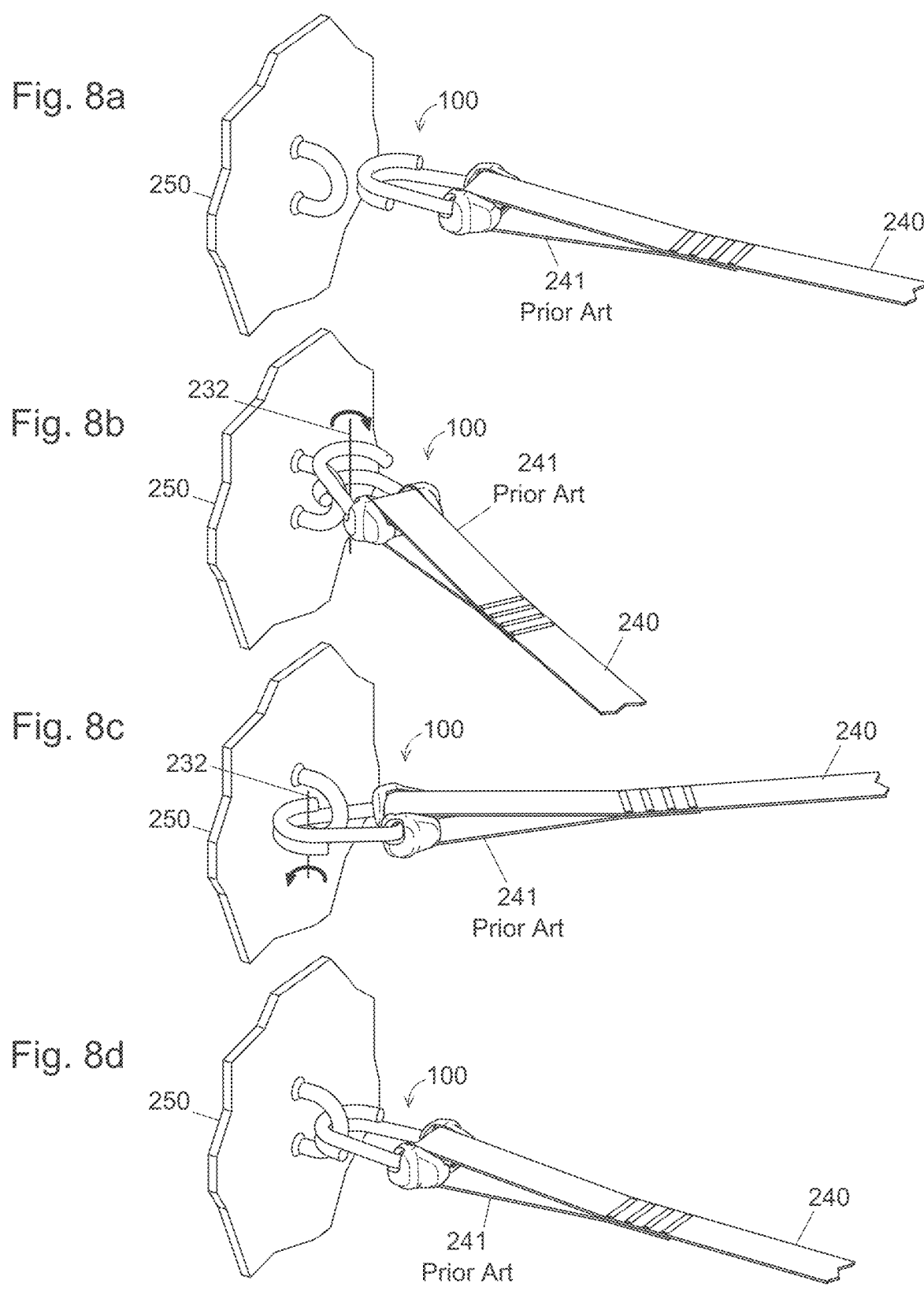
FIGS. 8a-8d shows a sequence of isometric views depicting a step wise progression of the attachment device of FIG. 1 connecting to a metal loop anchor, with the attachment device secured to a loop sewn at the end of a strap.
Figure 9A:
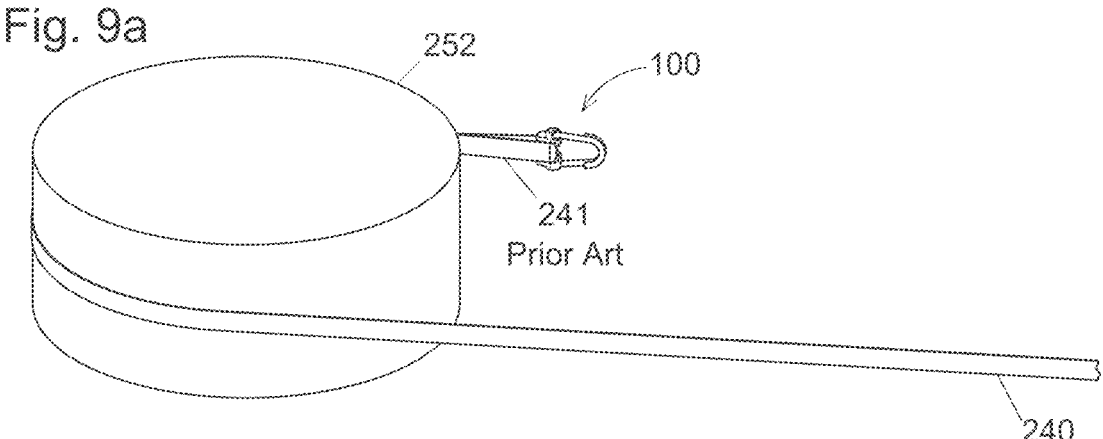
FIGS. 9a-9d shows a sequence of isometric views depicting a step wise progression of a strap being routed around a large diameter fixed anchor where hooks of the attachment device of FIG. 1, attach to the strap along its length. The attachment device is secured to a loop sewn at the end of the strap.
Figure 9B:
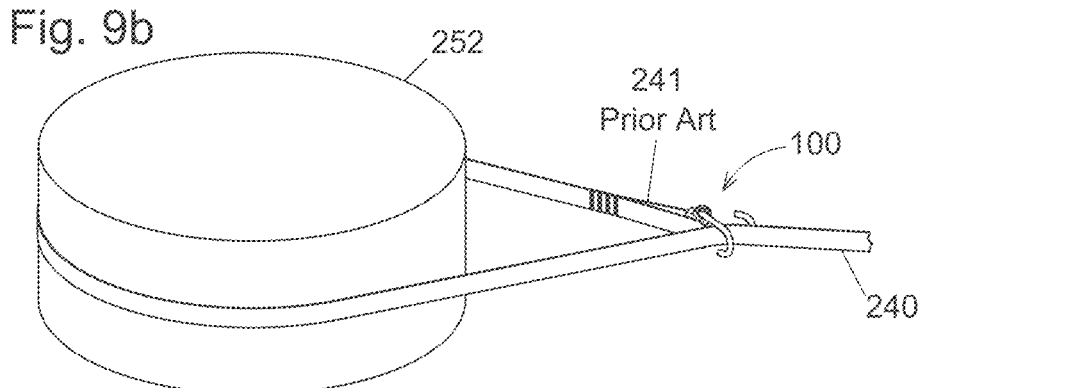
Figure 9C:
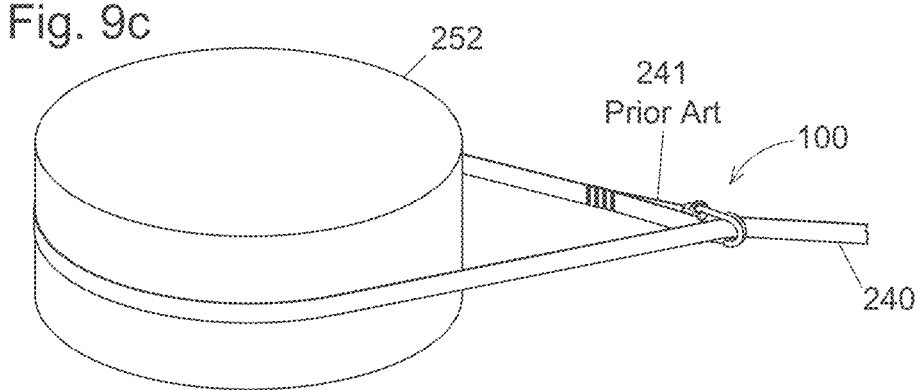
Figure 9D:
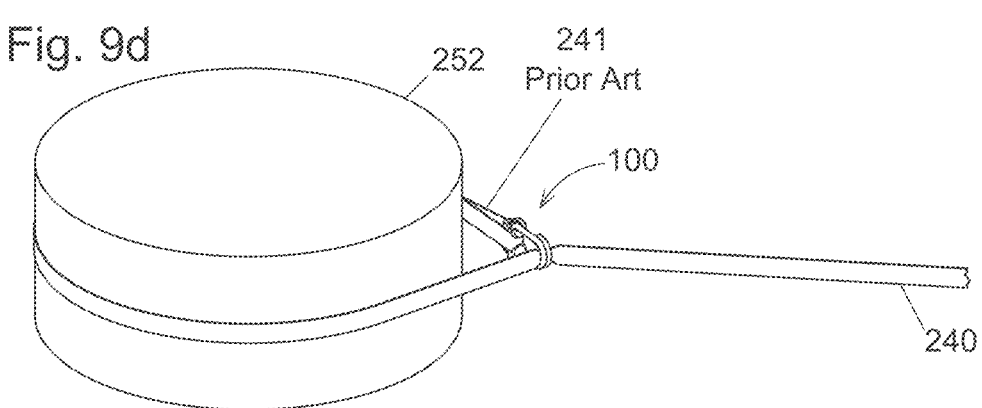
Figures 10A, 10B, 10C:
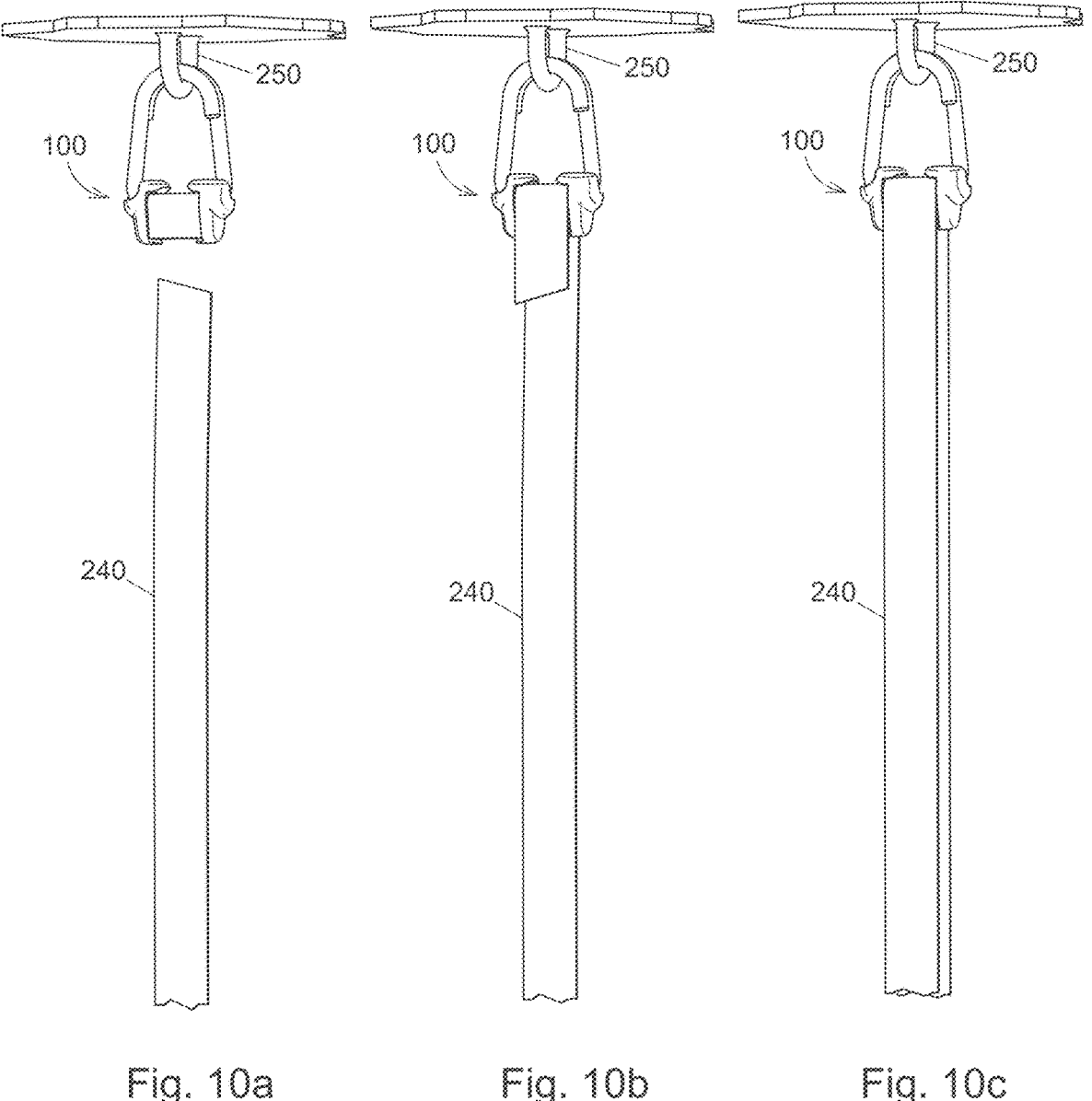
FIGS. 10a-10c show a sequence of isometric views depicting a step wise progression attaching a strap to the attachment device of FIG. 1, while secured to a loop style fixed anchor, with the configuration capable of accommodating a high amount of tension during the insertion of the strap without adversely effecting either the strap or the attachment device.
Figures 11A, 11B, 11C, 11D:
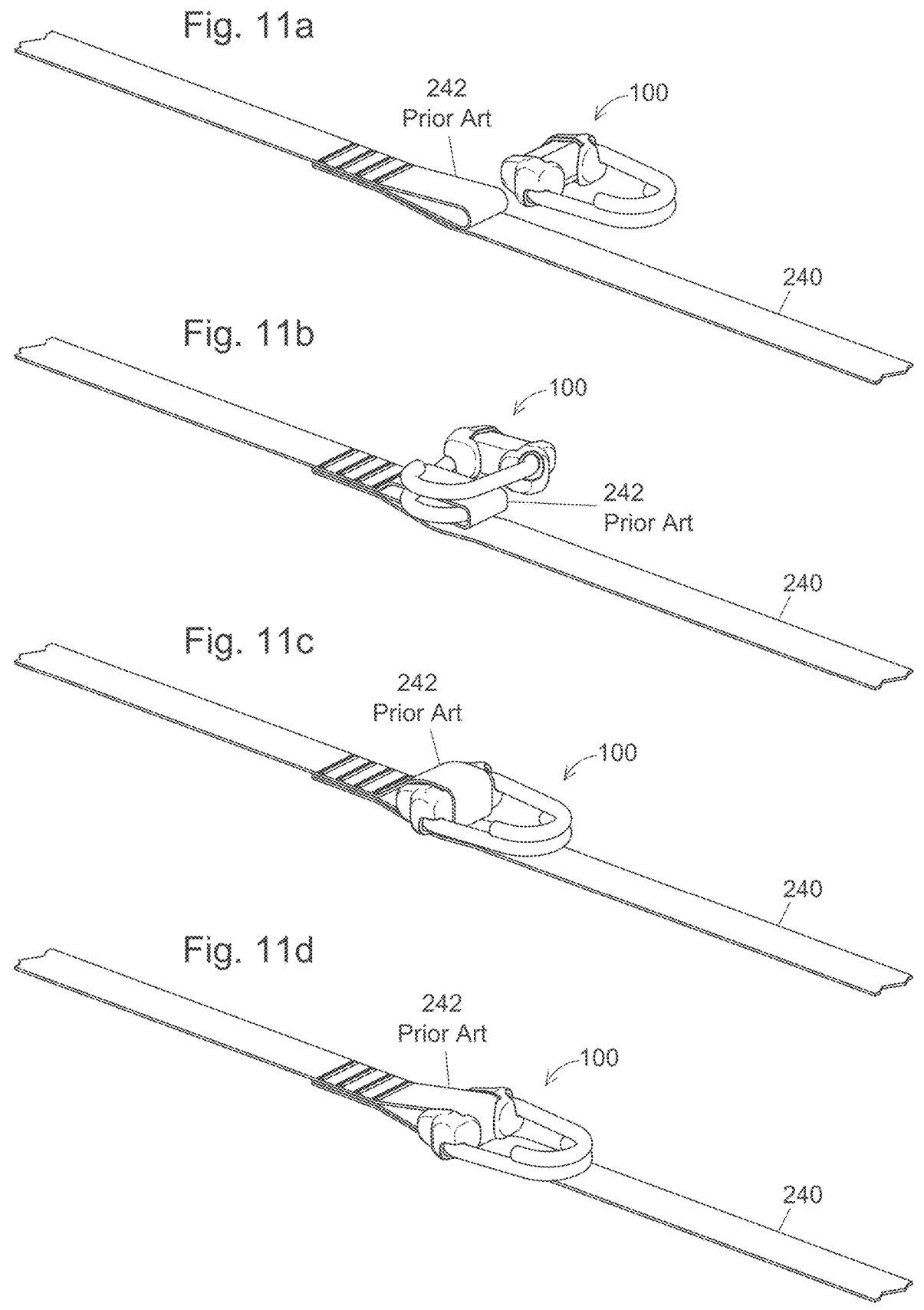
FIGS. 11a-11d show a sequence of isometric views depicting a step wise progression attaching the attachment device of FIG. 1 to a sewn loop positioned along a strap.

FIG. 10a through FIG. 10c illustrate utilizing the attachment device 100 as a static pulley. The attachment device 100 can be secured to a fixed anchor 250 without the strap first being secured to the attachment device. The end of the strap 240 can then be introduced to the attachment device 100 by threading the free end of a strap directly into the gaps 196 existing between the housing 130 and the end cap overhangs 198. Once the strap 240 has been configured as described, the strap can be drawn through the attachment device where the housing 130 now serves as a static pulley for the strap. Per FIG. 14, a generic camlock device 260 Prior Art utilizing a single strap can be configured in a manner similar to the fixed-end configurations previously described (FIG. 7d, FIG. 8d). Because the housing 130 of the attachment device 100 lacks any type of conformal coating, the strap 240 under tension can be drawn over the housing, without the housing or the strap suffering adverse effects.

Alternative Embodiments

Two alternative embodiments 400, 500 are shown in FIG. 12a and FIG. 13a respectively. These alternative embodiments differ from the attachment device 100 by replacing the two flat springs 170 in the attachment device 100 with a U-shaped spring 401 shown in FIG. 12*a*, or a torsion spring 501 shown in FIG. 13*a*. Of primary importance in many of the embodiments is for the spring action of either the flat springs 190, the U-shaped spring 401, or the torsion spring 501 to adequately bias the two hooks 110 toward a closed position 211. Additionally, the center wall 150 in the attachment device 100 is replaced with an appropriately modified center wall 402, 502 in each of the alternative embodiments 400, 500 to accommodate the specific spring geometries in each of the respective alternative embodiments.

The attachment device 100, and the two alternative embodiments 400, 500, function equivalently in terms of hook action, and in how the embodiments attach to and release from a fixed anchor location.

Strap Organizer

DRAWING REFERENCE NUMERALS FOR STRAP ORGANIZER

2100 an embodiment of a strap organizer
2110 elastomeric cord
2111 first leg
2112 second leg
2113 end loop end
2120 frame
2121 first slot
2122 second slot
2123 third slot
2124 fourth slot
2125 first void
127 second void
2131 first opening
2132 second opening
133 third opening
2134 fourth opening
2135 fifth opening
2136 sixth opening
2141 first hook tab
2142 blade section
2143 second hook tab
2144 first arm section
2145 third hook tab
2146 second arm section
2147 fourth hook tab
2149 raised area
2150 first support rib
2151 second support rib
2152 first surface
2154 second surface
2156 underside, first and second arms
2200 direction arrow
2201 direction arrow
2202 direction arrow
2203 direction arrow
2204 direction arrow
2205 direction arrow
2206 direction arrow
2207 direction arrow
2208 direction arrow
2209 direction arrow
2210 direction arrow
2211 anchor location, cylindrical section
2218 section of webbing
2301 generic 2-strap ratchet assembly
2302 webbing coil

2311 Prior Art, strap organizer, ITW Dominator
2331 arm
2332 opening
2333 arm
2331 arm
2332 opening
333 arm
2411 Prior Art, strap organizer, ProGrip Tether Bone Cargo Strap Storage Device
2422 open end slot
2421 open end slot
2504 arbitrary length of webbing having a trimmed end
2511 Prior Art, strap organizer, Bench Dog Strap-Loc
2611 Prior Art, generic camlock strap
2700 alternative embodiment
2702 stepped opening
2703 stepped opening
2710 elastomeric cord
2714 end of elastomeric cord
2715 end of elastomeric cord
2716 metal brad
2720 frame As shown in FIG. 20 through FIG. 24, the strap organizer 2100 (an example of one embodiment) is comprised of two parts, a frame 2120 and an elastomeric cord 2110. The frame 2120 serves as the foundation part of the strap organizer 2100. In other embodiments, other parts that make up the strap organizer, interface with, and are constrained by the frame 2120 in some manner.

The frame 2120 is comprised of a blade section 2142, a first arm section 2144, and a second arm section 2146, the blade section being located between the two arm sections. The blade and two arm sections are conjoined to form one side of the frame. The underside surfaces 2156 of the first and second arms 2144, 2146 are offset from the top surface of the blade section 2142 such that a first surface 2152 is formed by the offset.

On the frame side formed by the conjoined blade and arm sections is a centrally located void 2125 and two end tabs 2145, 2147 facing upwards. On the frame side opposite the side formed by the conjoined blade and arm sections is a centrally located void 2127 and two end tabs 2141, 2143 facing downwards. The end tabs 2141, 2143 on the side opposite the side formed by the conjoined blade and arm sections are offset from the blade section 2142 forming second surfaces 2154. Extending upward from the top surface of the blade section 2142 are centrally located protrusions 2149.

Located along the side formed by the conjoined blade 2142 and arm sections 2144, 2146, extending from the top side surface through to the bottom side surface, are a first opening 2131, a second opening 2132, a third opening 2133, a fourth opening 2134, a fifth opening 2135, and a sixth opening 2136. Extending upward from the underside surface between the sixth opening 2136 and the fourth opening 2134 is a first slot 2121. Extending downward from the topside surface between the second opening 2132 and the fourth opening 2134 is a second slot 2122. Extending upward from the underside surface between the third opening 2133 and the fifth opening 2135 is a third slot 2123. Extending downward from the topside surface between the first opening 2131 and the third opening 2133 is a fourth slot 2124.

Located on the underside of the blade section 2142 are a first support rib 2150, and a second support rib 2151. The support ribs increase stiffness of the blade section 2142.

Figures 22, 23:
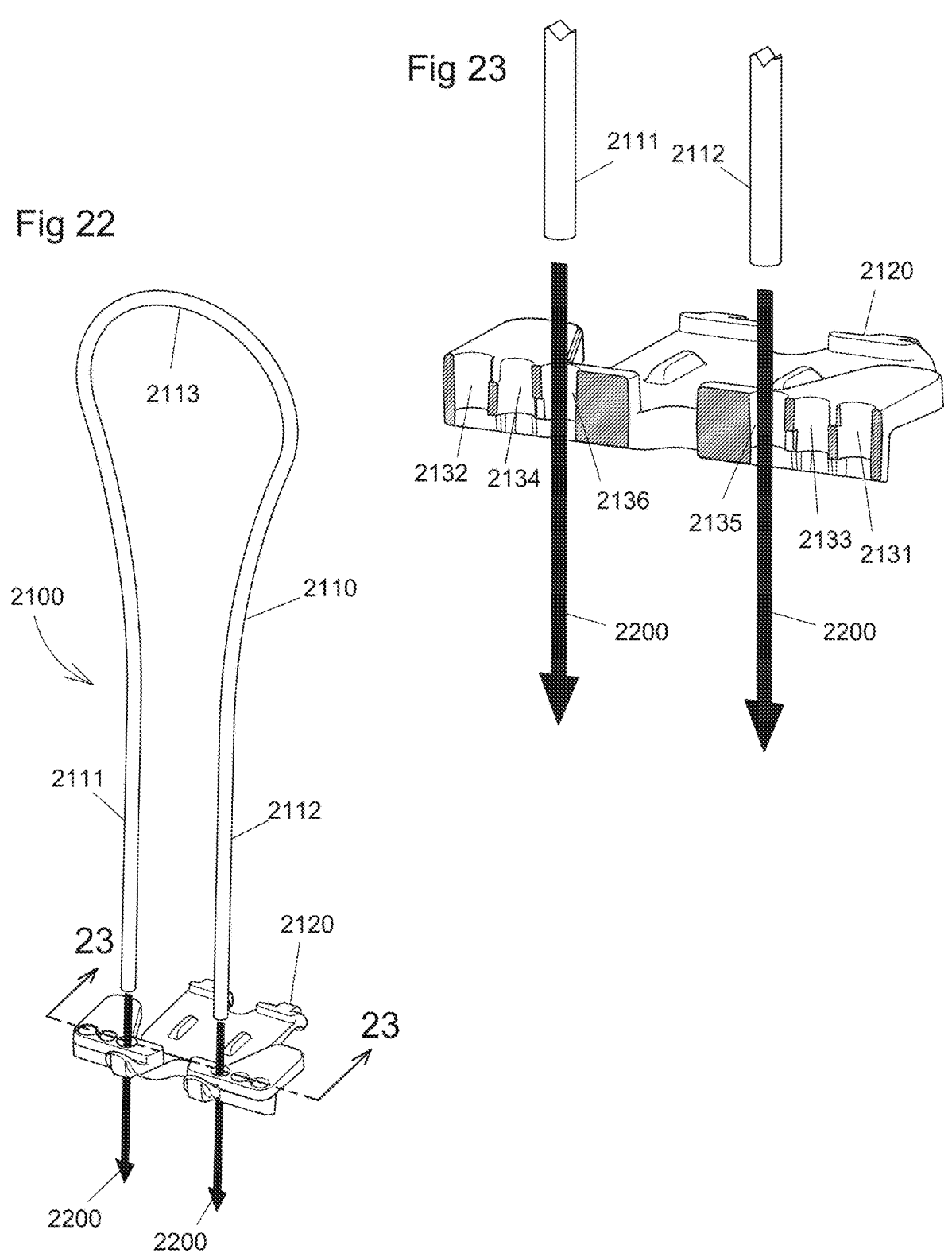
FIG. 22 shows an isometric view of the strap organizer 2100; both ends of the elastomeric cord, one of two components that comprise the strap organizer 2100, are shown being inserted into complimentary openings in the frame of the strap organizer 2100.
FIG. 23 shows a close-up section view of FIG. 22.
Figure 24:
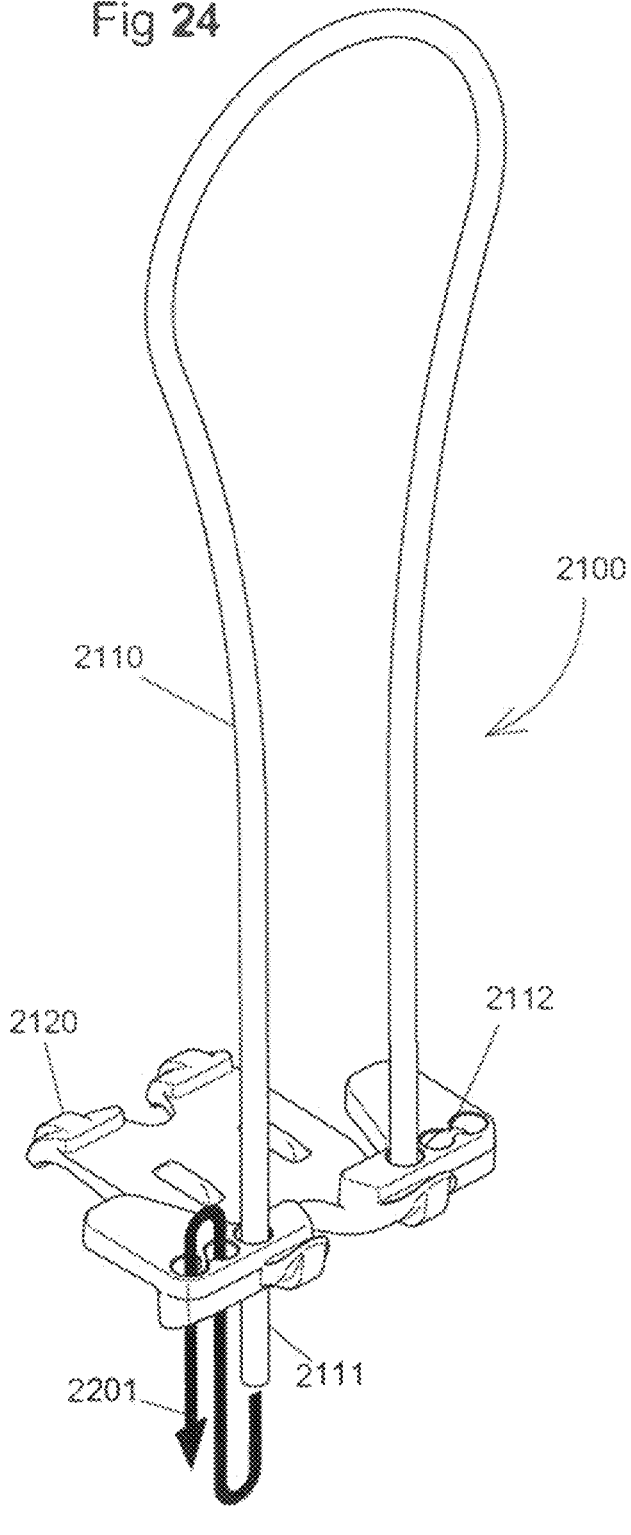
FIG. 24 shows an isometric view of the strap organizer 2100; the figure shows the first leg of an elastomeric cord fully constrained in the frame of the strap organizer 2100 and the second leg in process of being inserted into the frame.
Figures 26A, 26B, 26C, 26D:
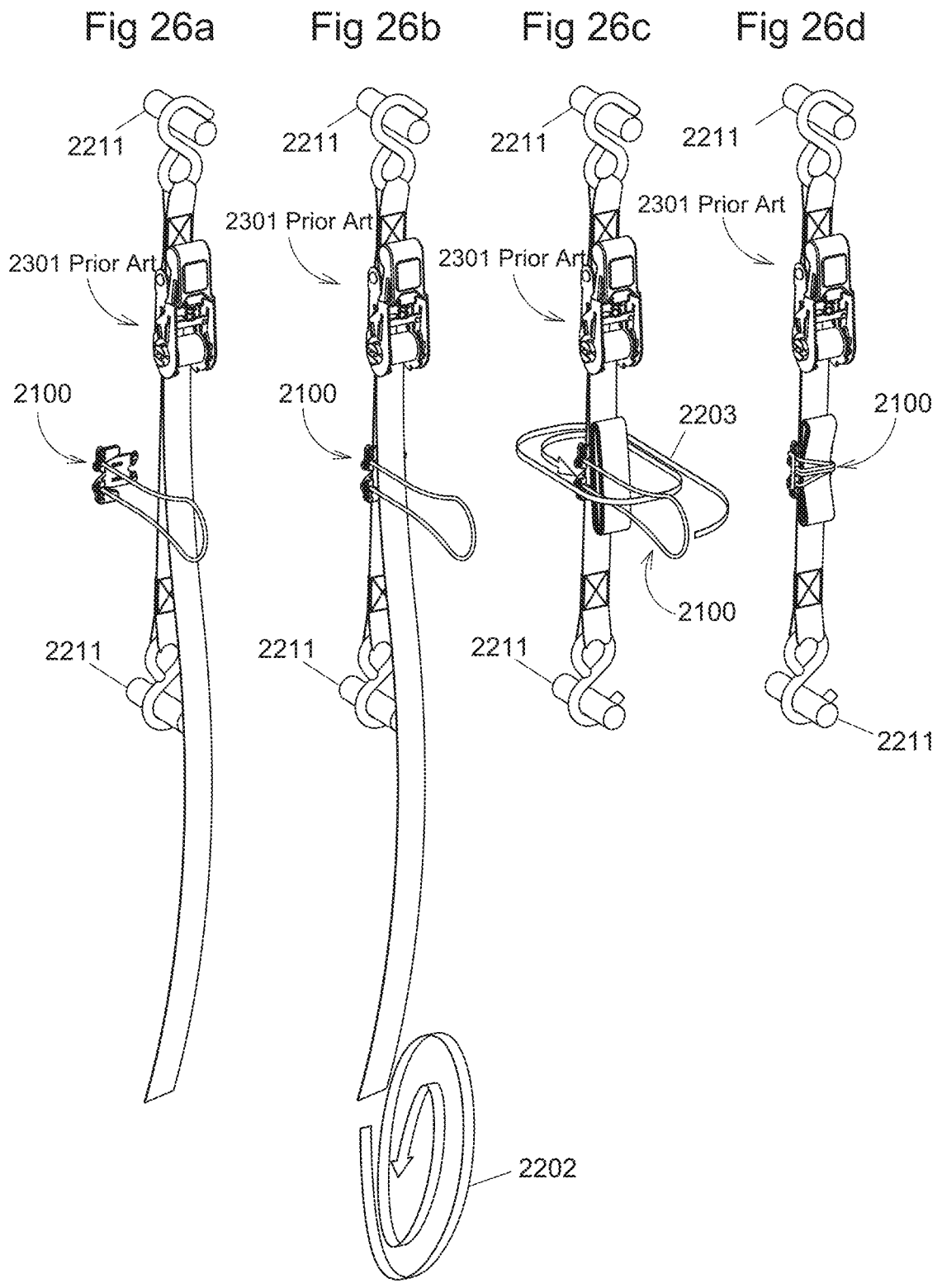
FIGS. 26a-26d shows a sequence of isometric views depicting a progression to attach the strap organizer 2100 onto a section of webbing and subsequently securing excess webbing extending from a ratchet device by means of the embodiment.
Figures 27A, 27B, 27C, 27D:
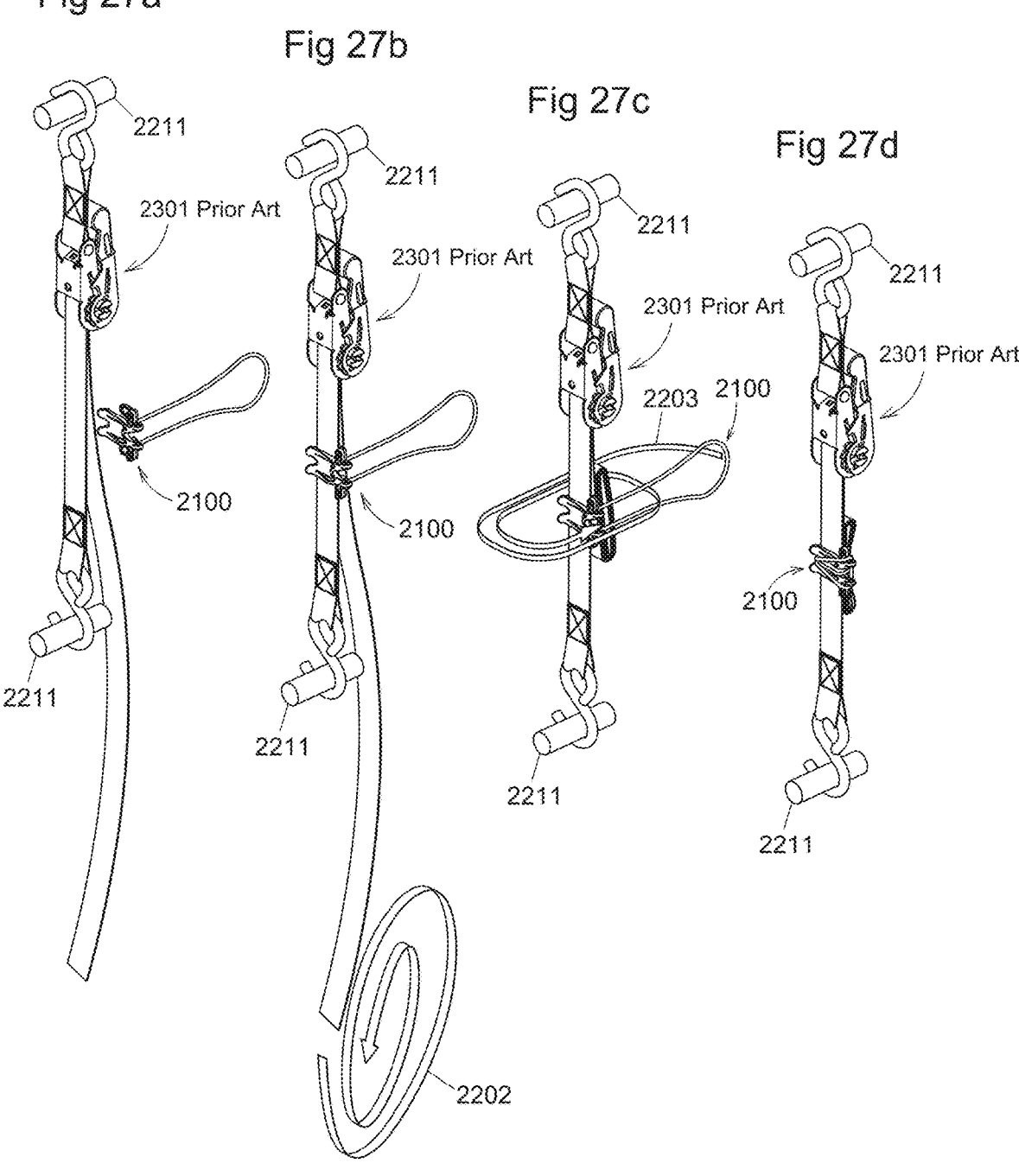
FIGS. 27a-27d shows the same sequence of isometric views depicted in FIG. 26a-FIG. 26d from a different perspective.
Figure 28A:
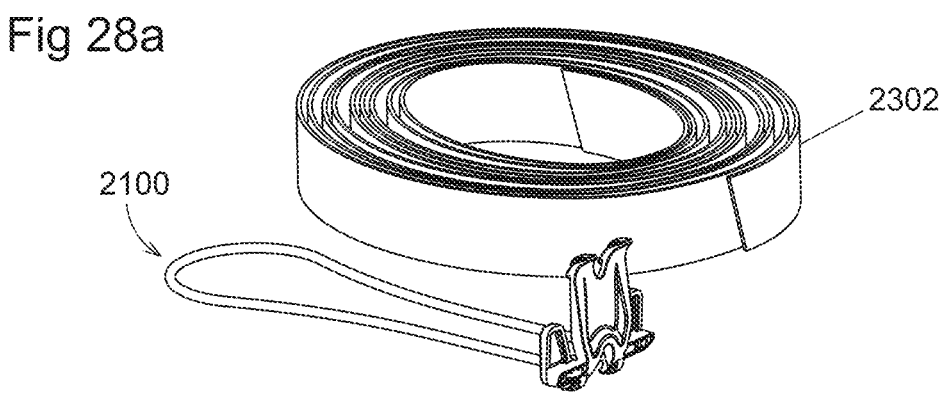
FIGS. 28a-28d shows a sequence of isometric views depicting a progression using the strap organizer 2100 to securely bundle a coiled length of webbing.
Figure 28B:
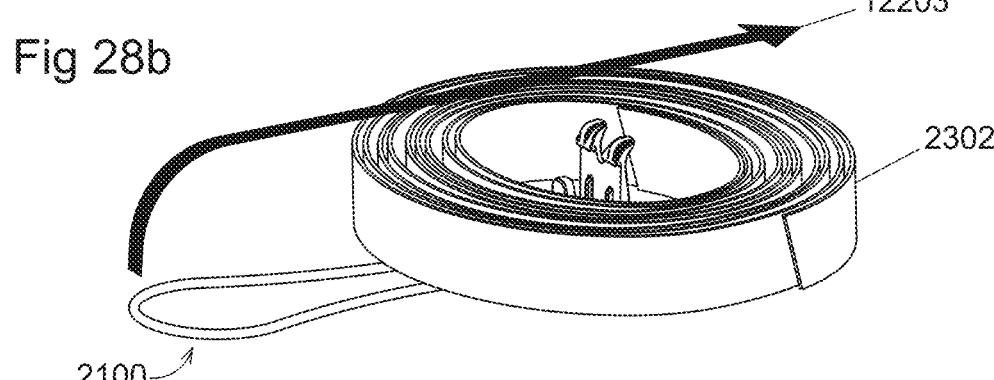
Figure 28C:
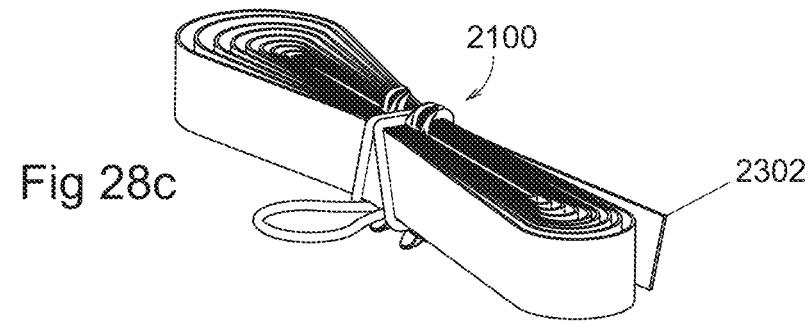
Figure 28D:
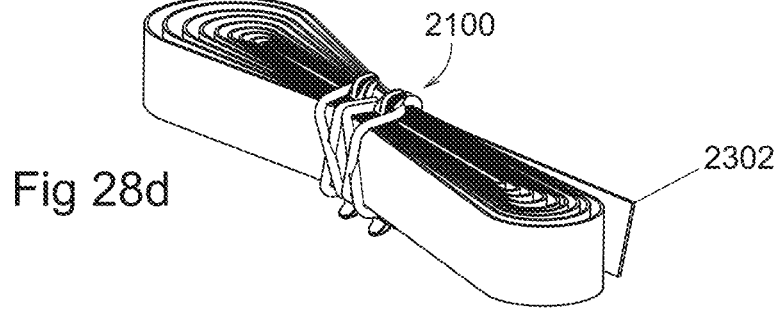
Figure 29A:
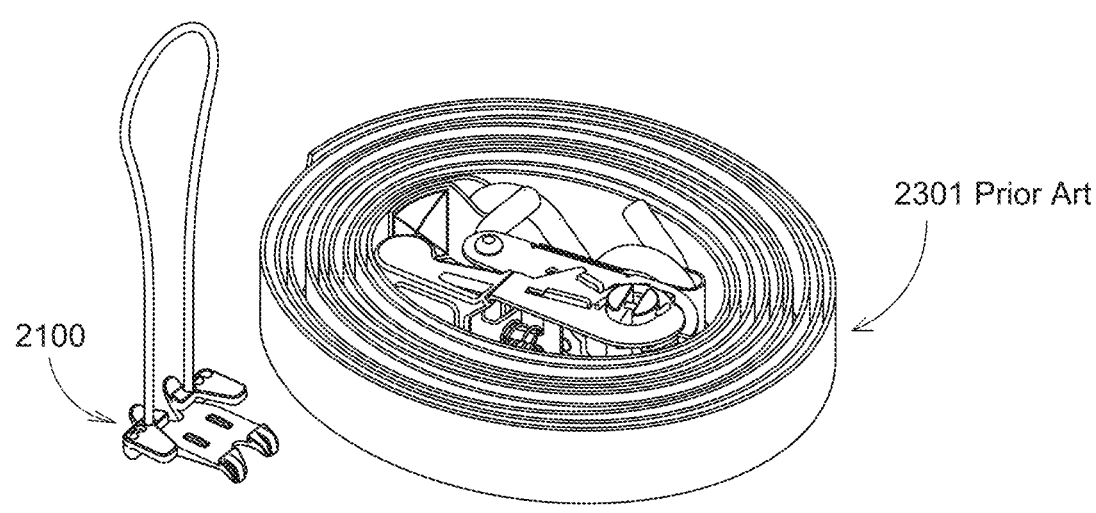
FIGS. 29a-29c shows a sequence of isometric views depicting a progression using the strap organizer 2100 to securely bundle a ratchet strap tensioning device with accompanying straps and strap hooks.
Figure 29B:
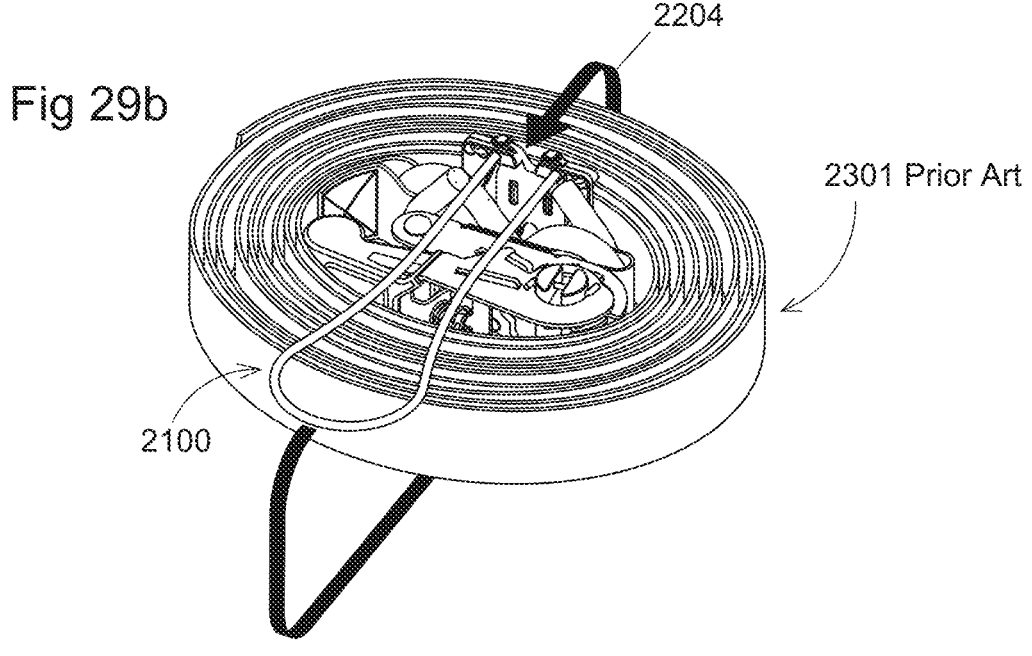
Figure 29C:
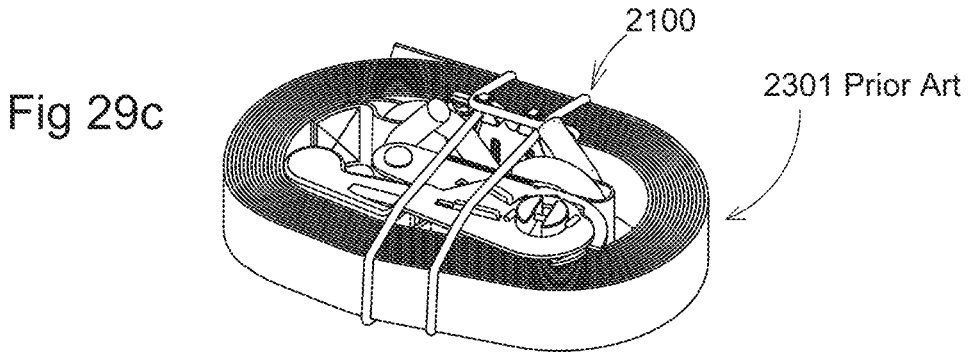

The first leg 2111 of the elastomeric cord 2110 is laced, from the top side of the first arm 2144, through the innermost opening, the sixth opening, 2136 on the first arm (direction arrow 2200, FIG. 22, FIG. 23). The first leg is then turned 180 degrees and laced back through the middle opening, the fourth opening 2134, on the first arm. The first leg is then turned 180 degrees and laced back through the outer most opening, the second opening, 2132 in the first arm (direction arrow 2201, FIG. 24). The end of the first leg 2111 of the elastomeric cord 2110 aligns with the underside edge of the second opening 2132. Applying tension so as to pull the elastomeric cord extending from the top side of the first arm 2144 away from the frame 2120 will result in the first leg being pulled into the slots 2121, 2122 located between the openings 2132, 2134, 2136 of the first arm 2144. The first leg 2111 of the elastomeric cord 2110 is now removably secured to the frame 2120 and will remain fixed in its current position.

The second leg 2112 of the elastomeric cord 2110 is laced, from the top side of the second arm 146, through the innermost opening, the fifth opening, 135 on the second arm (direction arrow 2200, FIG. 22, FIG. 23). The second leg is then turned 180 degrees and laced back through the middle opening, the third opening 2133, on the second arm. The second leg is then turned degrees and laced back through the outer most opening, the first opening, 2131 in the second arm. The end of the second leg 2112 of the elastomeric cord 2110 aligns with the underside edge of the first opening 2131. Applying tension so as to pull the elastomeric cord extending from the top side of the second arm 2146 away from the frame 2120 will result in the second leg being pulled into the slots 2123, 2124 located between the openings 2131, 2133, 2135 of the second arm 2146. The second leg 2112 of the elastomeric cord 2110 is now removably secured to the frame 2120 and will remain fixed in its current position.

A consequence of securing the first and second legs 2111, 2112 of the elastomeric cord 2110 in the frame 2120 as described above results in the formation of an end loop 2113 in the elastomeric cord 2110. The end loop 2113 of the elastomeric cord 2110 interfaces with either the first and second end tabs 2141, 2143 or the third and fourth end tabs 2145, 2147 whenever the strap organizer 2100 is configured to secure webbing.

The frame 2120 is ideally suited for fabrication utilizing a molding process, and can be fabricated from a variety of suitable thermoplastic materials. Additionally, the frame can be fabricated utilizing a die-cast process and can be die-cast from a variety of suitable metal alloys such as aluminum or zinc. The frame can also be machined from a variety of materials including, but not limited to, plastics, metal, and wood. The elastomeric cord 2110 can be fabricated from stranded elastomeric cording encased in a woven fabric sheath (bungee cord), or molded from an elastomeric material such as a low durometer polyurethane, or fabricated from a variety of other suitable elastomeric materials.

Operation of an Embodiment of the Strap Organizer

Many embodiments of the strap organizer 2100 can be used with and are sized for 1" wide webbing or strap, in a thickness range inclusive of common commercially available webbing selections. Many embodiments of the strap organizer 2100 accommodate standard 1" wide tubular webbing as well. Additionally, the strap organizer could be scaled in size to accommodate webbing widths both wider than 1" and narrower than 1". Also note that any reference to 1" wide or wider is generic in nature as commercially available 1", 1.5", 2", and 3" webbing can vary plus or minus a tenth of an inch or more.

As shown in FIG. 25a through FIG. 25d, the strap organizer 2100 (an example of one embodiment) is secured to a section of webbing 2218 by sliding the strap organizer onto an edge of the webbing where the leading end tabs 2141, 2143 bias to the back side of the webbing, and the first and second arm sections 2144, 2146 bias to the front side of the webbing. The strap organizer is pressed onto the webbing until the webbing edge contacts the first surface 2152. At this point, the opposite webbing edge slides off of the leading end tabs 2141, 2143 and is now constrained by the second surfaces 2154. The protrusions 2149 on the top side surface of the blade section 2142 press the webbing into the underside surfaces 2156 of the first and second arm sections. The strap organizer in now removably secured to the webbing section. The strap organizer can be slid in either direction along the webbing, or removed from the webbing by simply sliding the strap organizer back off the webbing section. Unless intentionally removed, the strap organizer 2100 will remain in place on the webbing without further user assistance.

FIG. 26a through FIG. 26d and FIG. 27a through FIG. 27d show strap organizer 2100. The strap organizer 2100 can be used to dress and secure excess webbing extending from a configured webbing tensioning device. After removably securing the strap organizer onto webbing in the proximity of a tensioning device, per above, excess webbing extending past the tensioning device can be neatly bundled or coiled, positioned on top of the strap organizer 2100, and subsequently secured to the strap organizer by wrapping the elastomeric cord 2110 extending from the strap organizer frame 2120 around the bundled webbing, in multiples of approximately 180 degrees wraps, sufficiently stretching the elastomeric cord to an appropriate tension where the end loop 2113 in the tensioned elastomeric cord remains positionally fixed when placed over the end tabs (2141, 2143 or 2145, 2147).

Figures 33A, 33B, 33C, 33D, 34A, 34B, 34C, 34D, 35:
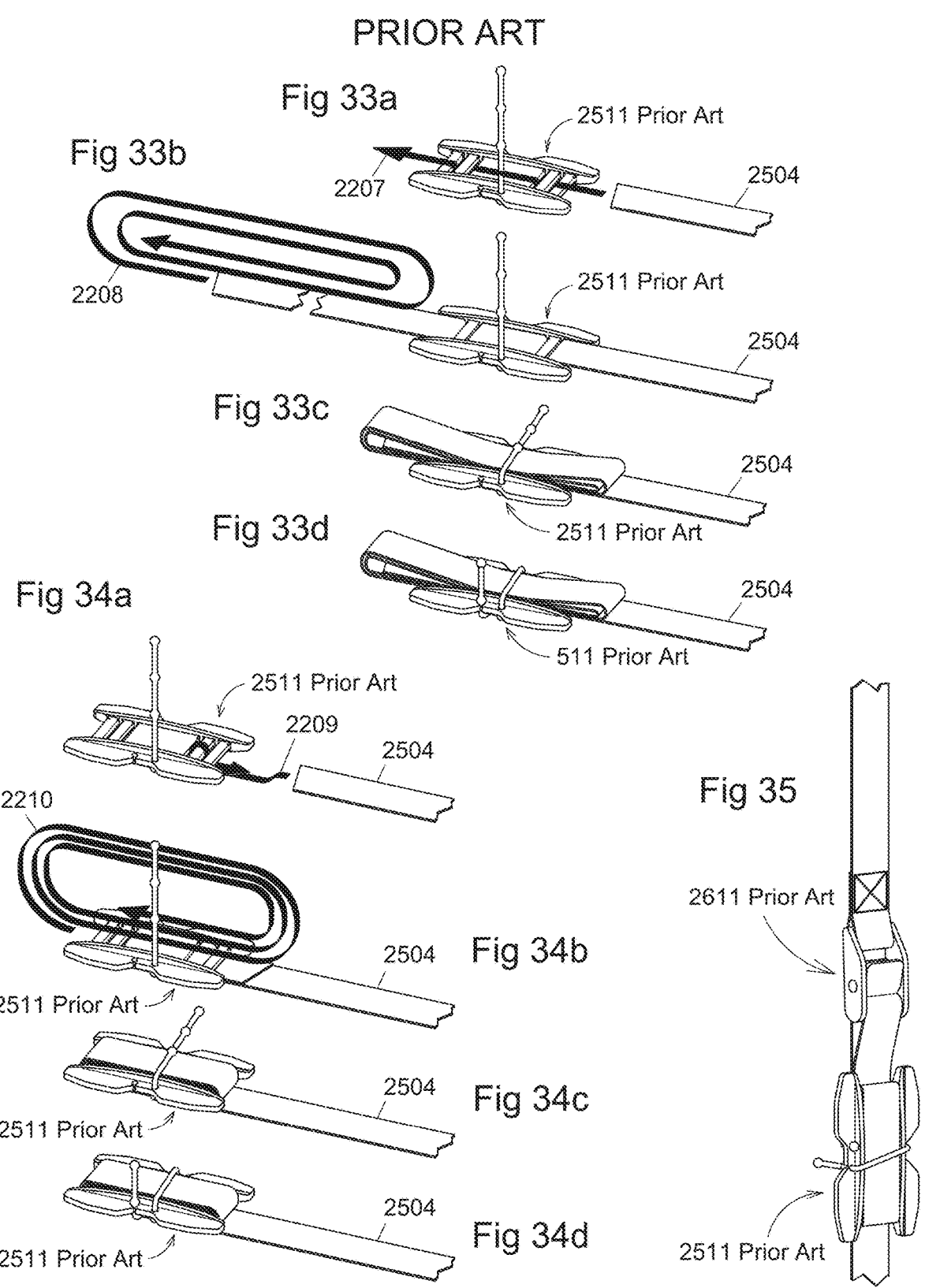
FIGS. 33a-33d, Prior Art shows a sequence of isometric views depicting a progression to attach a Prior Art device (Bench Dog Strap-Loc) along a section of webbing and subsequently securing the excess webbing extending past the Prior Art device into a compact bundle on the Prior Art device.
FIGS. 34a-34d, Prior Art shows a sequence of isometric views depicting a progression to attach a Prior Art device (Bench Dog Strap-Loc) to the free end of a length of webbing, and subsequently rotating the Prior Art device end-over-end winding the webbing onto the Prior Art device; the Prior Art device with wound bundle is then secured to the webbing by means of a custom molded elastomeric cord.
FIG. 35, Prior Art shows an isometric view a Prior Art device (Bench Dog Strap-Loc) configured on the strap of a generic camlock device securely bundling excess webbing extending from the strap tensioning device.

The strap organizer 2100 converts excess webbing extending from a tensioning device, anywhere from a few inches up to several feet in length, into a compact, neatly dressed, and securely bound bundle of webbing. The tensioned elastomer cord 2110 is 'knot-free', unlike the cord end termination in either the ITW Dominator (FIG. 30a, Prior Art) or the Tether Bone (FIG. 31a, FIG. 32, Prior Art). Additionally, the footprint of the bound elastomeric cord 2110 and frame 2120 of the strap organizer 2100, is significantly smaller than a comparable 'H'-shaped strap organizer such as the Bench Dog (FIG. 33a, FIG. 34a, FIG. 35).

Bundled webbing, when using the strap organizer 2100 described herein, is protected from snagging and inadvertently release by means of the retention feature of the elastomeric cord 2110 and frame 2120 incorporated into the strap organizer 2100. The small footprint of the strap organizer 2100 lends itself to a high integrity connection compared to either the ITW Dominator or the Tether Bone, and minimally invasive solution when compared to 'H'-shaped strap organizers.

As shown in FIG. 28a through FIG. 28d and FIG. 29a through FIG. 29c, the strap organizer 2100 can also be used to dress standalone straps or tensioning devices with accompanying straps and hooks for storage purposes. In either case, the strap organizer 2100 can be inserted between webbing layers or between device and webbing wherever and whenever it is convenient to do so—meaning, device and strap, or simply a strap, can be coiled prior to insertion of the strap organizer 2100 into the coil. The elastomeric cord 2110 can be wrapped multiples times around the webbing (FIGS. 28a-28d) or a single 360 degree wrap around a larger configuration of the coiled strap and device (FIGS. 29*a*-29*c*), while in both cases securely binding the configuration for easy storage.

The strap organizer 2100 described herein is easier to attach to webbing than the ITW Dominator, more convenient to work with than the ProGrip Tether Bone, and significantly more compact and simpler to use (especially when dressing straps and device for storage) than the Bench Dog Strap-Loc.

Alternative Embodiments

Figures 36A, 36B, 36C:
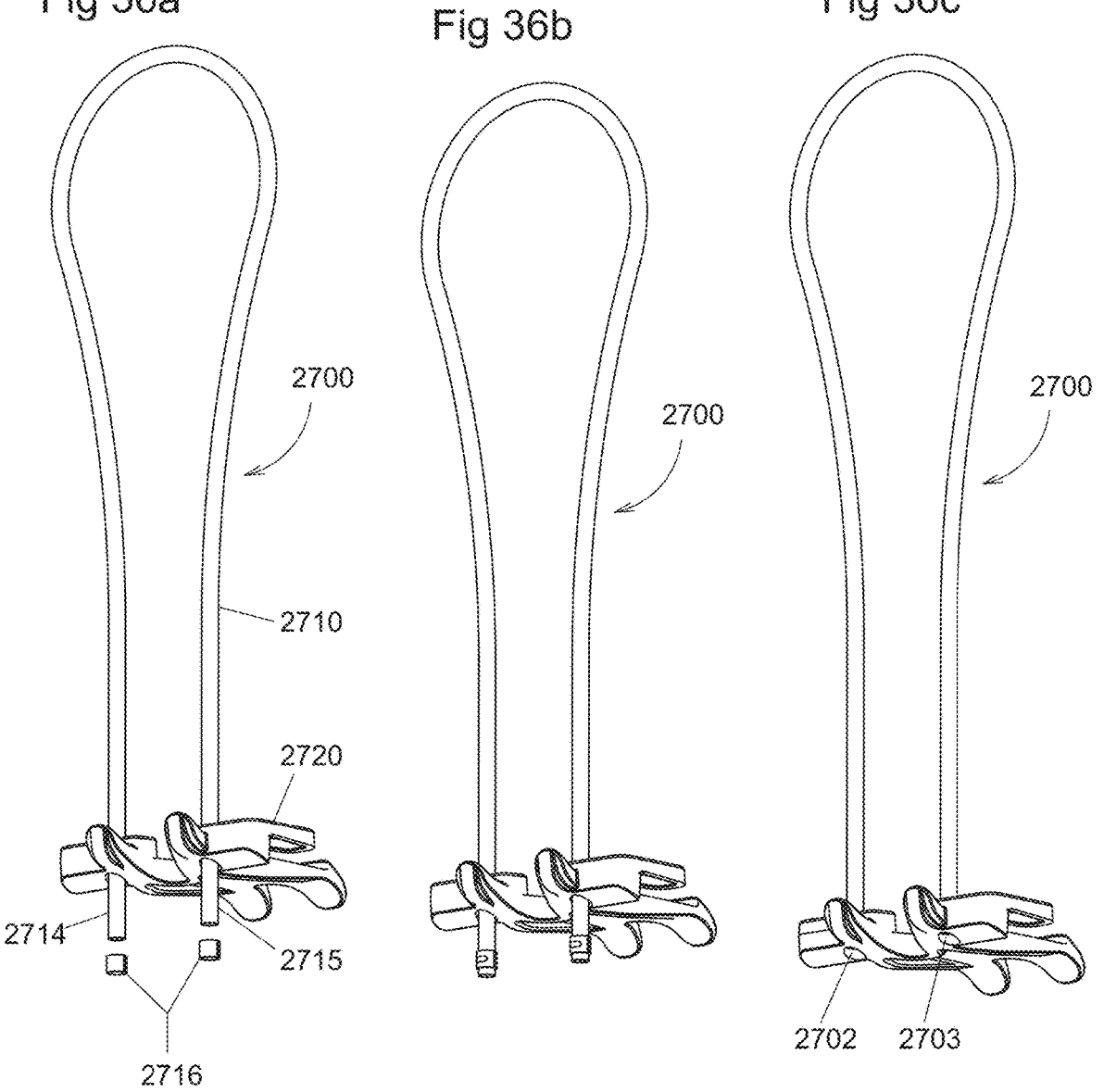
FIGS. 36a-36c shows a sequence of isometric views depicting an alternative embodiment 2700 where crimped metal brads are used in lieu of narrow slots and serpentine path to restrain an elastomeric cord in the frame.
Figure 37:
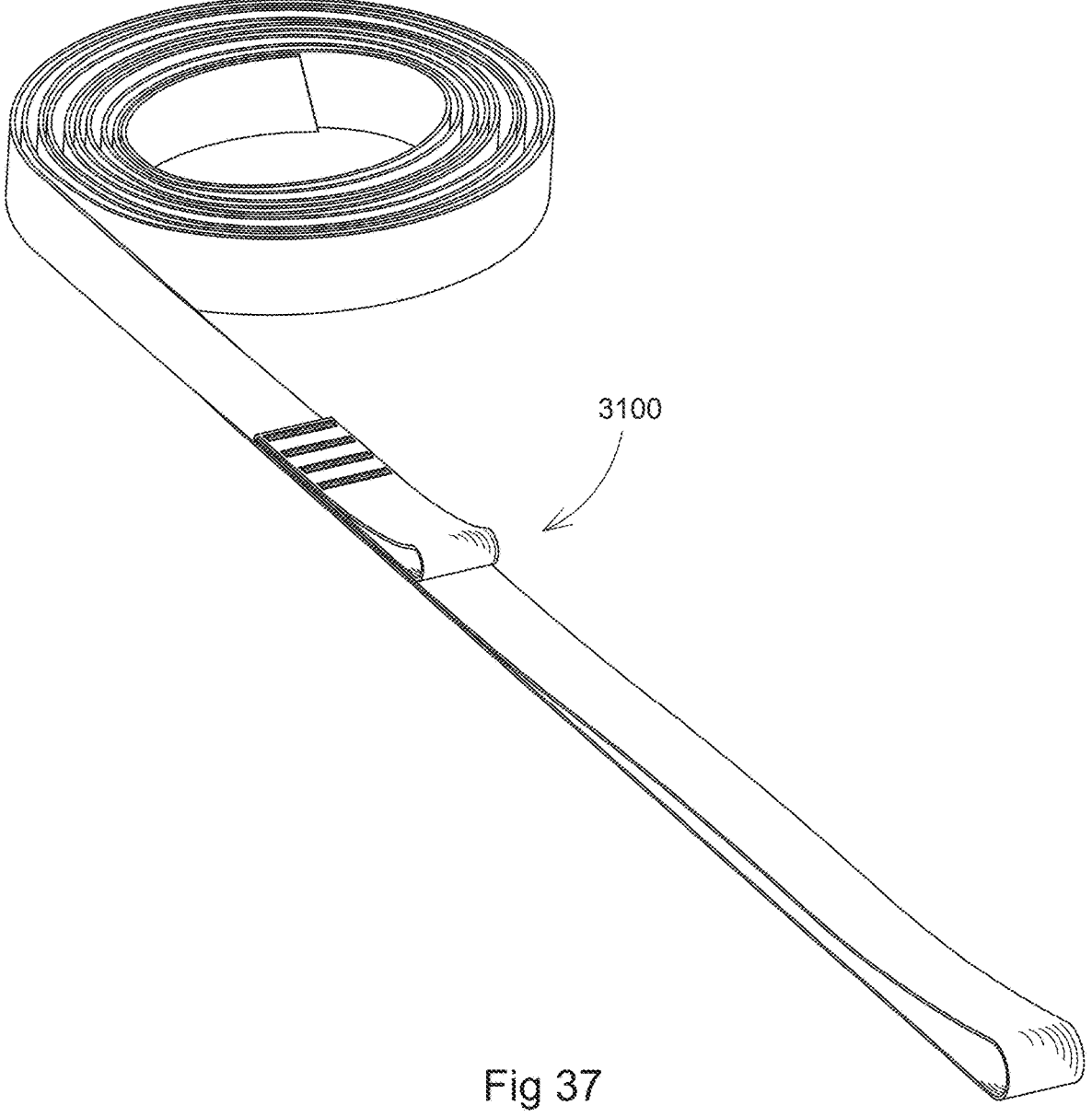
FIG. 37 shows an isometric view of an embodiment of a Looped Webbing arranged as a coil where the double end-loop end is shown extending from the coil.
Figures 38A, 38B, 39:
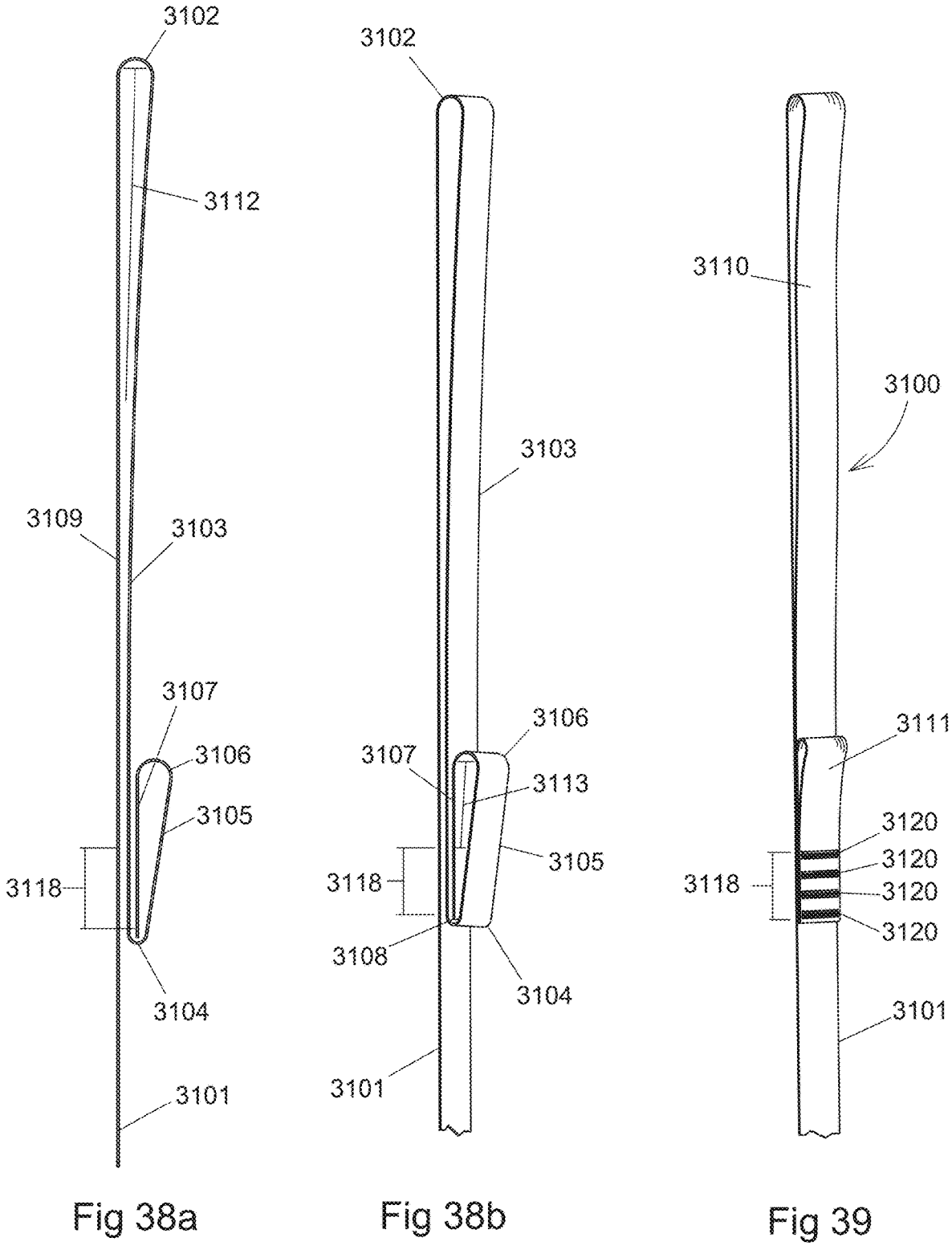
FIG. 38a and FIG. 38b show a side view and an isometric view of the double end-loop portion of the Looped Webbing of FIG. 37 prior to being sewn.
FIG. 39 shows an isometric view of the double end-loop portion of the Looped Webbing of FIG. 37 after bar tack stitching has now permanently fixed the position and size of the larger and smaller loops.
Figures 42A, 42B, 42C, 42D:
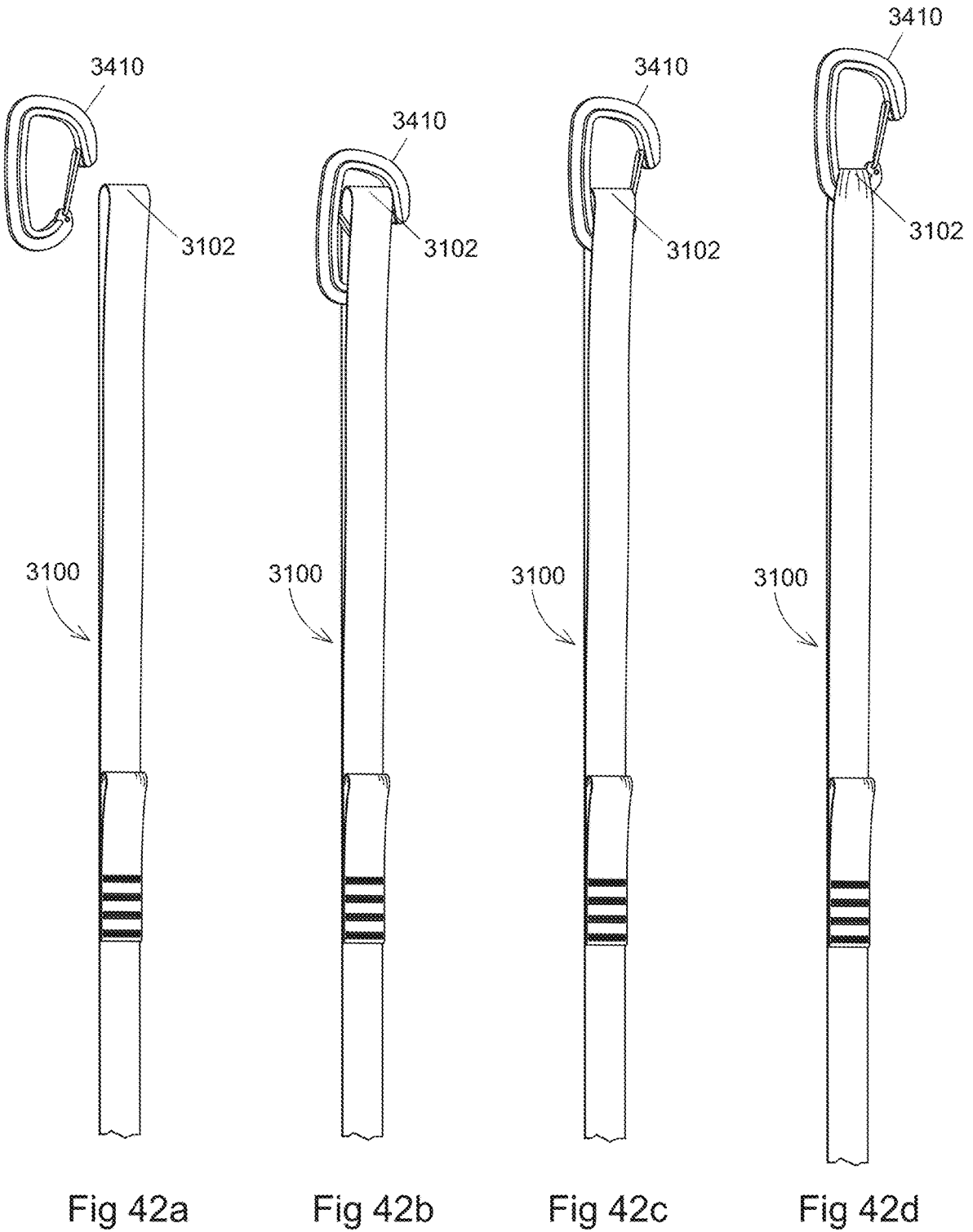
FIGS. 42a-42d show a sequence of isometric views depicting the attachment of a gated carabiner onto the larger of the two end-loops of the Looped Webbing of FIG. 37.

An alternative embodiment 2700 is shown in FIGS. 36*a*-36*c*. Rather than using a serpentine path and/or narrow slots to restrain the elastomeric cord 2710 in the fame 2720, metal brads 2716 are crimped onto the ends of the elastomeric cord 2714, 2715 after inserting the cord ends into stepped openings 2702, 2703 in the frame. The crimped brads prevent the withdrawal of the elastomeric cord from the stepped openings in the frame, thus permanently securing the elastomeric cord to the frame.
Looped Webbing

LOOPED WEBBING PARTS LIST

3100 one embodiment of the Looped Webbing
3101 webbing
3102 webbing, first loop end
3103 second leg, webbing length between first loop end and loop end adjacent to stitching
3104 webbing, loop end adjacent to stitching
3105 third leg, webbing length between loop end adjacent to stitching and second loop end
3106 webbing, second loop end
3107 fourth leg, webbing length between second loop end and end of webbing
3108 end of webbing
3109 first leg, continuation of strap webbing 3101
3110 larger end-loop, consists of 3108, 3102, 3103
3111 smaller end-loop, consist of 3105, 3106, 3107
3112 open area inside first loop
3113 open area inside second loop
3118 length along webbing secured by stitching
3120 bar tack stitching
3200 alternate embodiment
3220 stitching
3300 alternate embodiment
3320 stitching
3410 generic carabiner
3412 generic lock link
3414 generic S-hook
3420 anchor, loop style
3430 anchor, large diameter
3432 anchor, round bar section
3434 anchor, perforated plate
3436 anchor, expanded metal panel with square tubing top rail
3440 Prior Art, generic strap with permanently attached S-hook
3444 Prior Art, generic sewn loop
3502 direction arrow
As shown in FIG. 37, FIG. 38*a*, FIG. 39*b*, FIG. 40, one embodiment, Looped Webbing 3100, consists of a single length of webbing 3101 from which are formed two loops positioned at one end of the webbing; a smaller loop 3111, and a larger loop 3110. The two loops 3110, 3111 are permanently fixed as to size and location by means of stitching 3120, confined to a single area 3118 on the webbing.

The larger loop 3110 has a first leg 3109, which is a continuation of the webbing 3101 that comprises the overall length of the Looped Webbing, a first loop end 3102, and a second leg 3103. The smaller loop 3111 consists of a third leg 3105, a second loop end 3106, and a fourth leg 3107. The third leg 3105 of the smaller loop 3111 is a continuation of the second leg 3103 of the larger loop 3110. The transition of the second leg 3103 of the larger loop 3110 to the third leg 3105 of the smaller loop 3111 is defined as the loop end adjacent to the stitching 3104.

The fourth leg 3107 of the smaller loop 3111, lies adjacent to, and makes direct contact with the second leg 3103 of the larger loop 3110. The end 3108 of the fourth leg 3107 of the smaller loop 3111 is bounded by the loop end adjacent to the stitching 3104.

Sewn stitching is localized within a singular area 3118 on the webbing 3101, and is comprised of four parallel bar tacks 3120 extending across the width of the webbing, permanently joining together the four overlapping layers of webbing 3109, 3103, 3107, 3105. The first bar tack 3120 is proximal to the webbing end 3108 and the end-loop adjacent to the stitching 3104. Three additional bar tack rows 3120, positioned parallel to each other, and spaced closely apart complete the stitching.

Whenever adjacent legs 3109, 3103 of the larger loop 3110 are spread apart, an open area 3112 is created between the legs. Whenever adjacent legs 3105, 3107 of the smaller loop 3111 are spread apart, an open area 3113 is created between the legs.

The Looped Webbing 3100 as depicted in the figures typically portrays 1-inch wide webbing, a webbing size often used in the fabrication of straps utilized for tie-down straps, and straps incorporated into general purpose strap tensioning devices. The Looped Webbing 3100 could also be fabricated from wider or narrower webbing material, and could utilize a wide selections of webbing thicknesses. Typical webbing materials common in industry are polypropylene, nylon, and polyester, among others. Any of these material types would serve adequately in the fabrication of the Looped Webbing 3100. Thread materials used for the stitching likewise could be nylon or polyester. High-test thread suitable for outdoor use is common in industry.

Operation of an Embodiment

The Looped Webbing 3100 enables a user to selective add to (or remove from) the larger end-loop 3110, and add to (or remove from) the smaller end-loop 3111, both of which are incorporated into the Looped Webbing embodiment, any of a variety of anchor connectors for use in securing the Looped Webbing to a fixed anchor location 3420, 3430, 3432, 3434, 3436. Said anchor connectors include commonly available S-hooks 3414 and J-hooks, carabiner style devices incorporating a spring biased locking gate 3410, Quick Link style connectors incorporating a long bodied threaded hex locking apparatus 3412, and other anchor connectors. FIG. 42*a* through 42*d*, FIG. 45*a* through 45*d*, FIG. 48*a* through FIG. 48*d*, FIG. 49*a* through 49*d*, and FIG. 50*a* through 50*c* shown many views looped webbing 3100.

Figures 46A, 46B, 46C, 46D:
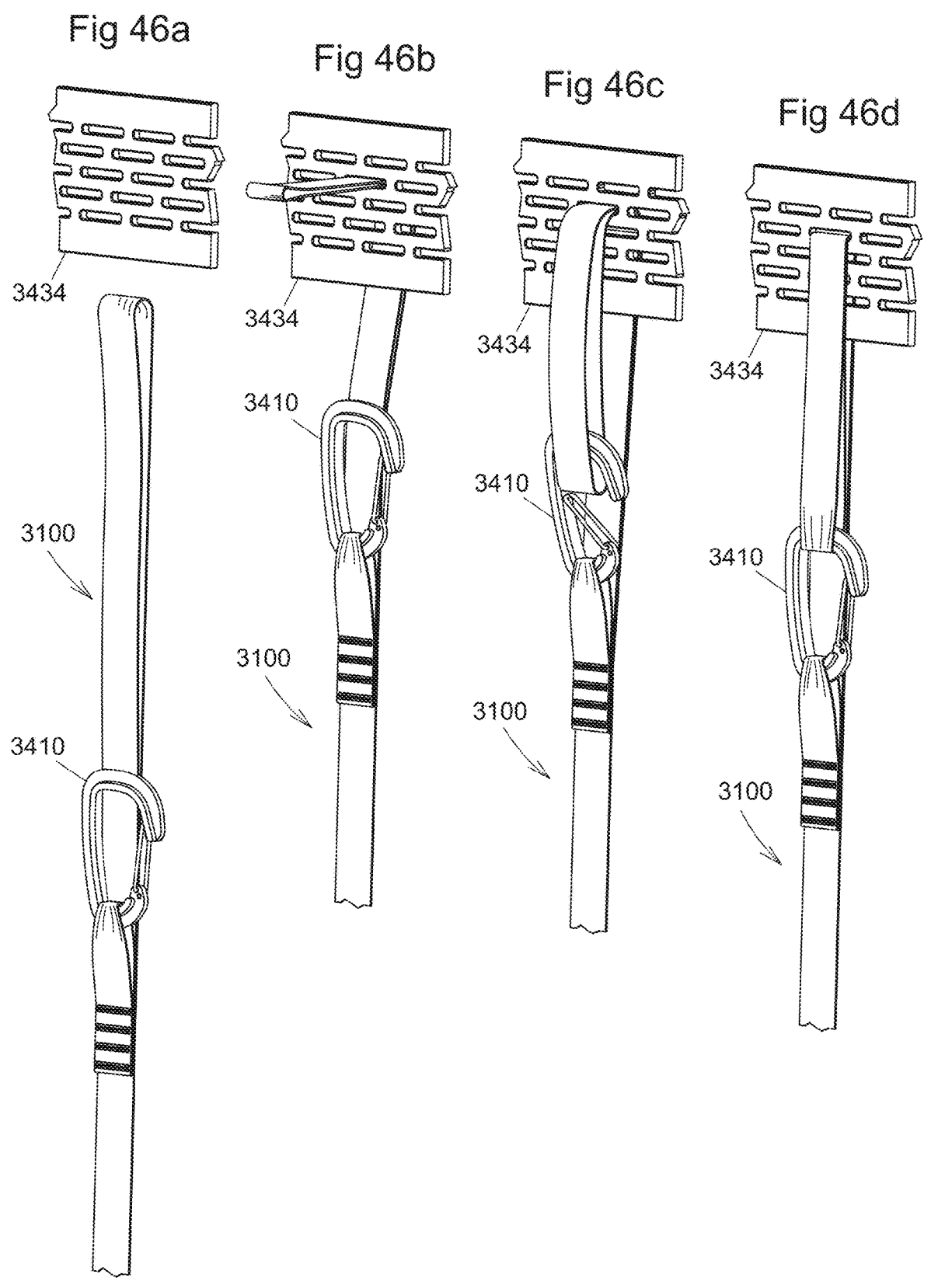
FIGS. 46a-46d show a sequence of isometric views depicting the attachment of the strap configuration from FIGS. 45a-45d onto a perforated panel.
Figures 51A, 51B, 51C:
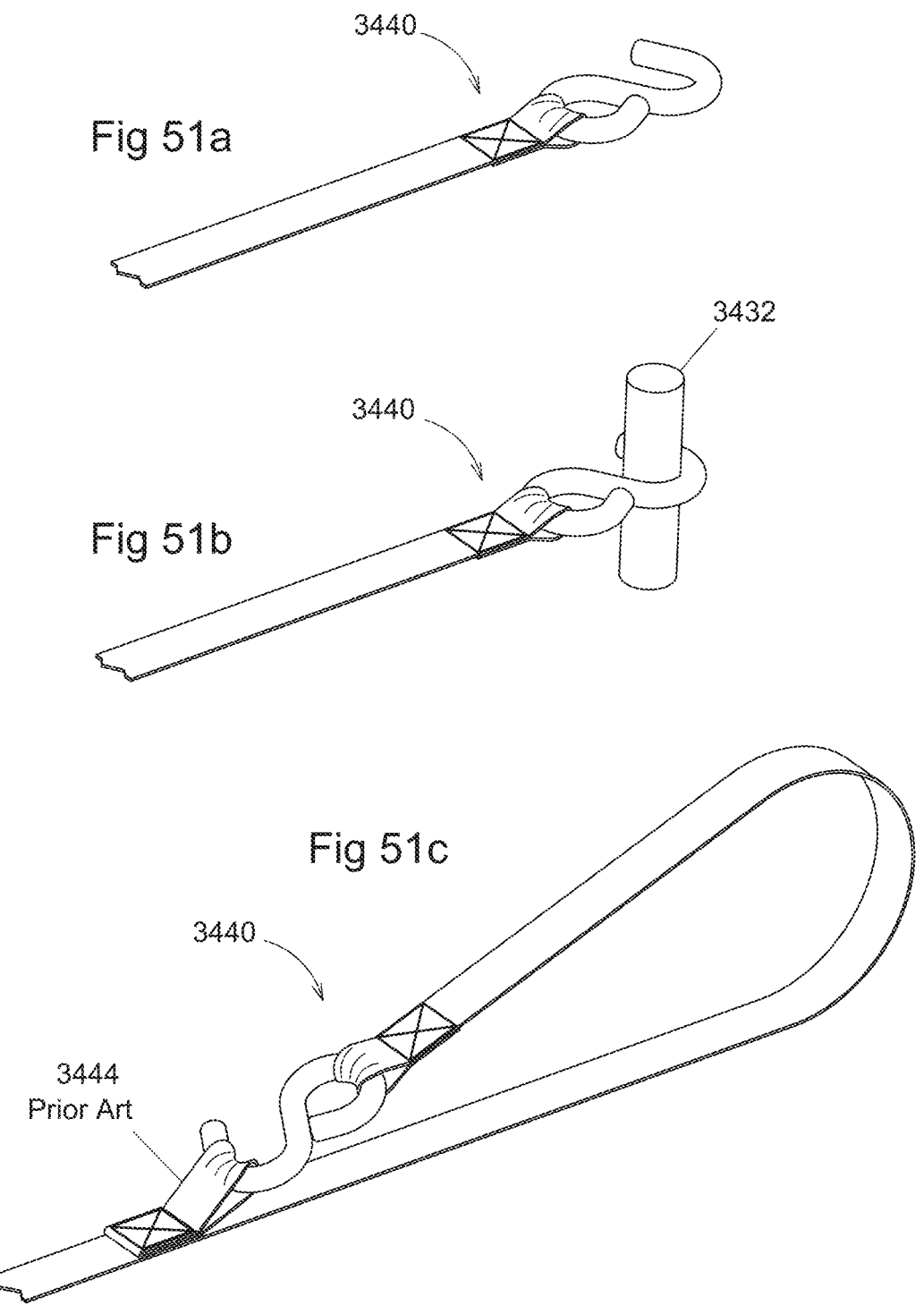
FIG. 51a, FIG. 51b, 51c, Prior Art; these figures depict a prior art strap that has a common open-end S hook permanently sewn to the strap end; the prior art strap in FIG. 51c shows the addition of a smaller loop permanently sewn to the strap along its length.

The Looped Webbing 3100 also enables a direct connection to a fixed anchor location 3430 using only the larger end-loop 3110 incorporated into the embodiment (FIG. 46*a* through FIG. 46*c*). Rather than being constrained to a limited set of strap configurations by a permanently attached open-end S-hook, typical of many of the straps 3440 available in the marketplace today (FIG. 51*a*), the Looped Webbing 3100 supports multiple strap configurations.

Either the larger end-loop 3110 or the smaller end-loop 3111, or both, can be utilized in conjunction with an add-on connector in securing the Looped Webbing 3100 to an anchor location (FIG. 43*a* through FIG. 43*d*, FIG. 44*a* through FIG. 44*c*, FIG. 46*a* through FIG. 46*d*, FIG. 53, FIG. 54). Not shown, the smaller end-loop 3111, rather than the larger end-loop 3110, could be utilized to attached the carabiner 3410 to the anchor 3420 in FIG. 43*a* through FIG. 43*d*. In this instance, the large end-loop 3110 would simply hang slack.

The Looped Webbing 3100 is not limited to a single, or even to a minimal subset of strap configurations. In addition to offering a variety of strap configurations, the Looped Webbing 3100 directly duplicates the strap configurations of prior art straps 3440 in common use today. The strap configuration shown in FIG. 50*c* replicates what is probably considered the simplest and most common strap-to-anchor connection currently available in the marketplace, FIG. 51*b*. Note, as shown in FIG. 49*a* through FIG. 49*d*, and in FIG. 50*a* through FIG. 50*c*, the S-hook 3414 can be easily added to or removed from the larger end-loop 3110, or from the smaller end-loop 3111, per the user's discretion. The flexibility in terms of possible strap configurations contrasts with the singular configuration available by means of the prior art strap 3440 having a permanently attached S-hook.

Figures 48A, 48B, 48C, 48D:
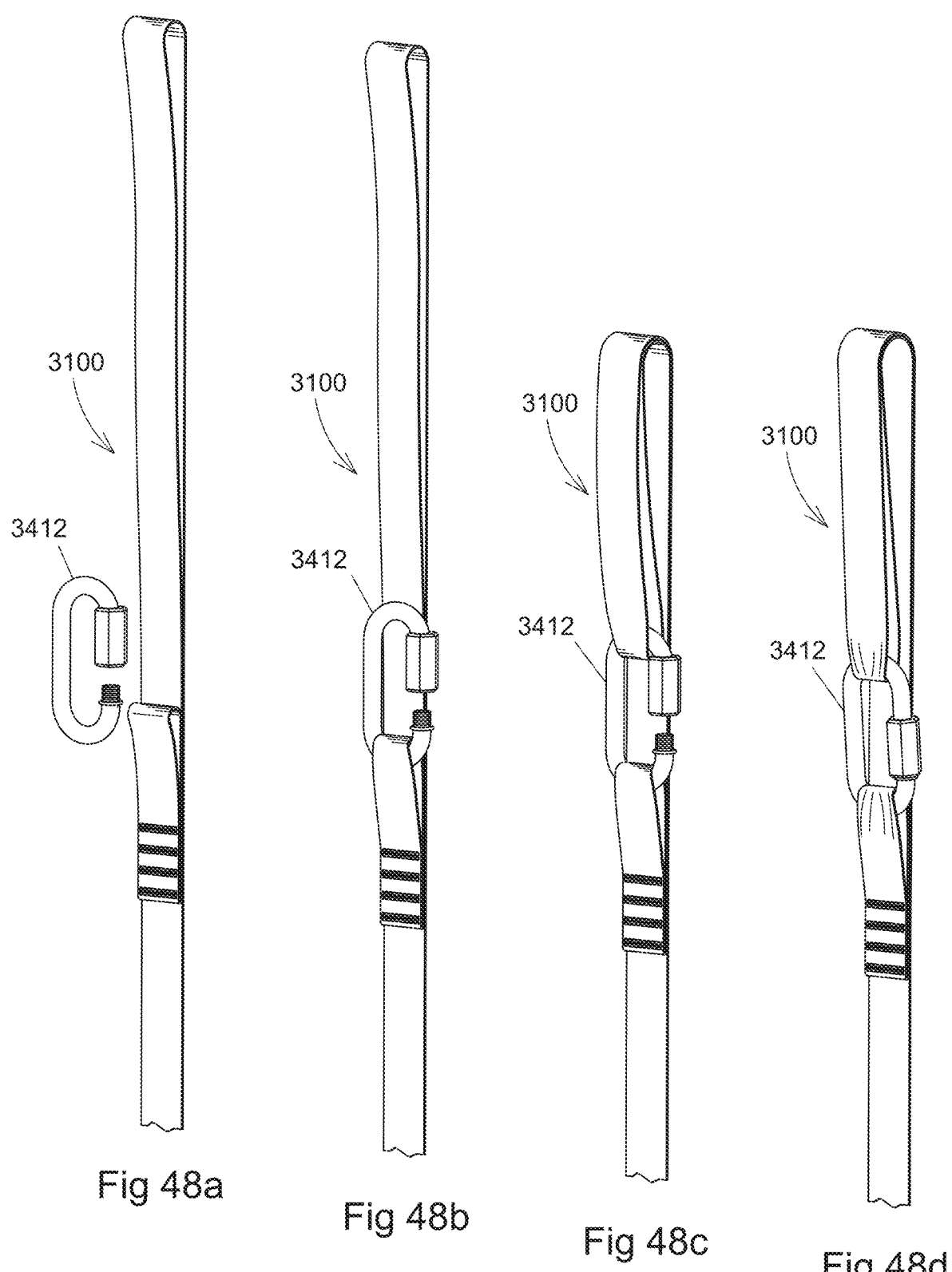
FIGS. 48a-48d show a sequence of isometric views depicting the attachment of a single Quick Link to both the smaller and the larger end-loops of the Looped Webbing of FIG. 37; the result of this configuration is a singular loop formed by the smaller end-loop, the Quick Link, and the larger end-loop; this strap configuration effectively duplicates that of FIGS. 45a-45d but uses a Quick Link in lieu of a carabiner.
Figures 49A, 49B, 49C, 49D, 50A, 50B, 50C:
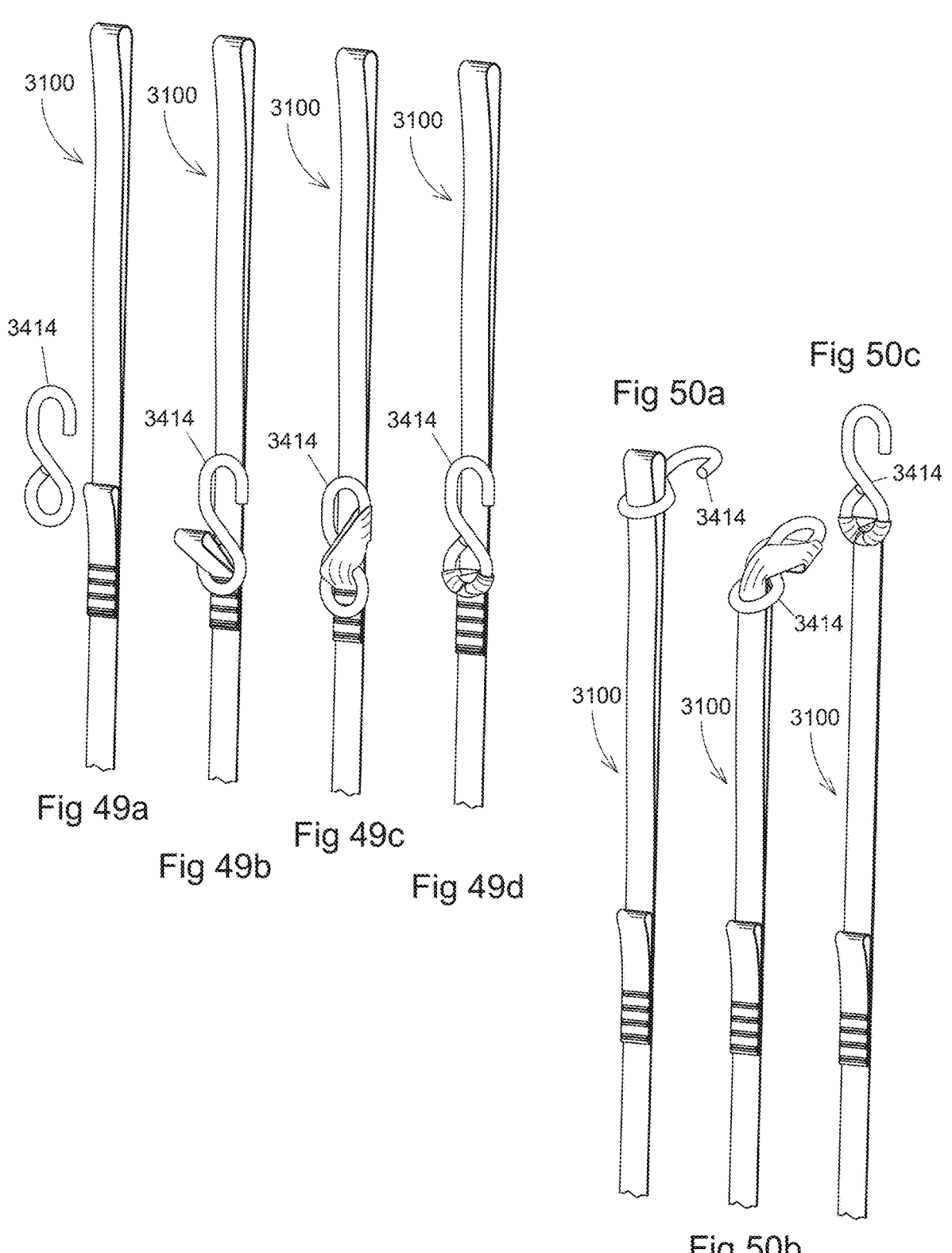
FIGS. 49a-49d show a sequence of isometric views depicting the attachment of a generic S-hook onto the smaller of the two end-loops of the Looped Webbing of FIG. 37.
FIGS. 50a-50c show a sequence of isometric views depicting the attachment of a generic S-hook onto the larger of the two end-loops of the Looped Webbing of FIG. 37.

As shown in FIG. 46*a* through FIG. 46*d*, and in FIG. 48*a* through FIG. 48*d*, both the larger end-loop 3110 and the smaller end-loop 3111 of the Looped Webbing 3100 are utilized in a strap configuration. The Quick Link 3412 shown in FIG. 48*a* through FIG. 48*d* substitutes for the carabiner 3410 shown in FIG. 46*a* through FIG. 46*d*. Also note, as shown in FIG. 48*d*, the Quick Link 3412 can be left in place, secured to the Looped Webbing 3100 prior to any attachment of the Looped Webbing 3100 to an anchor location. In many instances, the configuration shown in FIG. 48*d* can be utilized as is, to be later secured to an anchor location without disturbing the Quick Link 3412. Or similar to what is shown in FIG. 46*a* through FIG. 46*d*, completing the progression might involve attaching the Looped Webbing 3100 to an anchor location 3434 prior to securing the anchor connector fully to the Looped Webbing 3100. In this example, the anchor connector being a carabiner 3410.

Figures 44A, 44B, 44C:
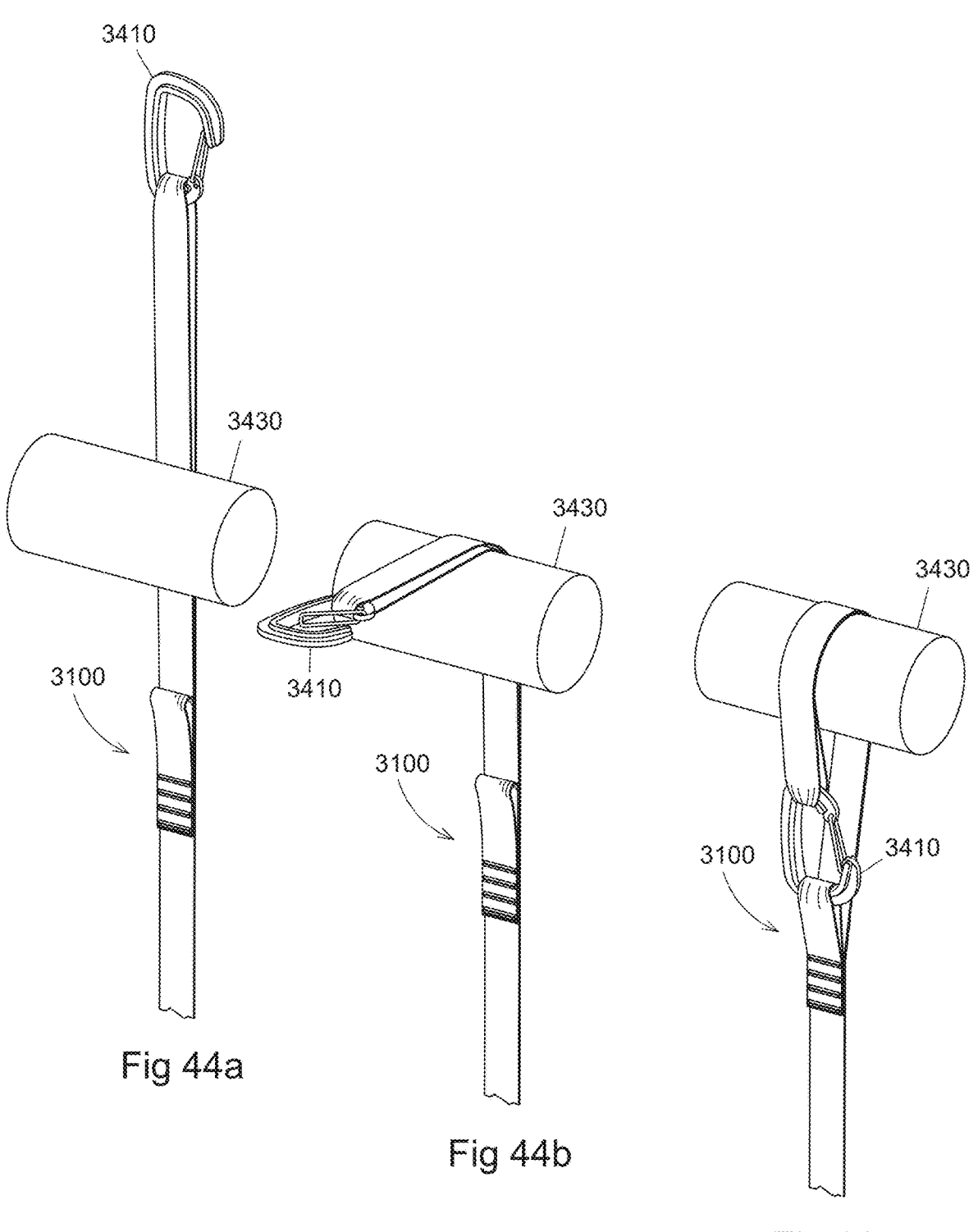
FIGS. 44a-44c show a sequence of isometric views depicting the attachment of the Looped Webbing of FIG. 37 to a large diameter anchor; a gated carabiner attached to the larger end-loop of the Looped Webbing attaches to the smaller end-loop of the Looped Webbing after the larger end-loop, with gated carabiner, circumnavigate the large diameter anchor.
Figures 45A, 45B, 45C, 45D:
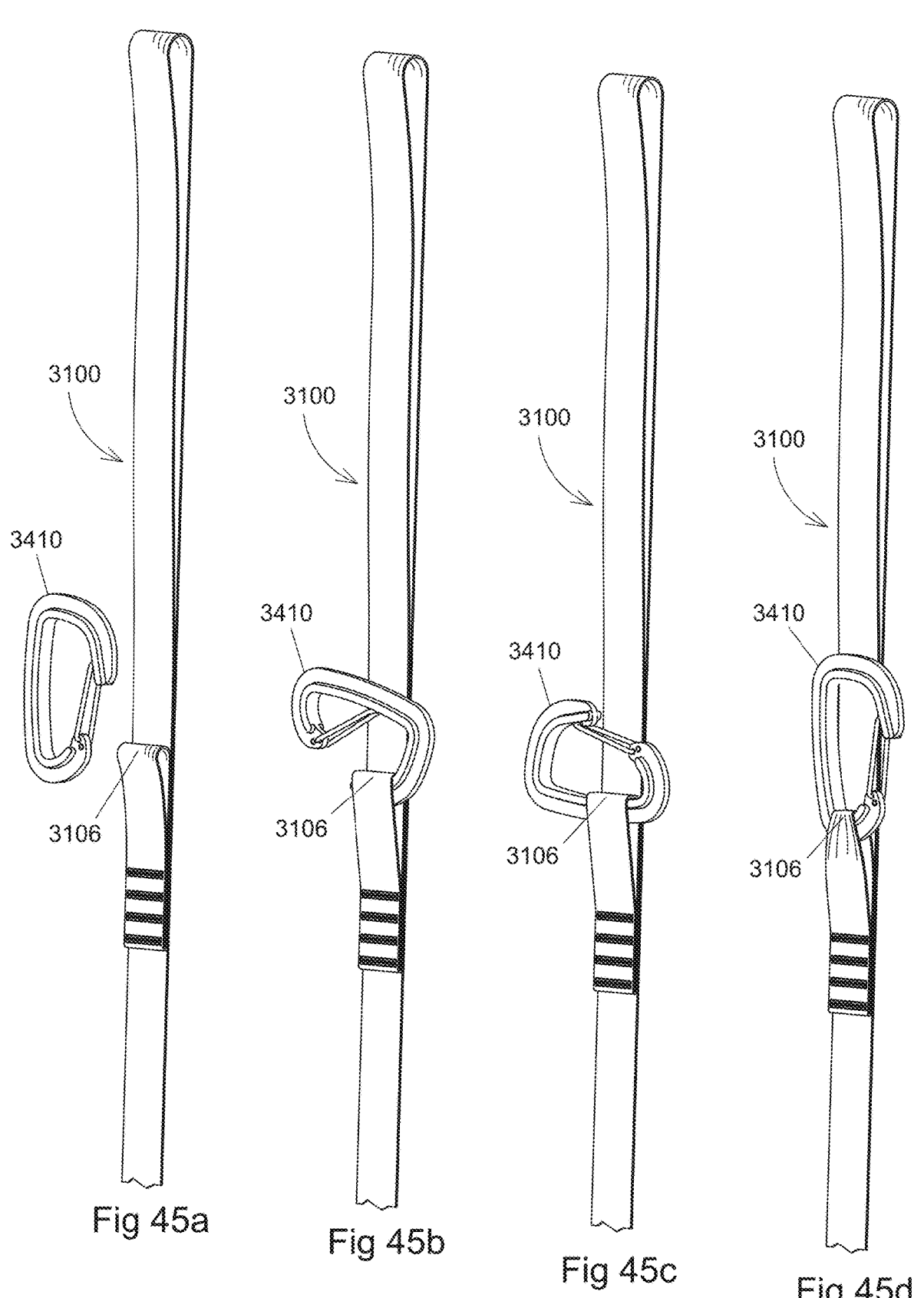
FIGS. 45a-45d show a sequence of isometric views depicting the attachment of a gated carabiner onto the smaller of the two end-loops of the Looped Webbing of FIG. 37.

The strap configuration in FIG. 44*a* through 44*c* depicts the attachment of the Looped Webbing 3100 to a large diameter anchor 3430. A gated carabiner 3410 attached to the larger end-loop 3110 of the Looped Webbing 3100 attaches to the smaller end-loop 3111 of the Looped Webbing 3100 after the larger end-loop, with gated carabiner, circumnavigates the large diameter fixed anchor 3430. The strap configuration in this example matches the prior art example shown in FIG. 51*c*, with the difference being the Looped Webbing 3100 with gated carabiner creates a far more secure strap attachment than does the prior art example that utilizes an open-end S-hook 3440 and a separate sewn-on loop 3444.

Figure 54:
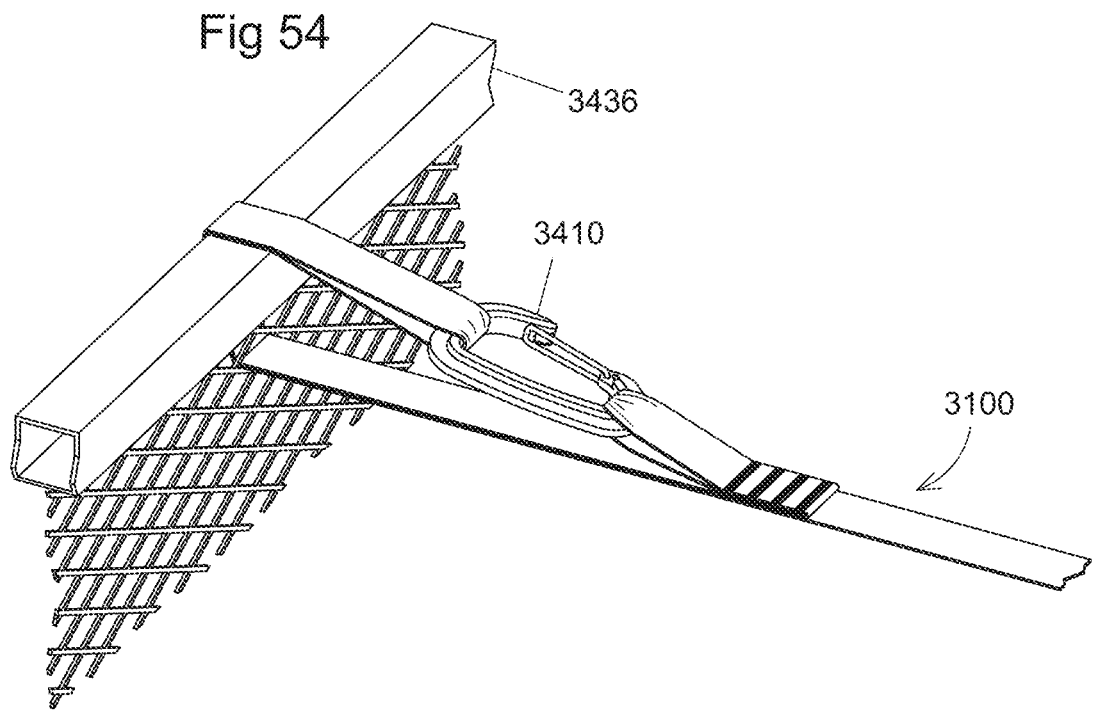
FIG. 54 shows the same configuration from FIG. 53 with the S-hook replaced by a gated carabiner.

The strap configuration depicted in FIG. 46*a* through 46*d*, and in FIG. 54, shows how the free end of the larger end-loop 3110 of the Looped Webbing 3100 can easily slide through an opening in a perforated panel 3434, 3436 to then connect with a gated carabiner 3410 already secured to the smaller end-loop 3111 of the Looped Webbing 3100.

Figure 52A:
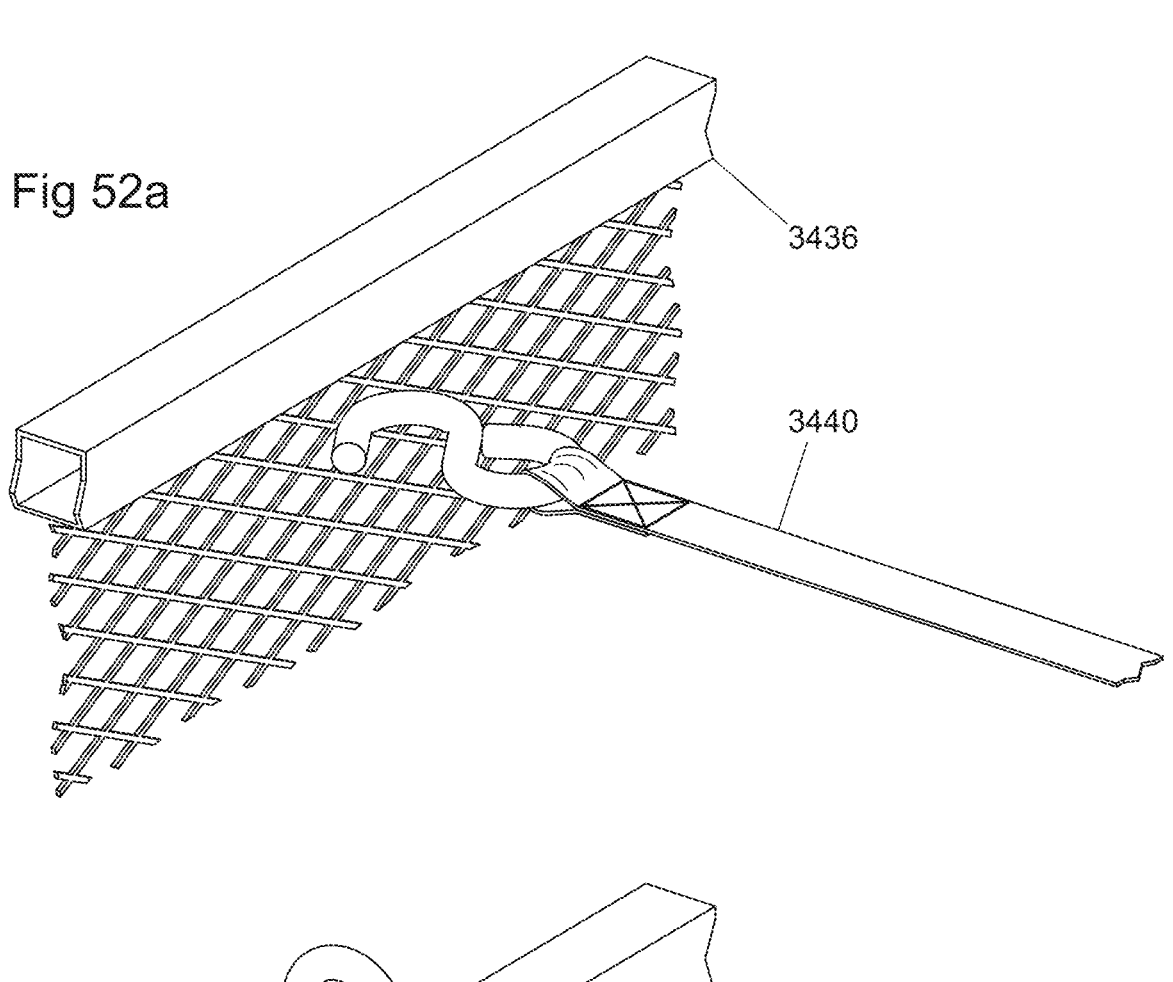
FIG. 52a, FIG. 52b depict an expanded metal panel fabricated with a square tubular top rail, typical of ladder and equipment racks commonly used in pickup trucks, flat bed trucks, and stake bed trucks; note that the prior art strap with a generic 'S' style open-end hook permanently sewn to the strap end is unable to attach to this type of panel.
Figure 52B:
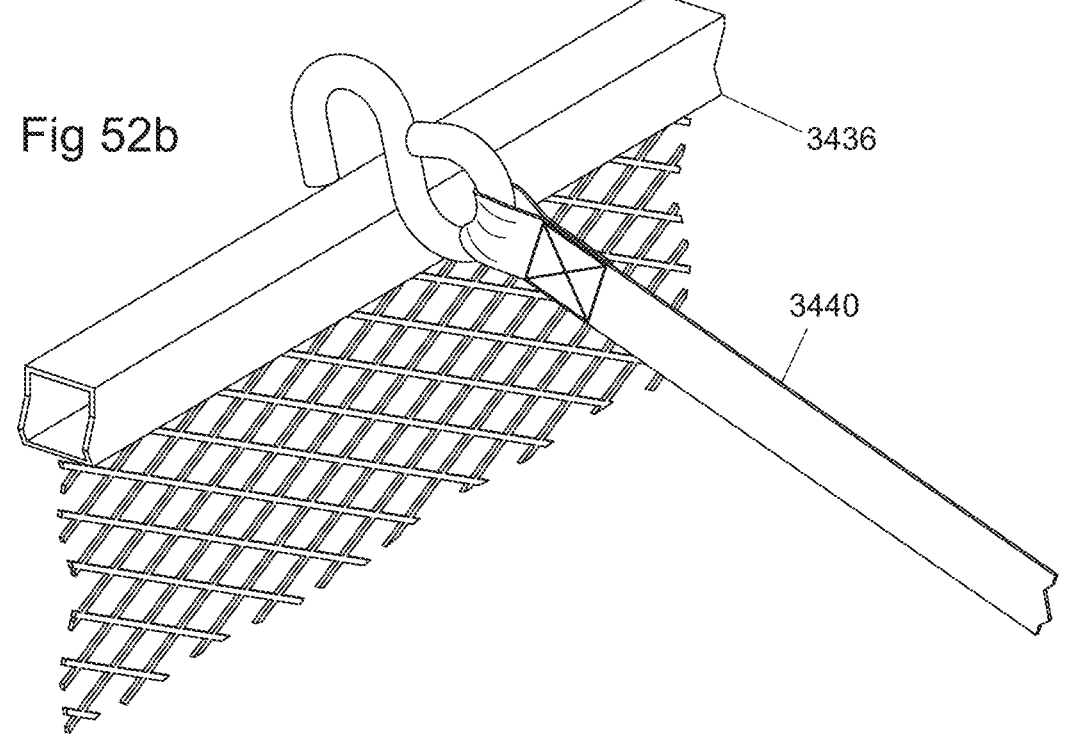
Figure 53:
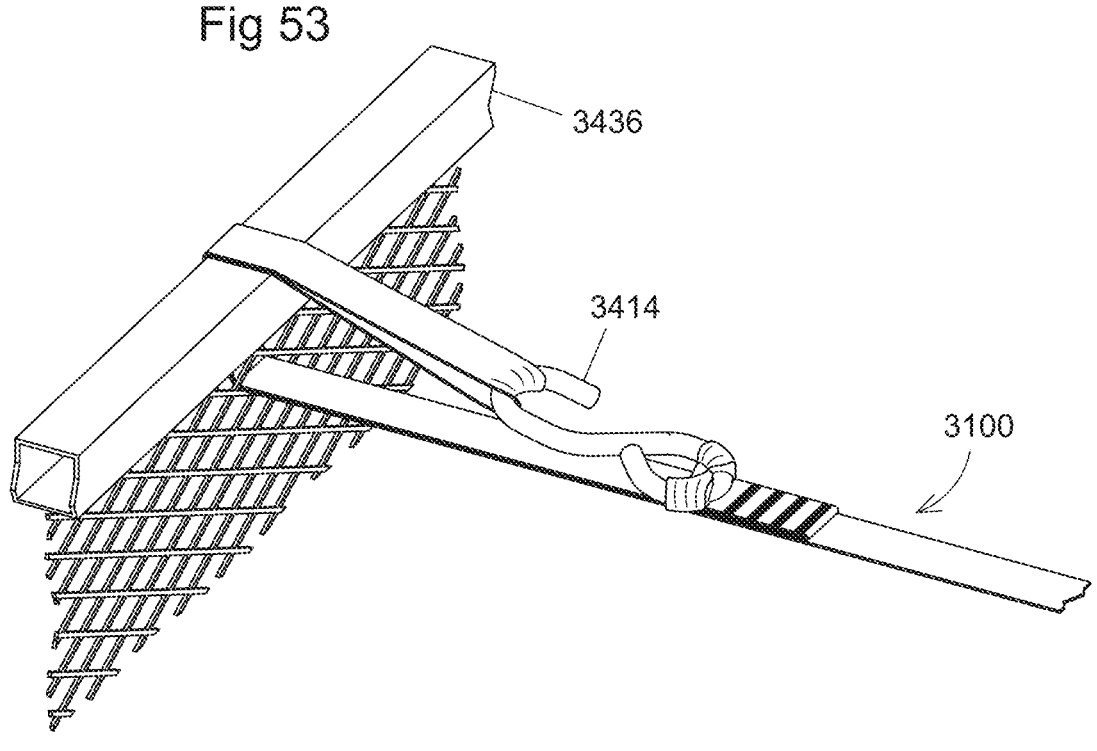
FIG. 53 shows the same expanded metal panel from FIG. 52a and the ease with which the Looped Webbing of FIG. 37, configured with the same style hook used in FIG. 52a, can be secured to the panel.

Note that a prior art strap assembly with an S-hook sewn onto the strap end 3440 (FIG. 51*a*) would be prevented from attaching to a panel 3436 (FIG. 52*a*, FIG. 52*b*) in the same manner depicted by the Looped Webbing 3100 in FIG. 54.

Figures 47A, 47B, 47C:
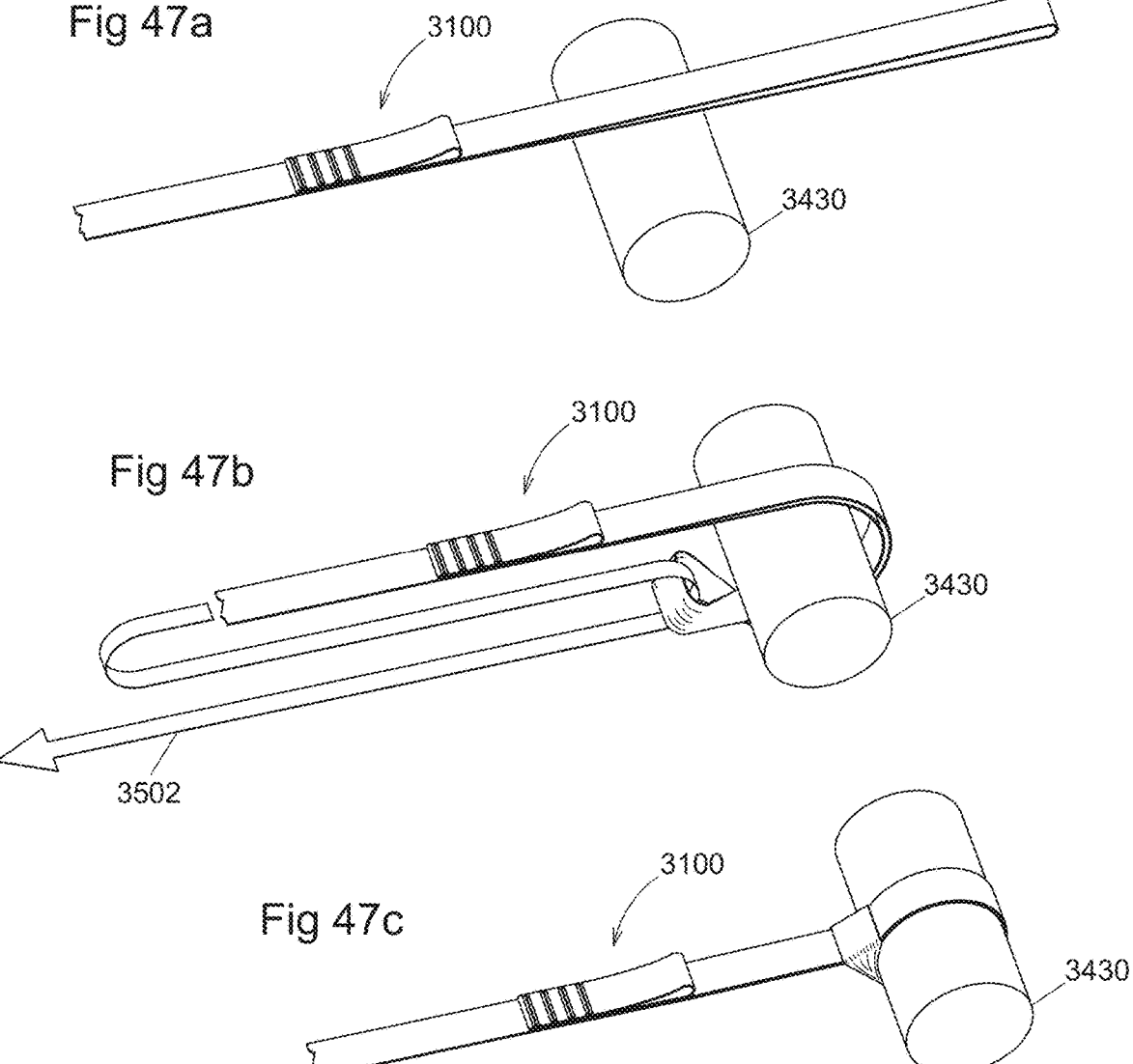
FIGS. 47a-47c show a sequence of isometric views depicting the attachment of the Looped Webbing of FIG. 37 to a large diameter fixed anchor; no supplementary hooks are used; nor does the smaller end-loop of the Looped Webbing come into play in this method of strap attachment; the attachment method mimics the method that would be used to attach a strap which contained a single sewn end-loop.

The strap configuration in FIG. 47*a* through 47*c* depicts the attachment of the Looped Webbing 3100 to a large diameter fixed anchor 3430. No supplementary hooks or other anchor connectors are used. Nor does the smaller end-loop 3111 of the Looped Webbing 3100 come into play in this method of strap attachment. The attachment method of threading the webbing 3101 through the larger end-loop 3110 in the direction indicated by the direction arrow 3502 mimics the method that would be used to attach a strap which contained only a single sewn end-loop.

The Looped Webbing 3100 enables a large variety of anchor connection possibilities. These anchor connection possibilities often are more secure than those created using prior art straps that incorporate a permanent anchor connector on the strap end. Additionally, the Looped Webbing 3100 is flexible in that the configuration can be changed at the user's discretion. In practice, dangerous situations will occur if straps that are configured with hooks are attached to locations unsuitable for hook attachment. In welcome contrast to fixed configuration strap assemblies, the Looped Webbing 3100 makes it easier and more convenient for people to configure useful and safe strap-to-anchor attachments.

Alternative Embodiments

Figures 40, 41:
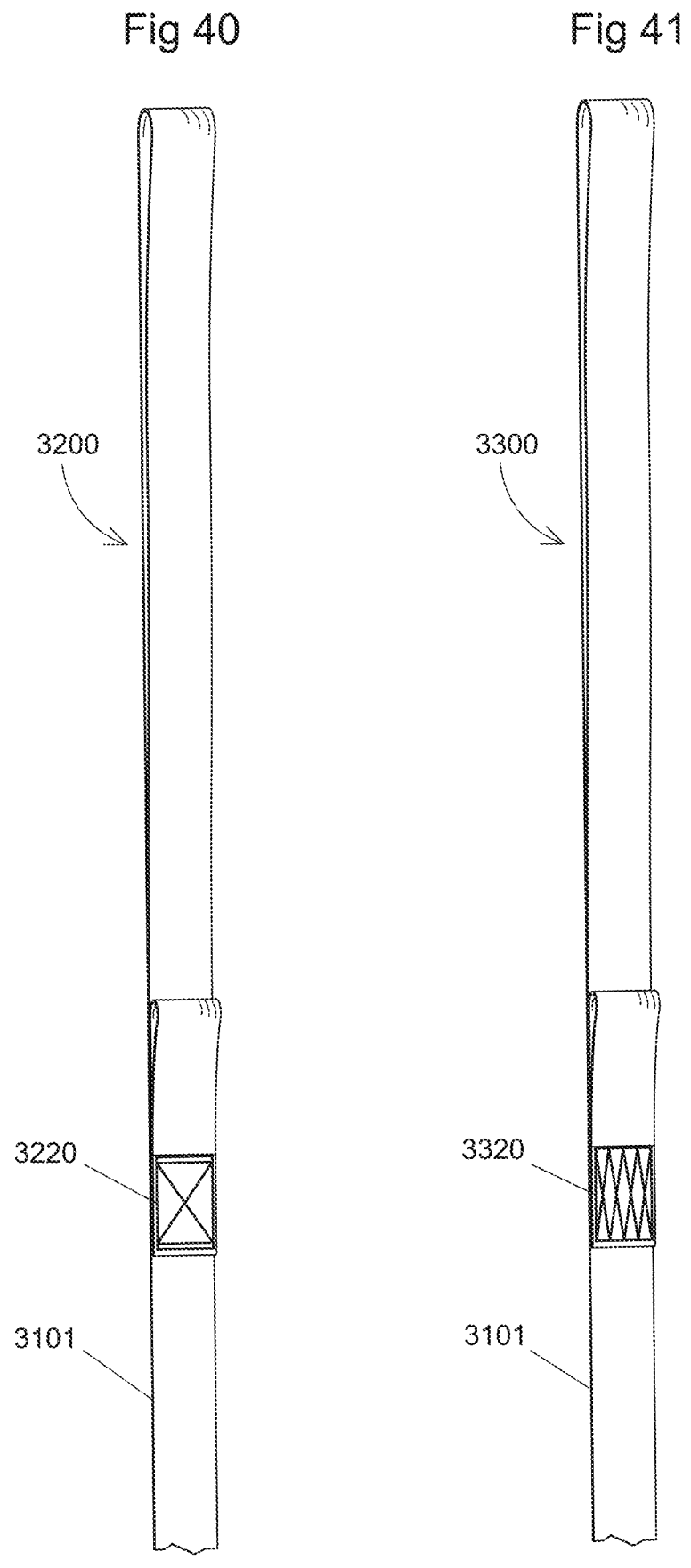

Two alternative embodiments 3200, 3300 are shown in FIG. 40 and FIG. 41. The alternative embodiments differ from Looped Webbing 3100 in that different stitching patterns 3220, 3230 are shown in place of the stitching pattern 3120 shown for the Looped Webbing 3100. A variety of stitching patterns would be deemed acceptable as long as the location of the stitching and the relative size and position of the two loops were maintained.

Slide

Figures 55, 56, 57, 58, 59:
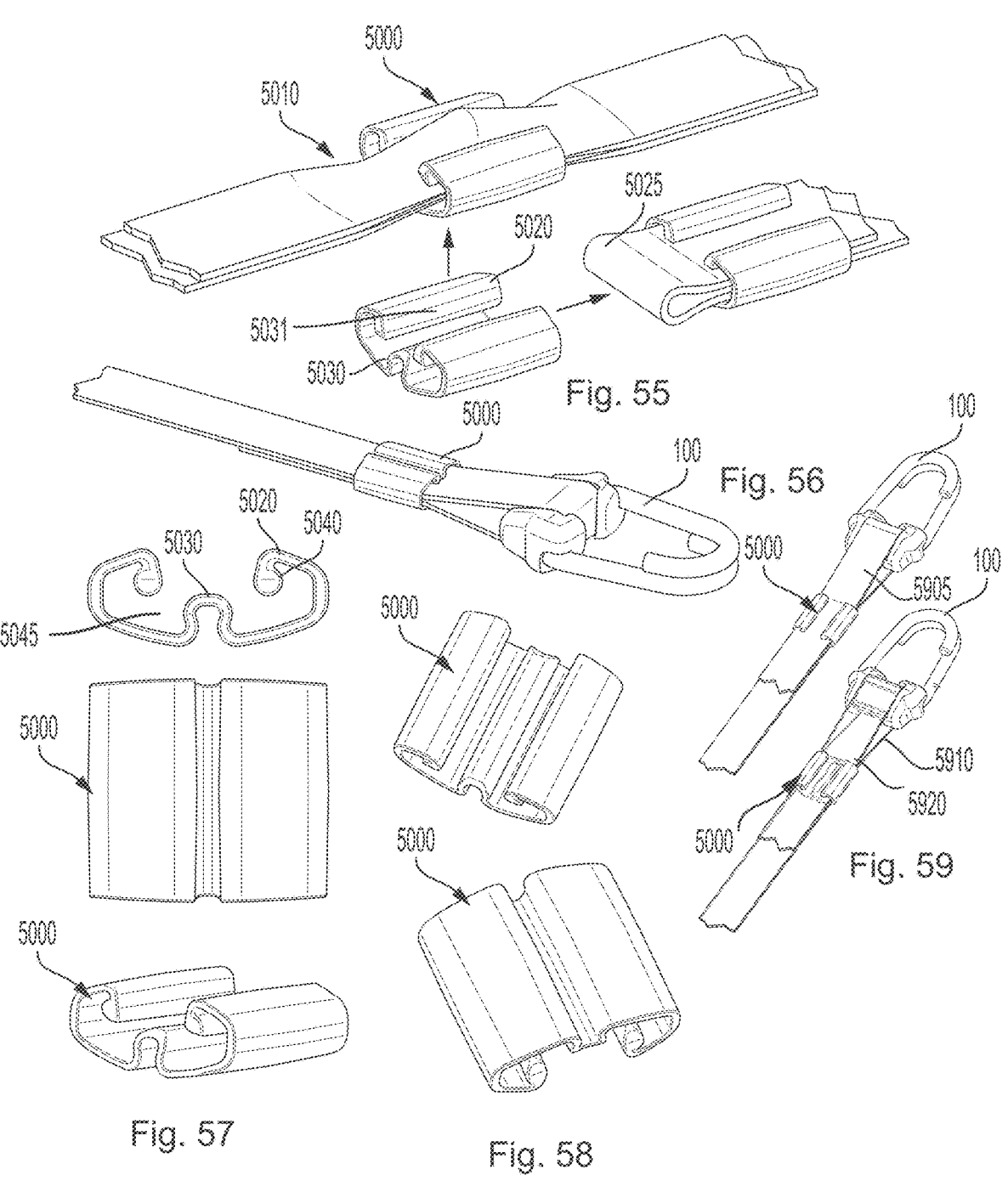
FIG. 55 shows one embodiment of a slide.
FIG. 56 shows another view of the slide of FIG. 55.
FIG. 57 shows another view of the slide of FIG. 55.
FIG. 58 shows another view of the slide of FIG. 55.
FIG. 59 shows another view of the slide of FIG. 55.

FIG. 55 shows one embodiment of an additional slide 5000 for securing the end of a flat strap 5010 when in use with an attachment device 100 or any other device. At least some of the advantages of slide 5000 is that it may be placed on and removed from the flat strap 5010 without detaching the flat strap 5010 or having a lose end of the flat strap 5010. The slide 5000 serves to hold the flat strap 5010 in a secure position such that a lose end will not get in the way of use. Additionally, it adds a degree of friction to the end of the flat strap 5010 to prevent detachment from attachment device 100 or any other device. In operation, a flat strap 5010 may be loaded by sliding it in one of the open ends or by folding it slightly and wedging the edges in through opening 5031. Folding and wedging through opening 5031 is thought to be optimal, but other loading techniques may be used. The advantage of that technique is that no loose end is required for loading slide 5000. Additionally, slide 5000 includes ridge 5030. Ridge 5030 is instrumental in providing holding friction to flat strap 5010 (also known as webbing) towards that top edge 5020 of the slide. As shown, a flat strap 5010 may be placed through opening 5031 and flattened and folded 5025 to provide a secure friction hold to the flat strap 5010.

As shown in FIG. 56, flat strap 5010 may be utilized with attachment device 100. In this configuration, flat strap 5010 may have a loose end that that is captured via slide 5000 and held securely. In previous configurations, flat strap 5010 has a sewn loop.

FIG. 57 shows additional views of slide 5000. As shown in these views, slide 5000 includes two knobbed overhangs 5040. These knobbed overhangs 5040 interface with flat strap 5010 and cooperate with ridge 5030 to hold the flat strap 5010. As is visible, a line from the bottom edges of knobbed overhangs 5040 will intersect ridge 5030, such that the top of ridge 5030 is on the same line as the bottom edges of knobbed overhangs 5040. It is this tight clearance that provides for holding friction when two flat strap sections are engaged in the slide 5000. Force on the flat strap 5010 will tend to pull the strap flat, causing holding friction between the bottom edges of knobbed overhangs 5040 and ridge 5030. However, void area 5045 allows for a user to fold the flat strap 5010 downwards into the void area 5045, therefore releasing the friction hold of slide 5000 and allowing for the flat strap 5010 to be removed. Clearance is needed between knobbed overhangs 5040 and ridge 5030 to wedge the flat strap 5010 in the gap and engage the device as shown. FIG. 58 shows additional views of this clearance.

FIG. 59 shows an embodiment of the arrangement of slide 5000 with attachment device 100. The top view provides an opaque flat strap 5905 and the bottom view provides two transparent flat strap sections 5910, 5920. As shown, the flat strap may be wrapped around the attachment device 100 and then both ends (two transparent flat strap section 5910, 5920) may be folded into the slide 5000. The two transparent flat strap section 5910, 5920 are transparent for illustration purposes.

Therefore, in many embodiments a slide includes a body section. The body section is shaped to receive a size of flat strap. The body section is typically designed for a certain size flat strap. These flat straps may range in size from ⅜ of an inch in width to 2 inches and width and all those sizes in between. Although these are the typically sizes, the slide be sized to fit with virtually any size webbing/flat strap. Typically, the slide will work best with flat strap sizes it was designed for or sizes similar thereto. Principally, the slide includes a ridge and two overhangs on either side of the ridge. The overhangs fold over like an upside-down G-shape in relation to the ridge. Typically, the overhangs are knobbed (but not always), as the knobbed nature increases the friction on a flat strap in the device. In many configurations, the knobbed overhangs and ridge intersect on an imaginary line running across the device. Clearance between the knobbed overhangs and ridge may vary in that they may extend past each other or there may be some clearance between. It depends on the thickness of the strap intended to be used. However, in many configurations the knobbed overhangs and ridge intersect on an imaginary line running across the device or approximately as such. Additionally, in many configurations, a void is included on either side of the ridge, such that the flat strap may be folded down into it for loading and unloading. The ridge is raised in respect to the voids and the bottom edge of the slide. Additionally, in many embodiments the total width of the slide is slightly more than that of the flat strap it is designed for, with room to accommodate the width of the material of the body of the slide. In many configurations, when two sections of flat strap are in the slide, the fiction of the knobbed overhangs and ridge against the flat strap prevent removal. Additionally, in many configurations, as tension is applied to the flat strap, the flat strap tends to flatten, providing force against the knobbed overhangs and ridge which translates to friction against removal. In many embodiments, the slide may be attached and removed without the need for a loose end on the device. In many embodiments, an opening between the overhangs is included. In many configurations, the opening aligns with the ridge. In many configurations, the flat strap may be loaded to the device through the opening, by folding the flat strap and sliding the edges into the voids on either side of the ridge. The slide may be made of plastic, composite, metal, or many other materials know to those of ordinary skill in the art. In many configurations, the slide is either injection molded or may be bent and folded from a single piece of material. Various other fabrication techniques are possible.

Alternative Attachment Device

Figure 60:
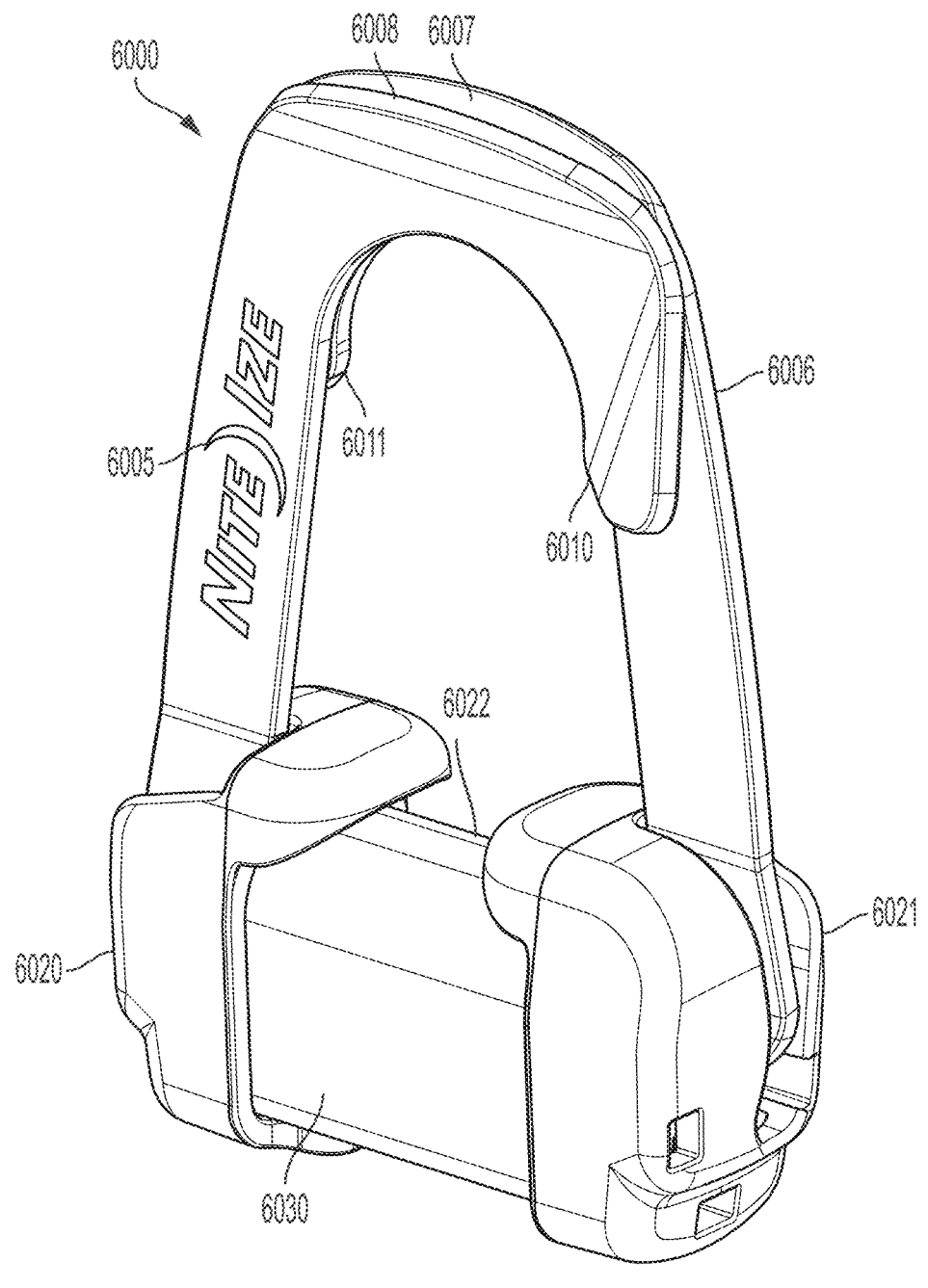
FIG. 60 shows one embodiment of an attachment device.

FIG. 60 shows one embodiment of an alternative attachment device 6000. Attachment device 6000 is similar in some respects to attachment device 100. Attachment device 6000 includes a first hook 6005 and a second hook 6006. First hook 6005 includes upturned end 6010 and upturned end 6011 is found on second hook 6006. These upturned ends 6010, 6011 serve to provide easier attachment of a rope or other item to attachment device 6000. Note that in attachment device 6000, the first hook and the second hook 6006 are formed of a flat piece of material that is shaped like a hook. Therefore, when the first hook and the second hook 6006 rest against each other, it may be difficult to wedge a rope, flat strap or other object between them. In contrast, since attachment device 100 is may of a rounded hook, the hook having a circular cross section, it may be difficult to place an object between first hook and the second hook 6006. The upturned ends 6010, 6011 provide for wedge to assist in insertion of an object. In attachment device 100, due to the rounded nature of the hooks, the hooks shape naturally lend themselves to an approximate wedge. Additionally, first hook and the second hook 6006 include a first upturned peak 6007 and a second upturned peak 6008. The first upturned peak 6007 and the second upturned peak 6008 function similar to the upturned ends, providing for easy insertion of a rope, strap or other object, by relying on the wedged entrance provided. Additionally, a frame 6020, 6021 that receives the first hook 6005 and the second hook 6006 is provided. Between the frame 6020, 6021 a receiving area 6022 for a flat strap is provided on housing 6030.

Figure 61:
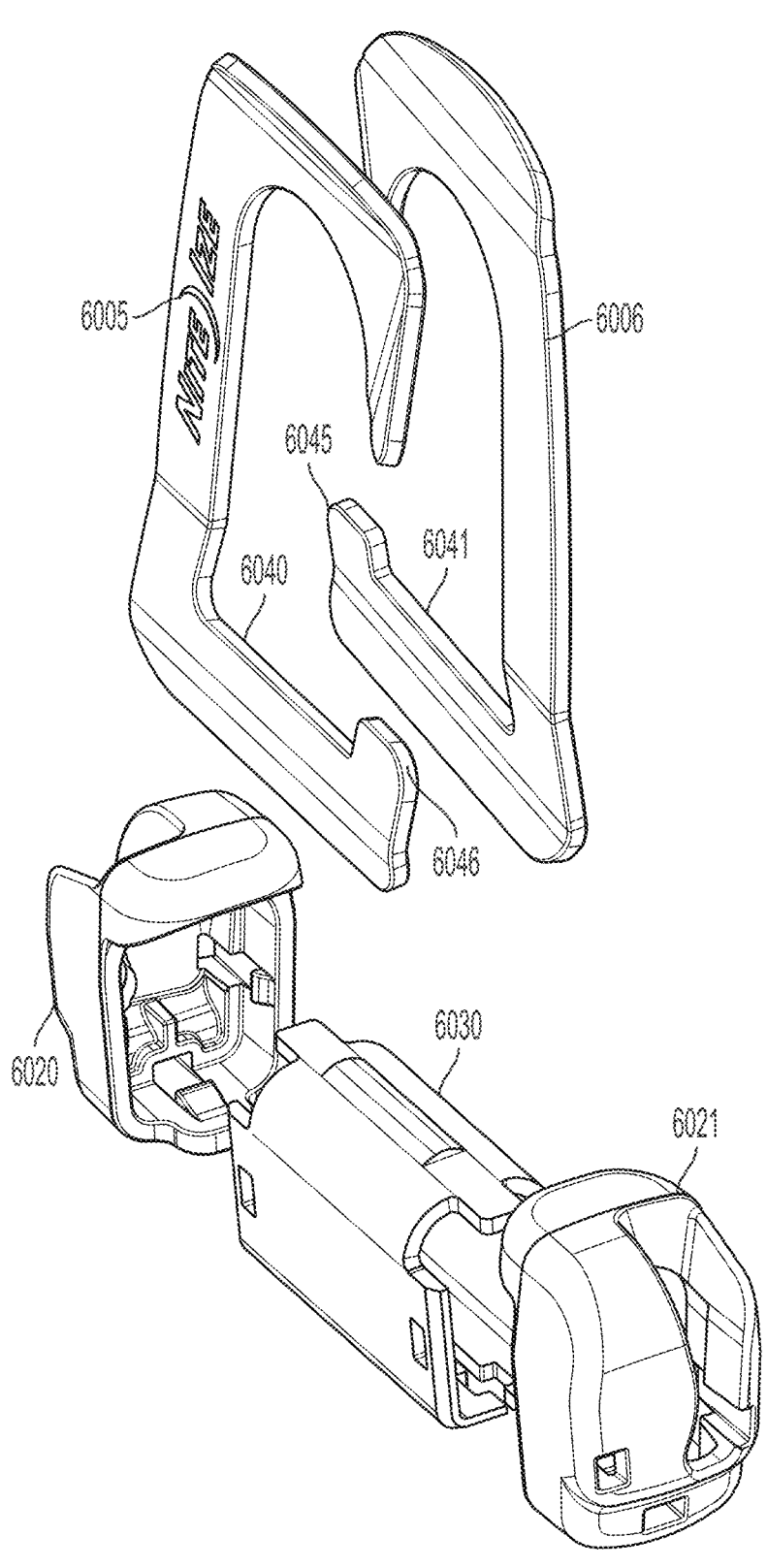
FIG. 61 shows an exploded view of the attachment device of FIG. 60.
Figure 62:
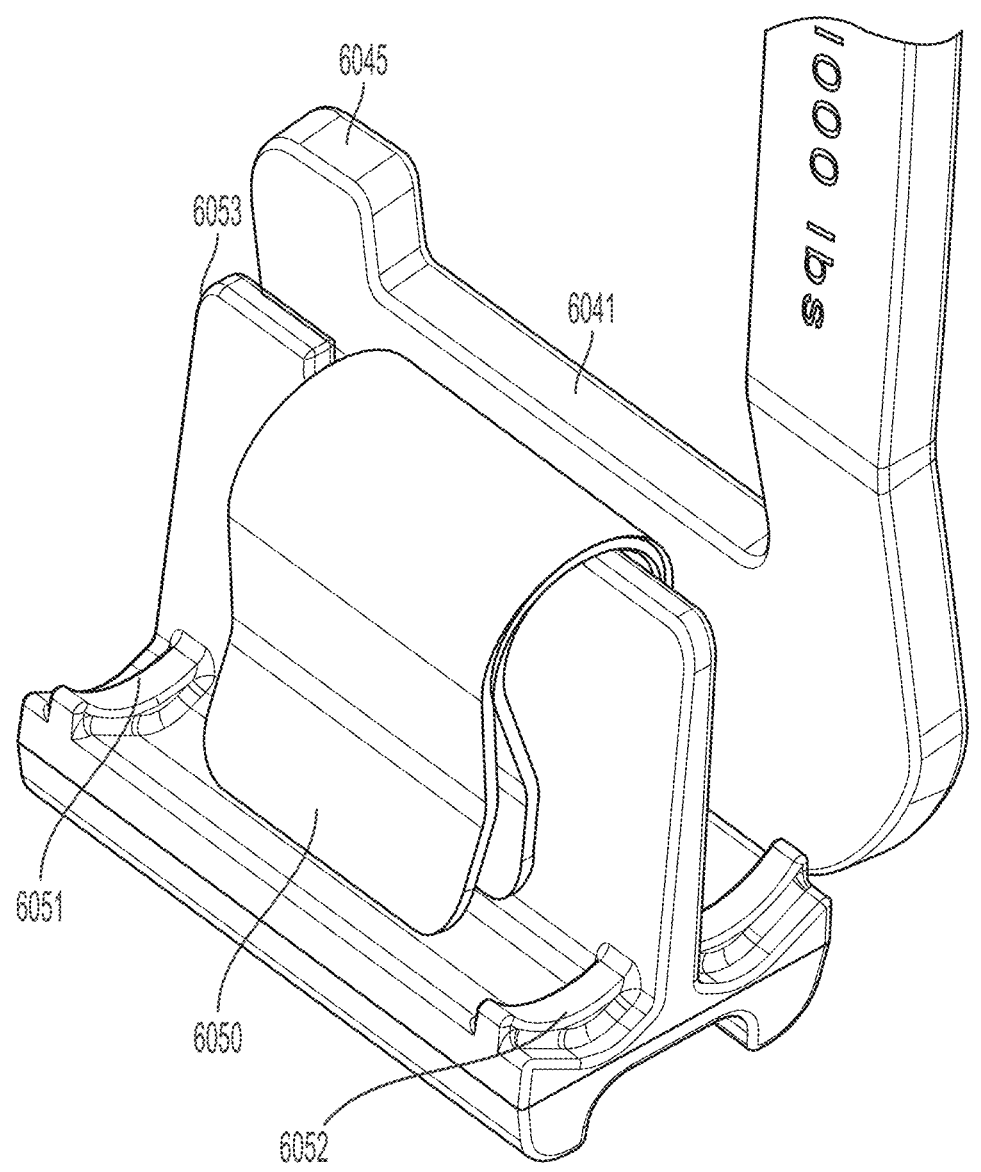
FIG. 62 shows a cutaway view of the attachment device of FIG. 60.

FIG. 61 shows an exploded view of attachment device 6000. Here, the ends of the first hook 6005 and the second hook 6006 are visible. The ends include a flat portion 6040, 6041 and an upturned portion 6045, 6046. FIG. 62 shows inside housing 6030. Inside, cradle area 6051, 6052 receives the bottom edge of the first hook 6005 and the second hook 6006. The center peak 6053, receives flat spring 6050. Flat portions 6040, 6041 press against flat spring 6050 when the first hook 6005 and the second hook 6006 are separated. The angled bottom portion of the first hook 6005 and the second hook 6006 provide for give in the system, such that when the top portions of the first hook 6005 and the second hook 6006 are in a perpendicular and touching position, the flat portions 6040, 6041 flare out. When the first hook 6005 and the second hook 6006 separate, then the flat portions 6040, 6041 compress the flat spring 6050 and move toward a perpendicular position. Upturned portion 6045, 6046 fit into frame 6020, 6021 and provide the hook portions two portions on the frame to prevent removal.

Figure 63:
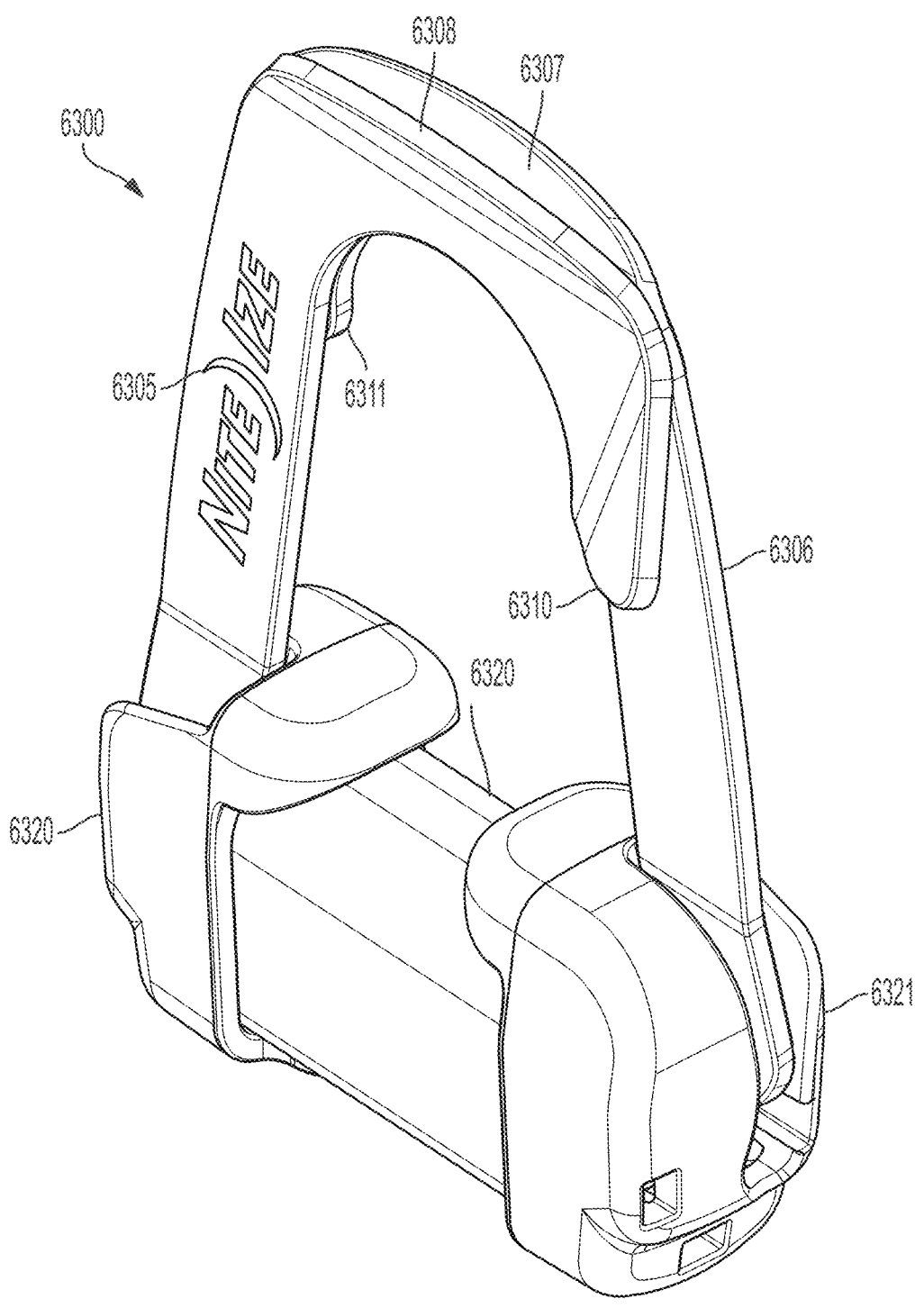
FIG. 63 shows one embodiment of an attachment device.

FIG. 63 shows one embodiment of an alternative attachment device 6300. This version has angled arms on the hooks. Attachment device 6300 is similar in some respects to attachment device 100. Attachment device 6300 includes a first hook 6305 and a second hook 6306. First hook 6305 includes upturned end 6310 and upturned end 6311 is found on second hook 6306. These upturned ends 6310, 6311 serve to provide easier attachment of a rope or other item to attachment device 6300. Note that in attachment device 6300, the first hook and the second hook 6306 are formed of a flat piece of material that is shaped like a hook. Therefore, when the first hook and the second hook 6306 rest against each other, it may be difficult to wedge a rope, flat strap or other object between them. In contrast, since attachment device 100 is may of a rounded hook, the hook having a circular cross section, it may be difficult to place an object between first hook and the second hook 6306. The upturned ends 6310, 6311 provide for wedge to assist in insertion of an object. In attachment device 100, due to the rounded nature of the hooks, the hooks shape naturally lend themselves to an approximate wedge. Additionally, first hook and the second hook 6306 include a first upturned peak 6307 and a second upturned peak 6308. The first upturned peak 6307 and the second upturned peak 6308 function similar to the upturned ends, providing for easy insertion of a rope, strap or other object, by relying on the wedged entrance provided. Additionally, a frame 6320, 6321 that receives the first hook 6305 and the second hook 6306 is provided. Between the frame 6320, 6321 a receiving area 6322 for a flat strap is provided on housing 6330.

Figure 64:
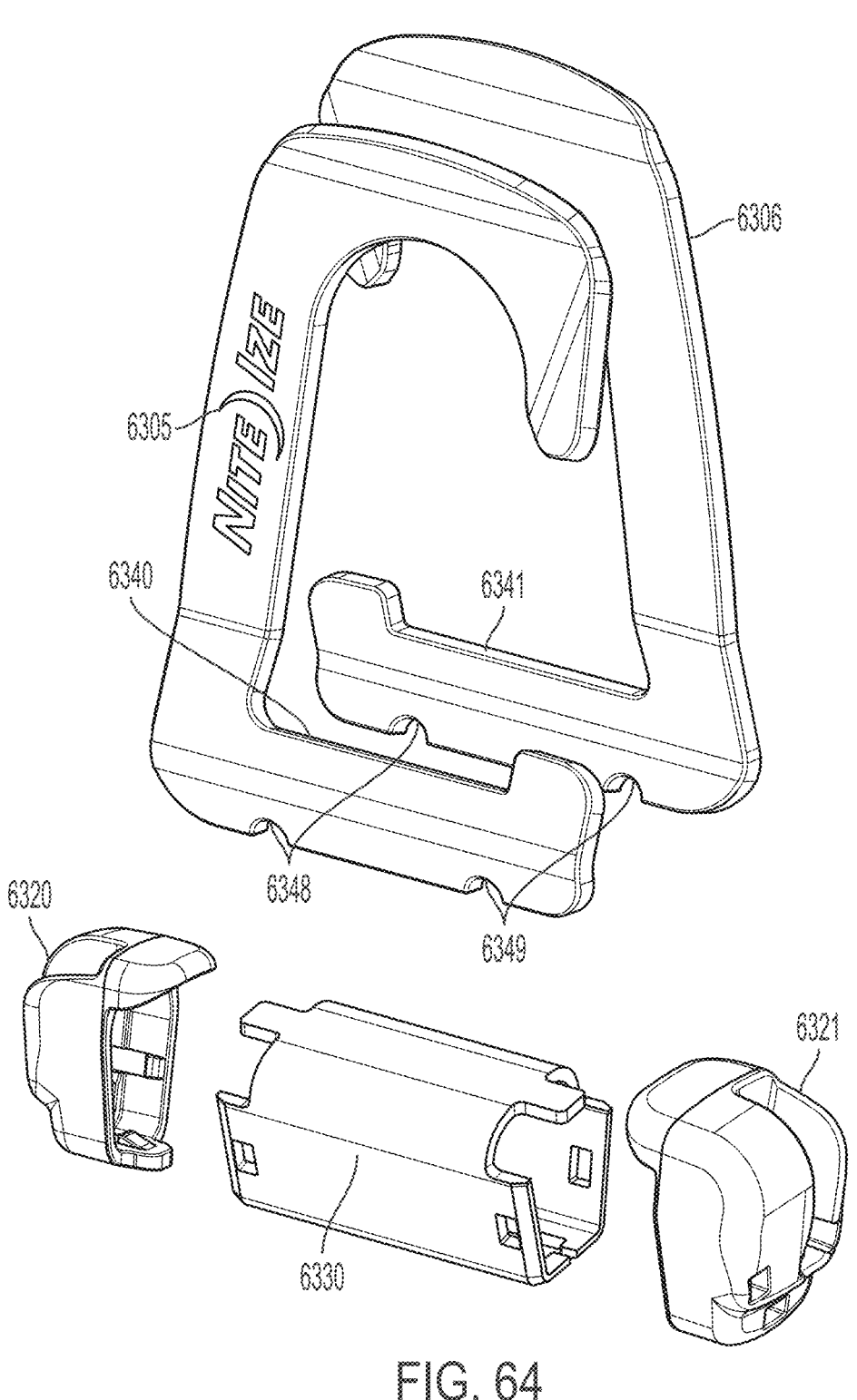
FIG. 64 shows an exploded view of the attachment device of FIG. 63.

FIG. 64 shows an exploded view of attachment device 6300. Here, the ends of the first hook 6305 and the second hook 6306 are visible. The ends include a flat portion 6340, 6341 and an upturned portion 6345, 6346. Also, cutouts 6348, 6349 interface with cradle area 6051, 6052, and provide for a lower profile of the first hook 6305 and the second hook 6306.

Figure 65:
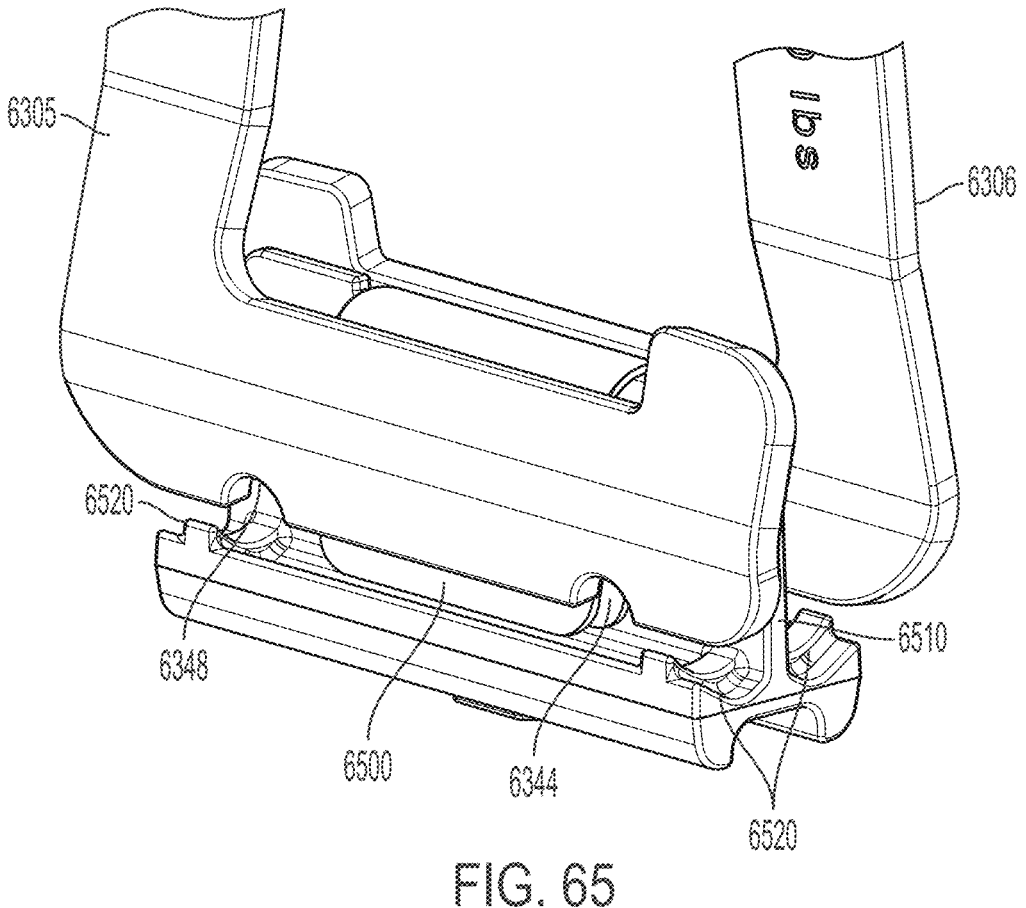
FIG. 65 shows a cutaway view of the attachment device of FIG. 63.

FIG. 65 shows inside housing 6330. Inside, cradle area 6520 receives the bottom edge of the first hook 6305 and the second hook 6306 at cutouts 6348, 6349, respectively. The center peak 6510, receives flat spring 6500. Flat portions 6340, 6341 press against flat spring 6500 when the first hook 6305 and the second hook 6306 are separated. The angled bottom portion of the first hook 6305 and the second hook 6306 provide for give in the system, such that when the top portions of the first hook 6305 and the second hook 63006 are in a perpendicular and touching position, the flat portions 6340, 6341 flare out. When the first hook 6305 and the second hook 6306 separate, then the flat portions 6340, 6341 compress the flat spring 6500 and move toward a perpendicular position. Upturned portion 6345, 6346 fit into frame 6320, 6321 and provide the hook portions two portions on the frame to prevent removal.

Figures 66, 67:
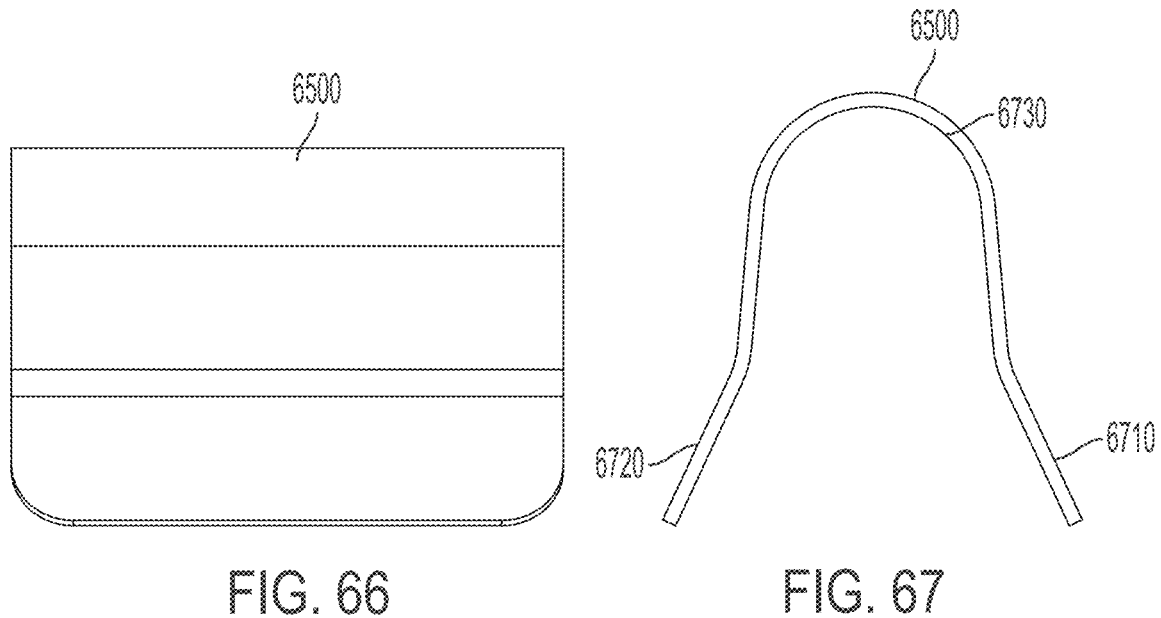
FIGS. 66 and 67 show one embodiment of a spring.

FIGS. 66 and 67 show one embodiment of flat spring 6500. Flat spring 6500 includes a top rounded portion 6730 and angled/flared portions 6710, 6720. Typically, the angled/flared portions 6710, 6720 have a similar angle to that of the bottom portions of the first hook 6305 and the second hook 6306. This provides good contact between the hooks and the spring. Different from the previous embodiment, attachment device 100, the use of a single flat spring provides tension to both hooks, but better resists the spring from being jarred or detached, since it wraps around the center peak and is not small enough to have significant play within the housing.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. An attachment device comprising:

a first hook and a second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook, wherein the first and second hook pivot between the first and second position;

a housing, the housing interconnecting the first and second hook and providing a mechanism for a biasing force, the biasing force biasing the first and second hook towards each other;

a first spring located in the housing, the first spring providing the biasing force;

a center wall, the center wall located in the housing, the first spring pressing against the housing and the first hook in order to bias the first hook and the second hook, wherein the first hook and the second hook extend into the housing, the first curved end has an arced shape in a first plane and the second curved end has an arced shape in a second plane, a first bottom portion of the first hook that extends into the housing is in a third plane, the third plane at an angle to the first plane and a second bottom portion of the second hook that extends into the housing is in a fourth plane, the third plane at an angle to the second plane, the first plane and the second plane are parallel to a fifth plane of the center wall in the second position, the third plane and the fourth plane flare away from the fifth plane in the second position, the first plane and the second plane flare away from the fifth plane in the first position.

2. The attachment device of claim 1, wherein the third plane and the fourth plane are parallel to the fifth plane in the first position.

3. The attachment device of claim 2, wherein a first portion of the spring is in a sixth plane parallel to the third plane, and the first portion of the spring rests against the first bottom portion.

4. The attachment device of claim 3, wherein a second portion of the spring is in a seventh plane parallel to the third plane, and the second portion of the spring rests against the second bottom portion.

5. The attachment device of claim 4, wherein in the second position, the sixth plane and the seventh plane of the spring are pressed towards a parallel position to the fifth plane of the center wall.

6. The attachment device of claim 1, wherein the first hook and the second hook include a first arced portion with a first end and a second arced portion with a second end, and the first arced portion includes a first center area and the second arced portion includes a second center area, the first center area being an area distal from the first end at the midpoint area of the first arced portion, the first hook having an first upturned portion at the first center area and the second hook having a second upturned portion at the second center area, the first upturned area and the second upturned area cooperating to form a first wedge in the second position, the first wedge assisting separation of the first and second hook when an object is pushed against the first wedge.

7. The attachment device of claim 6, wherein the first end has a second upturned area and the second end has a third upturned area.

8. The attachment device of claim 7, wherein in the second position, the second upturned area flares away from the second hook.

9. The attachment device of claim 8, wherein in the second position, the third upturned area flares away from the first hook.

\* \* \* \* \*